United States Patent
Chikata et al.

(10) Patent No.: US 11,181,816 B2
(45) Date of Patent: *Nov. 23, 2021

(54) WINDSHIELD-MOUNTED CAMERA MODULE

(71) Applicant: DENSO CORPORATION, Kariya (JP)

(72) Inventors: Kensuke Chikata, Kariya (JP); Takeshi Kazama, Kariya (JP); Yasuki Furutake, Kariya (JP); Kazuyoshi Akiba, Kariya (JP); Sho Okuda, Kariya (JP); Nobuhisa Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,163

(22) Filed: Dec. 14, 2017

(65) Prior Publication Data
US 2019/0146322 A1     May 16, 2019

(30) Foreign Application Priority Data

Nov. 10, 2017 (JP) .............................. JP2017-217470
Nov. 22, 2017 (JP) .............................. JP2017-224945
Nov. 24, 2017 (JP) .............................. JP2017-226024

(51) Int. Cl.
| | |
|---|---|
| *G03B 37/04* | (2021.01) |
| *G03B 17/56* | (2021.01) |
| *B60R 11/04* | (2006.01) |
| *G03B 11/04* | (2021.01) |
| *G02B 13/02* | (2006.01) |

(Continued)

(52) U.S. Cl.
CPC .............. *G03B 37/04* (2013.01); *B60R 11/04* (2013.01); *G03B 11/045* (2013.01); *G03B 17/561* (2013.01); *B60R 2011/0026* (2013.01); *G02B 13/02* (2013.01); *G02B 13/04* (2013.01)

(58) Field of Classification Search
CPC .... G03B 37/04; G03B 17/561; G03B 11/045; B60R 11/04; B60R 2011/0026; G02B 13/02; G02B 13/04
USPC ....................................................... 348/335
See application file for complete search history.

(56) References Cited

U.S. PATENT DOCUMENTS

| | | |
|---|---|---|
| 5,168,355 A | 12/1992 | Asayama |
| 5,307,136 A | 4/1994 | Saneyoshi |
| 5,530,420 A | 6/1996 | Tsuchiya et al. |

(Continued)

FOREIGN PATENT DOCUMENTS

| | | |
|---|---|---|
| JP | 5316562 B2 | 10/2013 |
| JP | 5761100 B2 | 8/2015 |
| WO | 2013/123161 A1 | 8/2013 |

OTHER PUBLICATIONS

U.S. Appl. No. 16/265,745 and its entire file history, filed Feb. 1, 2019, Sho Okuda, et al.

(Continued)

*Primary Examiner* — Lin Ye
*Assistant Examiner* — Chan T Nguyen
(74) *Attorney, Agent, or Firm* — Maschoff Brennan

(57) ABSTRACT

A camera module, which is mounted on an inside of a front windshield of a vehicle and configured to image an external environment of the vehicle, includes multiple lens units on which an optical image of the external environment is incident, individually, and an imaging system to generate an outside image of the external environment by imaging through each of the lens units, individually.

21 Claims, 50 Drawing Sheets

(51) Int. Cl.
*B60R 11/00* (2006.01)
*G02B 13/04* (2006.01)

(56) References Cited

U.S. PATENT DOCUMENTS

| | | | |
|---|---|---|---|
| 5,892,855 A * | 4/1999 | Kakinami | G06K 9/4633 |
| | | | 382/291 |
| 7,656,432 B2 | 2/2010 | Ogawa et al. | |
| 8,581,982 B1 | 11/2013 | Haley et al. | |
| 9,871,971 B2 | 1/2018 | Wang et al. | |
| 10,232,800 B1 | 3/2019 | Okuda et al. | |
| 2006/0266835 A1 | 11/2006 | Tanida | |
| 2007/0146503 A1 | 6/2007 | Shiraki | |
| 2008/0055412 A1 | 3/2008 | Tanaka | |
| 2009/0073258 A1 | 3/2009 | Robert et al. | |
| 2012/0155855 A1 | 6/2012 | Okuda | |
| 2012/0207461 A1 | 8/2012 | Okuda | |
| 2012/0293660 A1 | 11/2012 | Murakami et al. | |
| 2013/0188022 A1 | 7/2013 | Katz | |
| 2014/0016919 A1 | 1/2014 | Okuda | |
| 2014/0160284 A1 | 6/2014 | Achenbach et al. | |
| 2014/0211009 A1 | 7/2014 | Fursich | |
| 2014/0226012 A1 | 8/2014 | Achenbach | |
| 2015/0015713 A1 | 1/2015 | Wang et al. | |
| 2015/0042804 A1 | 2/2015 | Okuda | |
| 2015/0109447 A1 | 4/2015 | Okuda | |
| 2015/0312450 A1 * | 10/2015 | Park | G02B 13/001 |
| | | | 348/335 |
| 2016/0039358 A1 | 2/2016 | Okuda et al. | |
| 2016/0227078 A1 | 8/2016 | Oh | |
| 2016/0227079 A1 * | 8/2016 | Oh | H04N 5/372 |
| 2016/0255260 A1 | 9/2016 | Huang et al. | |
| 2016/0314365 A1 | 10/2016 | Poledna | |
| 2017/0032197 A1 | 2/2017 | Sim | |
| 2017/0064877 A1 | 3/2017 | Ratcliffe | |
| 2017/0098131 A1 | 4/2017 | Shashua et al. | |
| 2017/0217382 A1 | 8/2017 | Gunes | |
| 2017/0274835 A1 | 9/2017 | Kasai et al. | |
| 2017/0290170 A1 | 10/2017 | Low et al. | |
| 2017/0305361 A1 | 10/2017 | Okuda et al. | |
| 2017/0371345 A1 | 12/2017 | Cohen et al. | |
| 2017/0371347 A1 | 12/2017 | Cohen et al. | |
| 2018/0183982 A1 | 6/2018 | Lee et al. | |
| 2018/0284398 A1 | 10/2018 | Furutake et al. | |
| 2019/0143906 A1 | 5/2019 | Chikata et al. | |
| 2019/0146194 A1 | 5/2019 | Chikata et al. | |
| 2019/0146323 A1 | 5/2019 | Chikata et al. | |
| 2019/0168687 A1 | 6/2019 | Okuda et al. | |

OTHER PUBLICATIONS

U.S. Appl. No. 16/506,812, filed Jul. 9, 2019, Okuda, et al.
U.S. Appl. No. 16/520,806 and its entire file history, filed Jul. 24, 2019, Yasuki Furutake, et al.
U.S. Appl. No. 15/957,032, filed Apr. 19, 2018, Chikata, et al.
U.S. Appl. No. 15/957,035, filed Apr. 19, 2018, Chikata, et al.
U.S. Appl. No. 15/957,055, filed Apr. 19, 2018, Chikata, et al.
U.S. Appl. No. 15/957,044, filed Apr. 19, 2018, Chikata, et al.
"A Method and Experiment for Measuring Distance of Object Parallax from Image", Li Shixi, China Master's Theses Full-text Database, Information Science and Technology, 1138-7197, No. 3 2016, p. 8-10, Mar. 31, 2016.
"On Vehicle Identifying and Ranging Method at Night Based on Monocular Vision", Du Tengzhou, China Master's Theses Full-text Database, Engineering Science and Technology II, C034-669, No. S2 2013, p. 35-41, Dec. 31, 2013.

* cited by examiner

FIG. 35
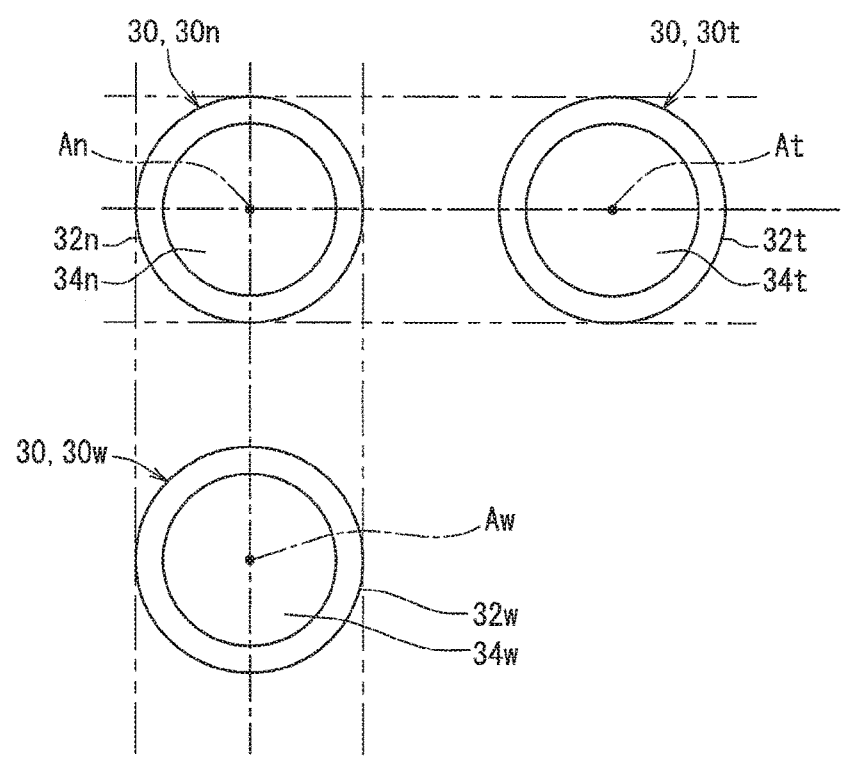
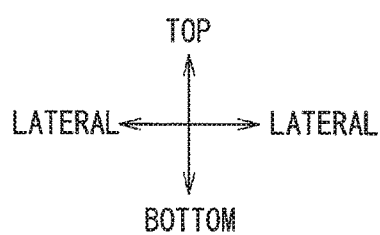

FIG. 36
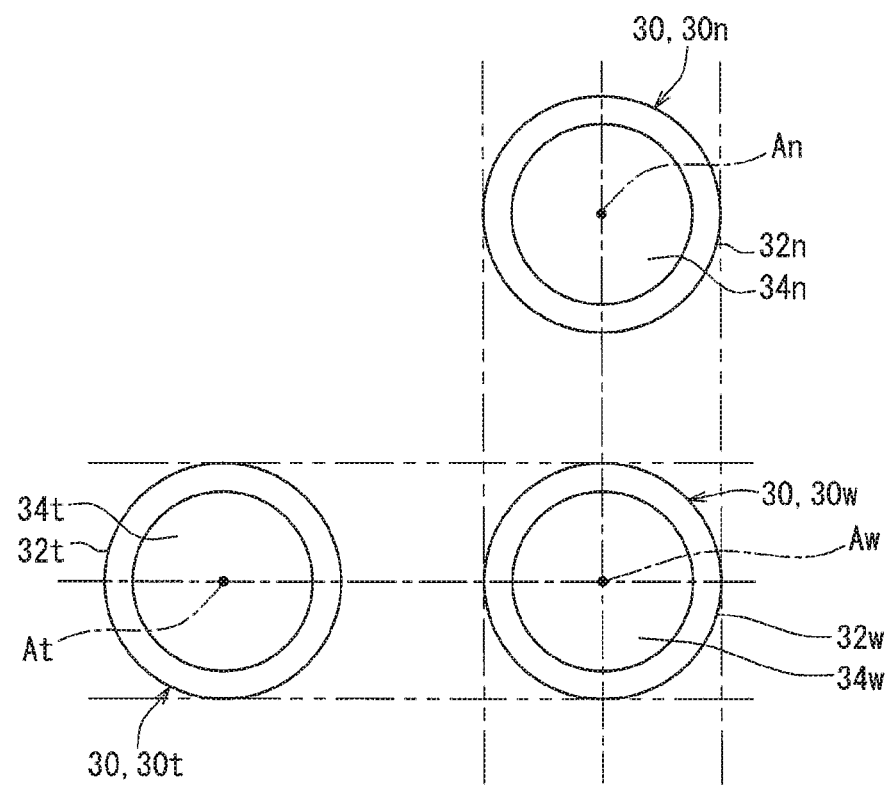
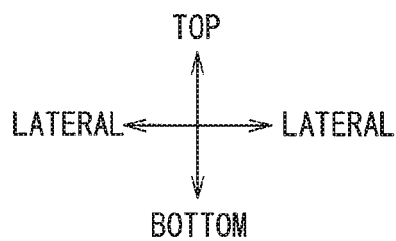

WINDSHIELD-MOUNTED CAMERA MODULE

CROSS REFERENCE TO RELATED APPLICATION

This application is based on Japanese Patent Applications No. 2017-217470 filed on Nov. 10, 2017, No. 2017-224945 filed on Nov. 22, 2017, and No. 2017-226024 filed on Nov. 24, 2017, the disclosure of which is incorporated herein by reference.

TECHNICAL FIELD

The present disclosure relates to a camera module.

BACKGROUND

Conventionally, camera modules, which are installed on the inside of a windshield of a vehicle and are configured to image an external environment of the vehicle, have been widely known. One of the foregoing camera modules has been disclosed in Patent Literature 1.

(Patent Literature 1)
Publication of Japanese Patent No. 5316562

SUMMARY

The present disclosure produces a camera module with a new configuration.

BRIEF DESCRIPTION OF THE DRAWINGS

The above and other objects, features and advantages of the present invention will become more apparent from the following detailed description made with reference to the accompanying drawings. In the drawings:

FIG. 35 is a front view illustrating a modification of FIG. 5;

FIG. 36 is a front view illustrating a modification of FIG. 5;

DETAILED DESCRIPTION

Hereinafter, an outline of the present disclosure will be described.

One type of camera modules of the present disclosure is disclosed in Japanese Patent Literature 1, in which a light from an external environment enters a vehicle camera through a lens thereby to image the external environment.

In recent years, camera modules have been required to image a wide range of an external environment to recognize images for advanced driving support or self-driving of a vehicle. To meet the above requirement, it is conceivable to employ a technique to image the external environment through a lens unit having a wide angle of view around an optical axis. However, in the lens unit having the wide angle of view, a depth of field approaches closer when viewed from an occupant of the vehicle. Therefore, a concern arises that a pixel resolution is degraded in a range on the deeper side when viewed from the occupant of the external environment. Therefore, it is conceivable to employ a technique for imaging the external environment by using both a lens unit having a wide angle of view and a lens unit having a narrow angle of view.

Figure 50A:
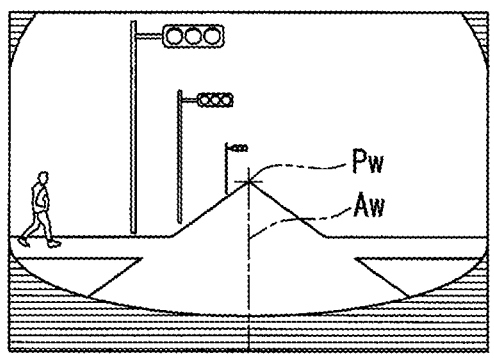
FIG. 50A is a front schematic view showing outside images illustrating an issue.
Figure 50B:
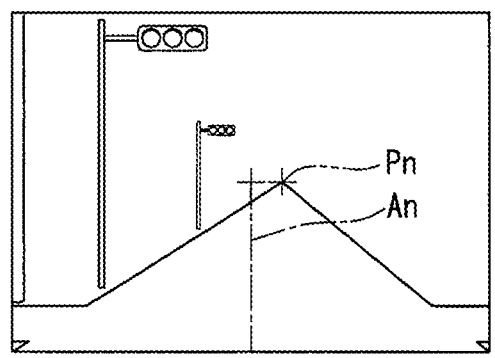
FIG. 50B is another front schematic view showing outside images illustrating an issue.

In the technique using the lenses in combination, in order to enable imaging the external environment in a wide range, each of the lens units is required to be in a placement in which angle of views of the respective lens units overlap with each other. However, depending on the placement relationship of the respective lens units, the optical axes of the lens units are separated from each other in the lateral direction of the vehicle. In this case, as shown in (a) and (b) in FIG. 50, the outside images, which are generated by imaging the external environment individually through the respective lens units, are likely to be greatly shifted in the lateral direction in position coordinates (hereinafter referred to merely as "position coordinates") relative to the optical axes Aw and An of the pixels reflecting the same places Pw and Pn. The camera module for an advanced driving support or a self-driving requires a high image position accuracy in the lateral direction and raises an issue of blind spots of the vehicle in the lateral direction rather than that in the vertical direction. For that reason, in a case where the shift in the positional coordinates between the outside images, which are generated through the respective lens units, increases in the lateral direction, a concern arises that image position accuracy in the lateral direction may decrease.

In addition, as described above, a technique, which uses the lenses in combination and overlaps the angles of view of the respective lens units with each other, enables imaging of the external environment in the wide range. Further, the technique, which uses the lenses in combination, overlaps the depths of field of the respective lens units with each other, thereby to enable to continuously imaging an object moving relatively in an overlapping region of the external environment. However, in a case where image recognition hardly discriminates the relatively moving object in an outside image, which is generated by imaging the external environment individually through the respective lens units, a concern arises that the object is lost in a region where the depths of field overlap with each other.

Incidentally, as an angle of view of the lens unit is wider, excess light incident on each of the lens units further increases. For that reason, it is conceivable to employ a hood. However, the camera module including the hood increases in size depending on a placement relationship of the respective lens units to result in a concern that the large-sized camera module interferes with a field of view of the external environment for a vehicle occupant inside the windshield.

In the technology using the lenses in combination, the axial positions of the respective lens units are different in each vehicle. In such a structure in which the axial positions of the respective lens units are individually determined, the positional relationship of those units likely varies increasingly in the axial direction of the vehicle. In a case where the axial positions of the respective lens units are individually adjusted to reduce the variation at the time of manufacturing the camera module, productivity may be reduced.

As described above, one object of the present disclosure is to provide a camera module having a novel structure capable of imaging the external environment in an image recognizable manner.

Another object of the present disclosure is to provide a camera module to image an external environment through multiple lens units with high image position accuracy in a lateral direction of a vehicle.

Another object of the present disclosure is to provide a camera module to restrict an object from being lost in an outside image that is produced by imaging the external environment through the multiple lens units.

Another object of the present disclosure is to provide a compact camera module having a hood together with multiple lens units.

Another object of the present disclosure is to provide a camera module enabling to secure a positioning precision of multiple lens units in a vehicle. Another object of the present disclosure is to provide a camera module including multiple lens units with a high productivity.

Hereinafter, a technical solution of the present disclosure will be described. It should be noted that reference numerals in parentheses described in this column indicate correspondence with specific means described in embodiments to be described in detail later and do not limit the technical scope of the present disclosure.

According to a first aspect, a camera module (1) is configured to be mounted on an inside of a windshield (3) of a vehicle (2) and to image an external environment (5) of the vehicle. The camera module comprises a plurality of lens units (30, 2030, 3030) having optical axes (Aw, An, At), respectively. The optical axes are shifted from each other. An optical image of the external environment individually enters within angles of view (θw, θn, θt), which are around the optical axes, respectively. The angles of view (θw, θn, θt) are different from each other. The camera module further comprises an imaging system (50) to perform imaging individually through the lens units and to generate an outside image of the external environment. Under a definition that a noted set is a set of the lens units in which angles of view (θw, θn, θt) overlap with each other, the lens units, which belong to the noted set, overlap with each other when viewed in a vertical direction of the vehicle.

According to the first aspect, the lens units of the noted set are configured so that the optical axes are shifted from each other, the angles of view around the optical axes are different from each other, and the angles of view overlap with each other. In the noted sets described above, the optical axes are close to each other in the lateral direction of the vehicle in the placement structure in which the lens units, which belong to the noted set, overlap with each other when viewed in the vertical direction of the vehicle. According to the configuration, large lateral shift unlikely arises in the positional coordinates relative to the optical axes of the pixels, which reflect the same portion, in the generated outside images individually through the respective lens units, which belong to the noted set. Therefore, the configuration enables to enhance image position accuracy in the lateral direction by imaging the external environment through the respective lens units belonging to the noted set.

According to a second aspect, the lens units (30, 2030, 3030), which belong to the noted set, include a wide angle unit (30w, 2030w, 3030w) having an angle of view (θw) defined with the wide angle lens (34w). The lens units (30, 2030, 3030) further include a narrow angle unit (30n, 2030n, 3030n) having an angle of view (θn, θt) narrower than that of the wide angle unit. A far point (Dwf), which defines a depth of recognition field (Dw) of the wide angle unit, is on a deeper side beyond a near point (Dnc), which defines a depth of recognition field (Dn) of the narrow angle unit.

According to the second aspect, the optical axes are close to each other in the lateral direction of the vehicle in the placement structure in which the wide angle unit with the wide angle of view and the narrow angle unit with the narrow angle of view, which are the lens units of the noted set, overlap with each other when viewed in the vertical direction of the vehicle. According to the configuration, large lateral shift unlikely arises in the positional coordinates of the pixels, which reflect the same portion, in the generated outside images individually through the wide angle unit and the narrow angle unit. The outside image passes through the narrow angle unit and the wide angle unit. The wide angle unit has the depth of recognition field, in which the far point is set on the deeper side beyond the near point of the depth of recognition field of the narrow angle unit, to focus the image in a wide range including the overlapping region in those depths of recognition field. In this way, the configuration enables to enhance the image positional accuracy in the lateral direction in imaging of the external environment.

According to a third aspect, the lens units (30, 2030), which belong to the noted set, further include a telescopic unit (30t, 2030t) having an angle of view (Dt) narrower than that of the narrow angle unit (30n, 2030n). A far point (Dnf), which defines a depth of recognition field (Dn) of the narrow angle unit, is on a deeper side beyond a near point (Dtc), which defines a depth of recognition field (Dt) of the telescopic unit.

According to the third aspect, the wide angle unit, the narrow angle unit, and the telescopic unit are the lens units belonging to the noted set. The telescopic unit is narrower in the angle of view than the wide angle unit and the narrow angle unit. The optical axes are close to each other in the lateral direction of the vehicle in the placement structure in which the wide angle unit, the narrow angle unit, and the telescopic unit overlap with each other when viewed in the vertical direction of the vehicle. According to the configuration, large lateral shift unlikely arises in the positional coordinates of the pixels, which reflect the same portion, in the generated outside images individually through the wide angle unit, the narrow angle unit, and the telescopic unit. The narrow angle unit has the depth of recognition field in which the far point is set on the deeper side beyond the near point of the depth of recognition field of the telescopic unit. The wide angle unit has the depth of recognition field as described above. The outside image passes through the telescopic unit, the narrow angle unit, and the wide angle unit to focus the image in a wide range including the overlapping region of the respective two depths of recognition field. In this way, the configuration enables to enhance the image positional accuracy in the lateral direction in imaging of the external environment.

According to a fourth aspect, a camera module (1) is configured to be mounted on an inside of a windshield (3) of a vehicle (2) and to image an external environment (5) of the vehicle. The camera module comprises a plurality of lens units (6030) having optical axes (Aw, An, At), respectively. The optical axes are shifted from each other. An optical image of the external environment individually enters within angles of view (θw, θn, θt), which are around the optical axes, respectively. The angles of view (θw, θn, θt) are different from each other. The camera module further comprises an imaging system (50) to perform imaging individually through the lens units and to generate an outside image of the external environment. The camera module further comprises a hood (6040, 9040) defining an imaging space (410), which is to guide the optical image of the external environment within an imaging target range of the imaging system to the lens units, and to restrict incidence of light on the lens units from an outside of the imaging target range. One of the lens units is a wide angle unit (6030w) having an angle of view (θw) defined with the wide angle lens (34w). An other of the lens units is a narrow angle unit (6030n, 6030t, 7030n, 7030t, 8030n, 8030t) having an angle of view (θn, θt) narrower than that of the wide angle unit. The hood includes: a base wall portion (41, 9041) to be located to face the windshield via the imaging space; and a side wall portion (6043, 9043) raised from the base wall portion at a lateral side of the imaging space and inclined laterally outward correspondingly to an angle of view (θw) of the wide angle unit from a periphery of the wide angle unit toward an external environment side. A narrow angle exposure window (6431n, 6431t) opens in the side wall portion on the external environment side of the wide angle unit and exposes the narrow angle unit to the imaging space.

According to the hood of the fourth aspect, the side wall portions are inclined from the periphery of the wide angle unit toward the external environment side. The side wall portions are inclined according to the angle of view of the wide angle unit on the lateral sides of the imaging space. The imaging space guides the optical image inside the imaging target range to the wide angle unit and the narrow angle unit among the lens units. In this example, the narrow angle exposure window opens in any of the side wall portions on the external environment side of the wide angle unit to expose the narrow angle unit toward the imaging space. According to the configuration, the angle of view of the narrow angle unit falls within the inside of the angle of view of the wide angle unit, which regulates the inclination of the side wall portions, to share the imaging space between both of those units. Therefore, the configuration enables to form the side wall portions, in which the narrow angle exposure window opens, to be inclined within a necessary range for the wide angle unit. In this way, the configuration enables to reduce the size of the camera module including the hood.

According to a fifth aspect, the lens units further include a telescopic unit (6030*t*, 7030*t*, 8030*t*) having an angle of view (θt) narrower than that of the narrow angle unit (6030*n*, 7030*n*, 8030*n*). A telescopic exposure window (6431*t*) opens in the side wall portion on the external environment side beyond the wide angle unit and exposes the telescopic unit to the imaging space.

According to the hood of the fifth aspect, the side wall portions are inclined from the periphery of the wide angle unit toward the external environment side. The side wall portions are inclined according to the angle of view of the wide angle unit on the lateral sides of the imaging space. The imaging space guides the optical image inside the imaging target range to the wide angle unit and the telescopic unit among the lens units. In this example, the telescopic exposure window opens in any of the side wall portions on the external environment side of the wide angle unit to expose the telescopic unit toward the imaging space. According to the configuration, the angle of view of the telescopic unit falls within the inside of the angle of view of the wide angle unit to share the imaging space between both of those units. The wide angle unit regulates the inclination of the side wall portions. Therefore, the configuration enables to confine the side wall portions, in which the telescopic exposure window opens and which are inclined, within a necessary range for the wide angle unit. In this way, the configuration enables to reduce the size of the camera module including the hood.

According to a sixth aspect, a camera module (1) is configured to be mounted on an inside of a windshield (3) of a vehicle (2) and to image an external environment (5) of the vehicle. The camera module comprises a plurality of lens units (30, 2030, 3030) having optical axes (Aw, An, At), respectively. The optical axes are shifted from each other. An optical image of the external environment individually enters within angles of view (θw, θn, θt), which are around the optical axes, respectively. The angles of view (θw, θn, θt) are different from each other. The camera module further comprises an imaging system (50) to perform imaging individually through the lens units and to generate an outside image of the external environment. Under a definition that a noted set is a set of the lens units, in which angles of view (θw, θn, θt) overlap with each other, depths of recognition field (Dw, Dn, Dt) of the lens units, which belong to the noted set, overlap with each other, in which a far point (Dwf, Dnf) of an other of the noted set is between a near point (Dnc, Dtc) and a far point (Dnf, Dtf) of one of the noted set in the external environment, and each of the far point of the one and the far point of the other defines a limit position of image recognition which is implemented by imaging through the corresponding one of the lens units.

According to the sixth aspect, the lens units of the noted set are configured so that the optical axes are shifted from each other, the angles of view around the optical axes are different from each other, and the angles of view overlap with each other. In the external environment, the far point of the depth of recognition field of the other of the lens units of the noted set is set between the near point and the far point of the depth of recognition field of one of the noted set. The configuration forms the region in which those depths of recognition field overlap with each other. The far point of the one of the noted set and the far point of the other of the noted set define limit positions of the image recognition which is implemented by imaging the external environment individually through the respective lens units. The configuration enables to discriminate in image recognition an object, which moves relatively in the overlapping region, in any of the outside images generated through the respective lens units of the noted set, in which the depths of recognition field overlap with each other. Therefore, the configuration enables to restrict an object, which is in the region where the respective depths of recognition field overlap with each other, from being lost in the outside image which is a result of imaging the external environment through the respective lens units of the noted set.

According to a seventh aspect, a camera module (1) is configured to be mounted on an inside of a windshield (3) of a vehicle (2) and to image an external environment (5) of the vehicle. The camera module comprises a plurality of lens units (30, 2030, 3030, 6030, 10030) having optical axes (Aw, An, At), respectively. The optical axes are shifted from each other. An optical image of the external environment individually enters within angles of view (θw, θn, θt), which are around the optical axes, respectively. The angles of view (θw, θn, θt) are different from each other. The camera module further comprises an imaging system (50) to perform imaging individually through the lens units and to generate an outside image of the external environment. The camera module further comprises a camera casing (20) attachable to the windshield and accommodates each of the lens units. The camera module further comprises a common positioning member (10060) commonly provided for the lens units and positioning each of the lens units relative to the camera casing in an axial direction.

According to the seventh aspect, in the vehicle, the respective lens units are accommodated in the camera casing attached to the windshield. The respective lens units are positioned in the axial direction by using the common positioning member common to those units. In this way, the common positioning member enables to reduce variation in the mutual axial positional relationship of the respective lens units in the vehicle. That is, the configuration enables to secure positioning accuracy of the respective lens units in the vehicle. Further, the axial positions of the respective lens units can be adjusted collectively by using the common positioning member. Therefore, productivity can be enhanced.

According to an eighth aspect, the common positioning member includes a reference surface portion (10601) abutting against each of the lens units in the axial direction to position each of the lens units on the same plane.

According to the common positioning member of the eighth aspect, in the vehicle, the reference surface portion abuts against the respective lens units in the axial direction such that all of the units are positioned on the same plane. According to the configuration, in the vehicle, the respective lens units can be precisely positioned on the same plane. Therefore, variation per se in the mutual axial positional relationship hardly arises in the respective lens units. In other words, the respective lens units in the vehicle can be positioned with high accuracy. In addition, the lens units can be easily and collectively positioned in the axial direction by abutting against the reference surface portion on the same plane. Therefore, the configuration enables to promote high productivity.

Hereinafter, multiple embodiments of the present disclosure will be described with reference to the drawings. The same reference numerals are assigned to the corresponding elements in the embodiments, and redundant descriptions thereof may be omitted. When only a portion of a configuration in each embodiment is described, configurations of other embodiments described in advance can be applied to other portions. In addition to the combinations of configurations clearly depicted in the explanation of the embodiments, as long as issues do not particularly arise in a combination, the configurations of multiple embodiments may be partially combined with each other, even when not clearly described.

First Embodiment

Figure 1:
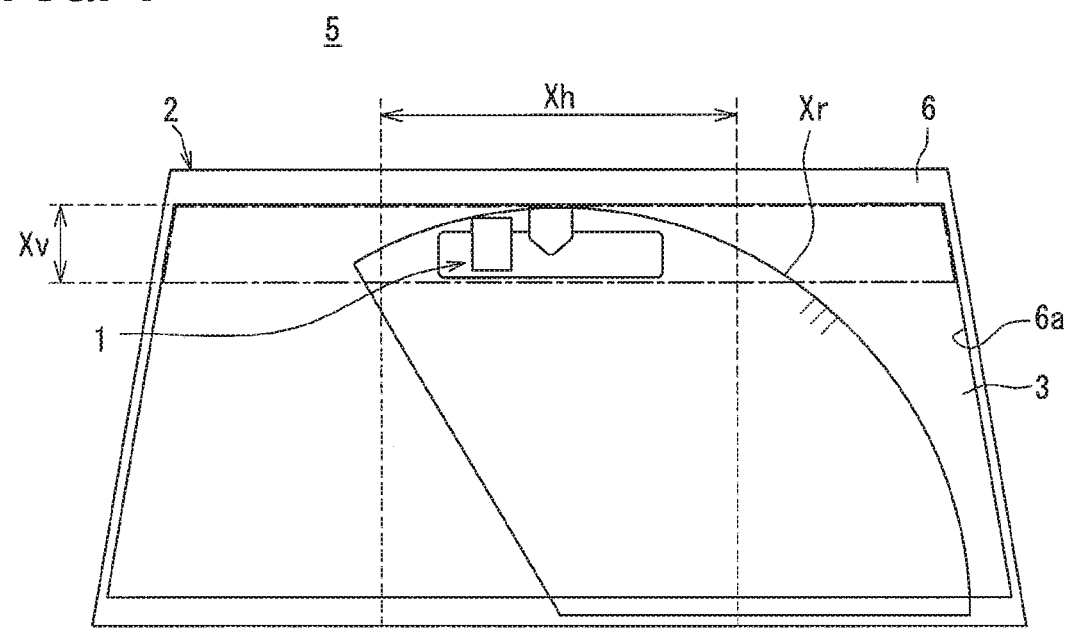
FIG. 1 is a front view illustrating a vehicle to which a camera module is applied according to a first embodiment.
Figure 2:
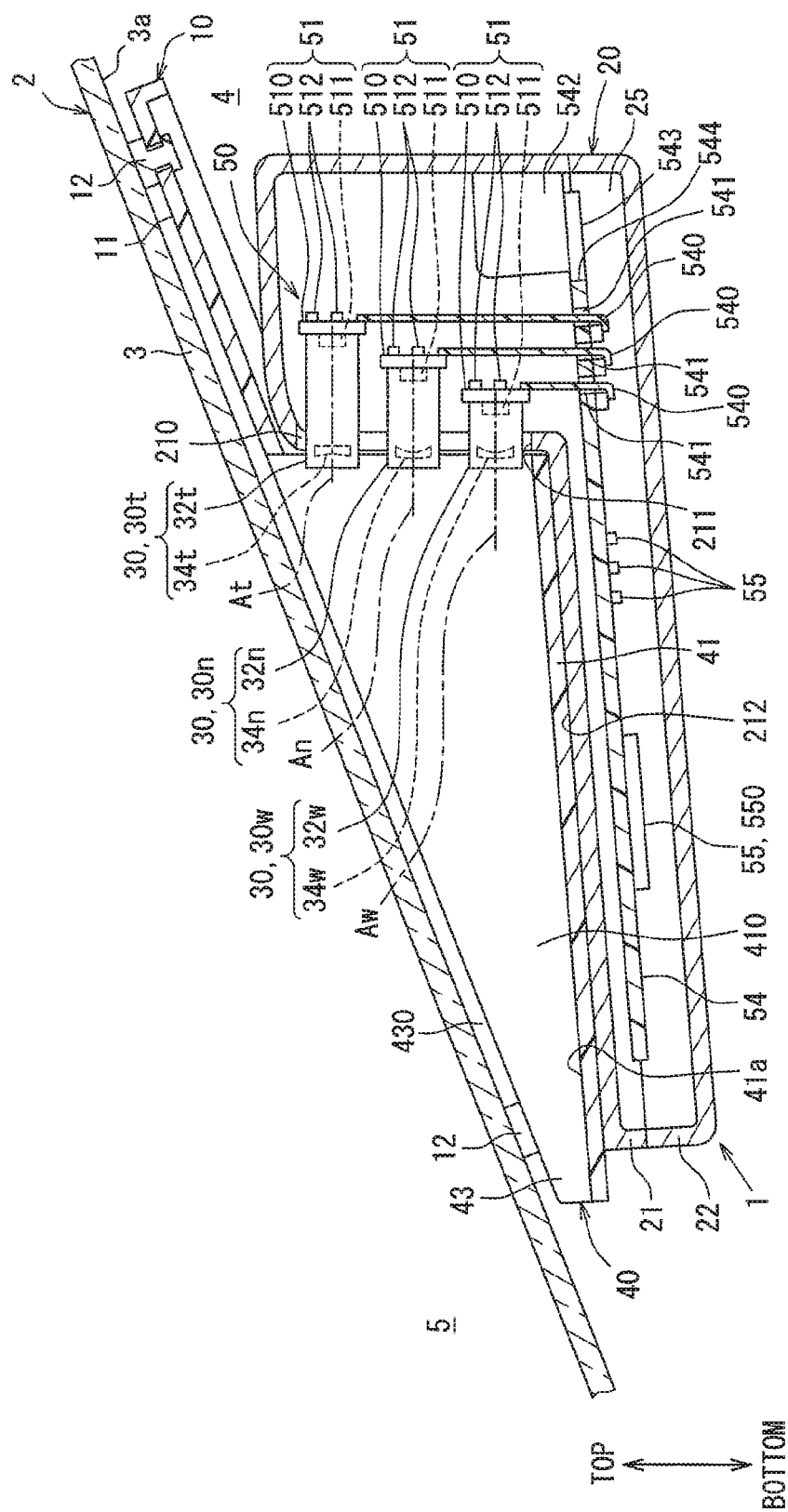
FIG. 2 is a cross-sectional view illustrating the camera module taken along a line II-II in FIG. 5 according to the first embodiment.

As shown in FIGS. 1 and 2, a camera module 1 according to a first embodiment is mounted on a vehicle 2 and is configured to image an external environment 5. In the following description, a vertical direction of the vehicle 2 on a horizontal plane is set to a vertical direction, a vehicle width direction of the vehicle 2 in a horizontal direction of the vehicle 2 on the horizontal plane is set to a lateral direction, and a vehicle longitudinal direction of the vehicle 2 in the horizontal direction is set to a longitudinal direction.

The camera module 1 is mounted on the inside of a front windshield 3 in the vehicle 2. The front windshield 3 is located in front of a driver's seat in the vehicle 2. The front windshield 3 partitions a vehicle compartment 4, which is the inside of the front windshield 3, from the external environment 5. The further the front windshield 3 approaches the lower side, the further the front windshield 3 is inclined toward the front side on the deeper side (that is, toward the external environment 5 side) when viewed from the occupant of the vehicle 2. The front windshield 3 is made of a light transmissive material such as glass to transmit an optical image incident from scenery of the external environment 5 into the vehicle compartment 4.

An installation position of the camera module 1 to the front windshield 3 is set at a position that does not substantially interfere with a field of view of an occupant who is seated on the driver's seat in the vehicle compartment 4. More specifically, as shown in FIG. 1, a vertical installation position is set in the vertical direction within a range Xv, which is, for example, about 20% from an upper edge of an opening window 6a of a pillar 6. Inside the vehicle 2, the pillar 6 is in a frame shape and holds an outer peripheral edge portion of the front windshield 3. A lateral installation position is set in the lateral direction within a range Xh, which is, for example, about 15 cm from a center of the opening window 6a to each of both sides. With those settings, the installation position is located within a wiping range Xr of a windshield wiper that wipes the front windshield 3. In addition, the installation position is located at a portion, at which the front windshield 3 is inclined, for example, by about 22 to 90° with respect to the front and back direction.

Figure 3:
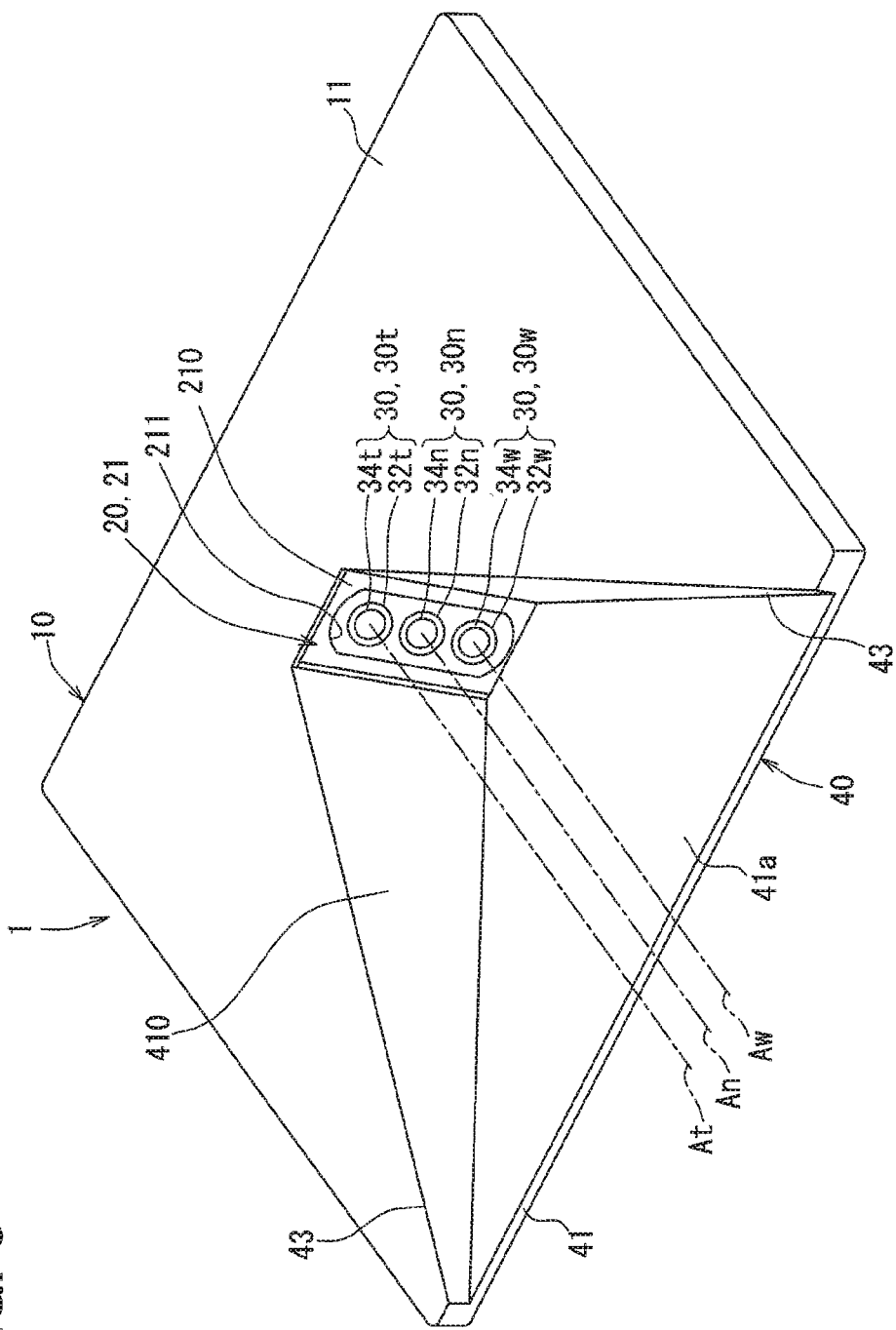
FIG. 3 is a perspective view illustrating a camera module according to the first embodiment.

As shown in FIGS. 2 and 3, the camera module 1 includes a bracket assembly 10, a camera casing 20, multiple lens units 30, a hood 40, and an imaging system 50. In FIG. 3, the components are partially omitted from illustration.

The bracket assembly 10 includes a bracket main body 11 and mounting pads 12 in combination. The bracket main body 11 is made of a relatively easily moldable rigid material such as a resin and is shaped in a substantially plate-like shape as a whole. The bracket main body 11 is placed along an inner surface 3a of the front windshield 3. As shown in FIG. 2, the mounting pads 12 are fitted and fixed to the bracket main body 11. Each of the mounting pads 12 is fixed to the inner surface 3a of the front windshield 3 by adhesion. In this way, the camera module 1 including the bracket assembly 10 is mounted inside the front windshield 3 in a state where being positioned relative to the vehicle 2.

The camera casing 20 includes a pair of casing members 21 and 22. Each of the casing members 21 and 22 is made of a rigid material having a comparatively high heat radiation property such as aluminum and is formed in a hollow shape as a whole.

The reverse cup-shaped upper casing member 21 is located on a lower side of the bracket assembly 10 to direct its opening portion to the lower side opposite to the assembly 10. The upper casing member 21 is fixedly fitted to the bracket main body 11. In this way, the camera casing 20 is positioned inside the front windshield 3 through the bracket assembly 10. The upper casing member 21 and the front windshield 3 in the above positioning posture define an accommodation recess 212 therebetween for accommodating the hood 40.

The dish-shaped lower casing member 22 is located on the lower side of the upper casing member 21 to direct its opening portion toward the upper side which is on the upper casing member 21 side. The lower casing member 22 is fastened to the upper casing member 21 with a screw. In this way, the casing members 21 and 22 define an accommodation space 25 for accommodating the lens units 30 and the imaging system 50 in cooperation with each other.

Figure 4:
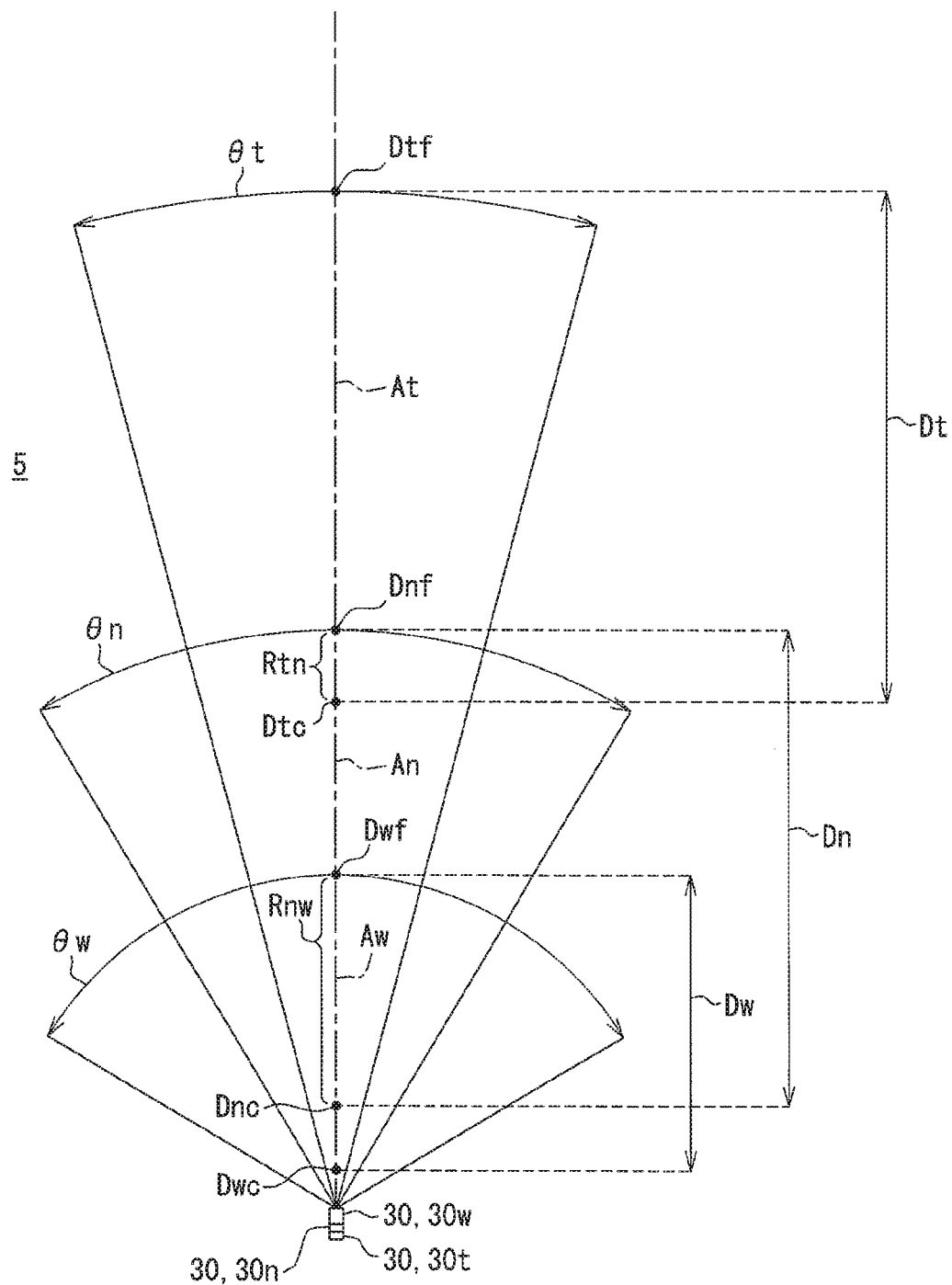
FIG. 4 is a schematic top view illustrating an imaging range of respective lens units according to the first embodiment.

The multiple (in the present embodiment, three) lens units 30 are located in the accommodation space 25 of the camera casing 20. As shown in FIGS. 2 and 3, front ends of the respective lens units 30 are exposed to the outside of the camera casing 20 through a common lens window 211. The common lens window 211 penetrates through a vertical wall portion 210 of the upper casing member 21. In this way, angles of view θw, θn, and θt different in size from each other as shown in FIG. 4 are set around the respective optical axes Aw, An, and At which are shifted from each other in the respective lens units 30. An optical image of the external environment 5 can be incident on the respective lens units 30, individually, into the respective angles of view θw, θn, and θt.

As shown in FIGS. 2 and 3, the hood 40 is formed integrally with the bracket main body 11, for example, by resin molding or the like, thereby forming a part of the bracket assembly 10. The outline of the hood 40 when viewed from the upper side is in a dish shape that is symmetrical in the lateral direction with respect to the optical axes Aw, An, and At of the respective lens units 30. The hood 40 has a base wall portion 41 and side wall portions 43.

As shown in FIG. 2, the base wall portion 41 is accommodated in the accommodation recess 212 between the upper casing member 21 and the front windshield 3. The base wall portion 41 is located in a posture in which the further the base wall portion 41 approaches the front side, the further the base wall portion 41 is closer to the front windshield 3 on the upper side. A bottom wall surface 41a of the base wall portion 41 spreads in a substantially planar shape facing the inner surface 3a of the front windshield 3 via the imaging space 410 on the optical axes Aw, An, and At shown in FIGS. 2 and 3. Under that condition, the optical image of the external environment 5 within the imaging target range of the imaging system 50 is guided from the imaging space 410 to the respective lens units 30 after having passed through the front windshield 3.

The side wall portions 43 are located at bilaterally symmetrical positions with respect to the optical axes Aw, An, and At in the lateral direction to interpose the imaging space 410 therebetween from both lateral sides of the imaging space 410. The respective side wall portions 43 are raised upward from lateral side edges of the base wall portion 41 and are each shaped in a straight plate-like shape. A mutual distance between the respective side wall portions 43 in the lateral direction gradually widens toward the front side. With the configuration, the front ends of the respective lens units 30 are exposed to the imaging space 410 through a portion between rear ends of the respective side wall portions 43. The height of the respective side wall portions 43 from the base wall portion 41 gradually decreases toward the front side. In this way, as shown in FIG. 2, the respective side wall portions 43 are located in a posture to be spaced from the inner surface 3a of the front windshield 3 with a gap 430 in its entire longitudinal region.

With the configuration, the hood 40 defines the imaging space 410 according to the angles of view θw, θn, and θt of the respective lens units 30 to permit incidence of the optical image of the external environment 5, which is inside of the imaging target range, on the respective lens units 30. In addition, the hood 40 defines the imaging space 410 to restrict incidence of excess light on the respective lens units 30 from the external environment 5 outside the imaging target range, for example, incidence of reflected light reflected by the inner surface 3a of the front windshield 3.

The imaging system 50 includes multiple imager units 51 combined with a control board 54 and a control circuit 55. The components 51, 54, and 55 of the imaging system 50 are located in the accommodation space 25 of the camera casing 20.

The (in the present embodiment, three) imager units 51 are positioned on the rear sides of the respective lens units 30 different from each other, individually. In this example, the positions of the respective imager units 51 are shifted from each other in the longitudinal direction according to focal lengths of the respective lens units 30 corresponding to the angles of view θw, θn, and θt which are different from each other. Each of the imager units 51 includes an imaging board 510, an image pickup device 511, and an imaging circuit 512. The imaging board 510 is formed of a rigid circuit board such as a glass epoxy board and is formed in a substantially rectangular plate-like shape. The image pickup device 511 is configured with a color type or monochrome type imager such as a CCD or a CMOS and is mounted on the imaging board 510. The image pickup device 511 has multiple pixels that are arranged in a matrix form along the vertical direction and the lateral direction corresponding to the vertical direction and the horizontal direction of the vehicle 2, which is on the horizontal plane, respectively. The imaging circuit 512 includes multiple circuit elements capable of processing an output of the image pickup device 511 and is mounted on the imaging board 510.

In each of the imager units 51, an optical image transmitted from the external environment 5 through the front windshield 3 is formed on the image pickup device 511 through the corresponding lens unit 30. In each of the imager units 51, the image pickup device 511 captures the optical image formed thereon, and the imaging circuit 512 processes a signal or data output from the image pickup device 511.

The control board 54 is formed of a rigid circuit board such as a glass epoxy board and is formed in a substantially rectangular plate-like shape. The control board 54 is positioned between both the casing members 21 and 22. An external connector 542 is mounted on the control board 54 to be exposed outside the camera casing 20. The external connector 542 is connected to an external circuit such as an ECU outside the camera casing 20. In this example, the external connector 542 is mounted on a protruded substrate portion 543. The protruded substrate portion 543 further protrudes rearward from a rear side edge 544 of the control board 54. Incidentally, although not shown, the protruded substrate portion 543 and the camera casing 20 are located to circumvent a base portion of an inner rearview mirror (including an electronic mirror in this case) in the vehicle compartment 4 according to an installation position of the camera module 1 in the front windshield 3.

The control circuit 55 includes multiple circuit elements including a microcomputer 550 and is mounted on the control board 54. The control circuit 55 is connected to the imaging circuits 512 of the respective imager units 51 via respective individual flexible boards (FPC) 540. In this example, multiple through windows 541 are formed in the control board 54 so that the FPCs 540 are individually inserted through the through windows 541, respectively. In this way, the respective FPCs 540 are connected to the imaging circuits 512 of the respective imager units 51 located on the upper side of the control board 54, and the respective FPCs 540 penetrate through the through window 541 in the vertical direction to be connected to the control circuit 55 on the lower side of the control board 54.

The control circuit 55 controls the imaging operation of the image pickup device 511 in each of the imager units 51 in cooperation with the imaging circuit 512 of the imager unit 51. The imaging operation includes an exposure state during imaging. Further, the control circuit 55 performs image processing on the signal or data output from the image pickup device 511 of each imager unit 51 in cooperation with the imaging circuit 512 of the imager unit 51. The imaging control function and the image processing function enable to generate, as the imaging result through each lens unit 30, the outside image to reflect the external environment 5 in a range of corresponding one of the angles of view θw, θn, and θt of the lens unit 30. At this time, the outside image is generated to recognize an object such as an obstacle or a structure in the angles of view θw, θn, or θt reflected in the outside image. With the configuration, the outside image through each lens unit 30 is produced with the corresponding imager unit 51. Incidentally, at least one of the imaging control function and the image processing function may be provided with only the control circuit 55 or with only the imaging circuit 512 of each imager unit 51.

Figure 6A:
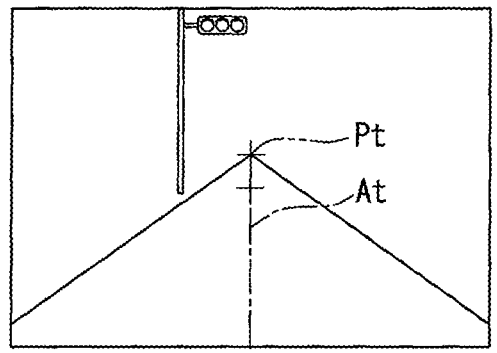
FIG. 6A is a front schematic view illustrating outside images generated by imaging an external environment through a respective lens unit according to the first embodiment.
Figure 6B:
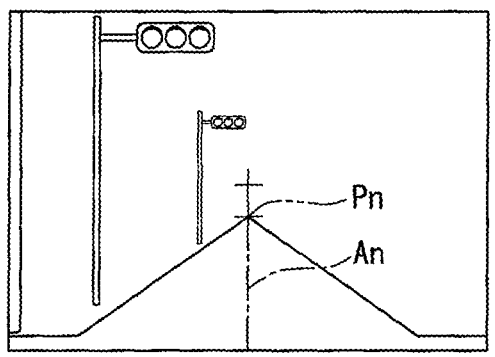
FIG. 6B is another front schematic view illustrating outside images generated by imaging an external environment through a respective lens unit according to the first embodiment.
Figure 6C:
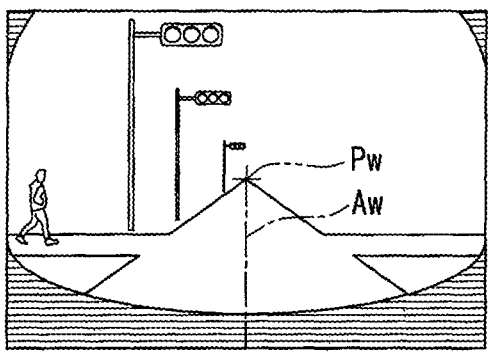
FIG. 6C is yet another front schematic view illustrating outside images generated by imaging an external environment through a respective lens unit according to the first embodiment.

The control circuit 55 also includes an image recognition function for recognizing an object reflected in the outside image. In the image recognition function, the control circuit 55 discriminates the type of the object, for example, whether the obstacle is a pedestrian, a bicycle, another vehicle, or the like or whether the structure is a traffic signal, a traffic sign, a building, or the like. As shown in (a) to (c) in FIG. 6, shifts arise in the positional coordinates of pixels, which reflect the same positions Pw, Pn, and Pt in the outside images generated with the respective lens units 30, with respect to the optical axes Aw, An, and At, respectively. Through the image recognition function, the control circuit 55 corrects the shifts by executing, for example, alignment processing. At this time, specifically, the control circuit 55 corrects the shifts in a case where recognizing the shifts in the positional coordinates at, for example, vanishing points, or the like with respect to the respective optical axes Aw, An, and At in at least one of the vertical direction or the lateral direction. The vanishing points are the same positions Pw, Pn, and Pt (Detailed Structure of Lens Unit)

Next, a detailed structure of the respective lens units 30 will be described.

Figure 5:
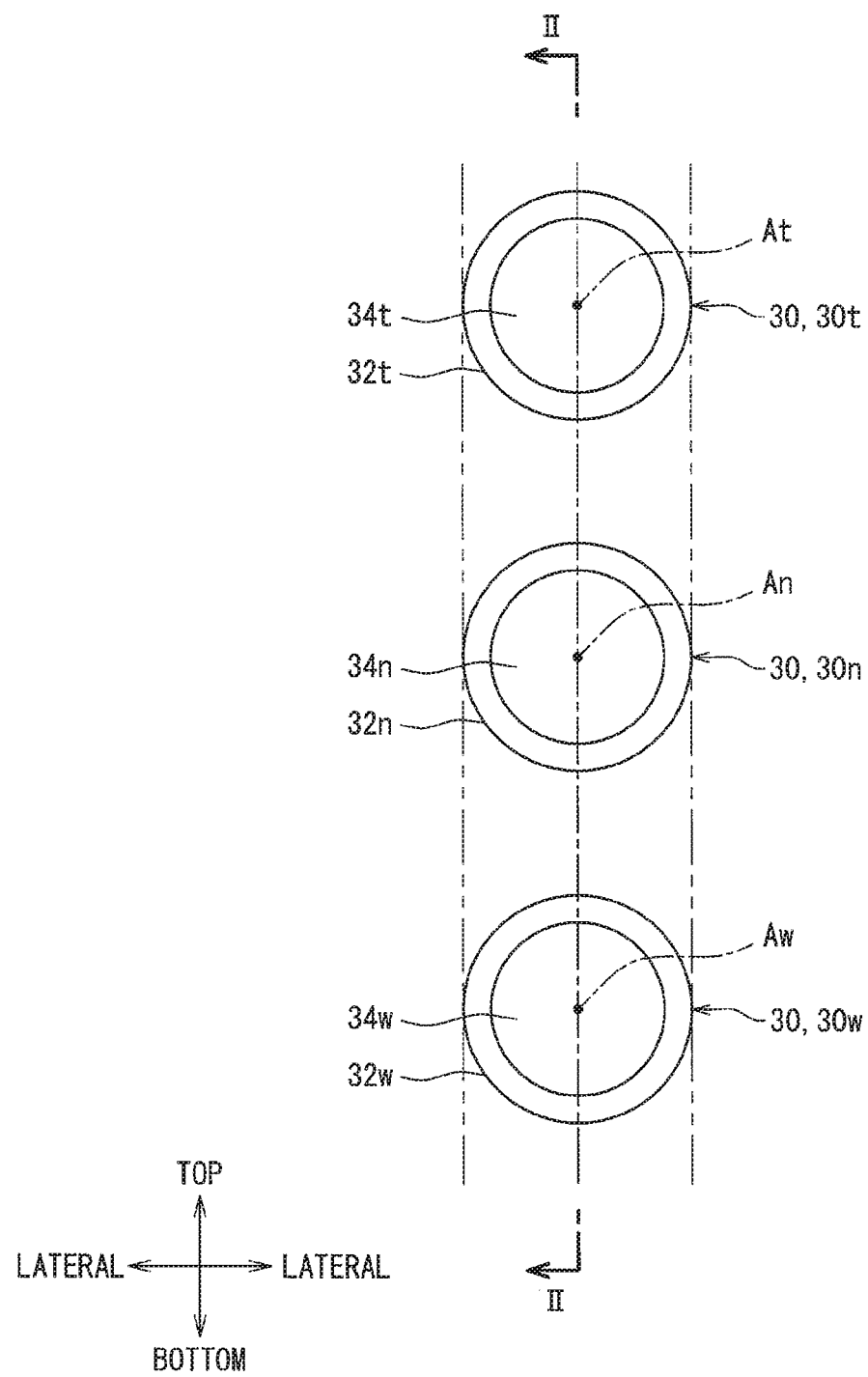
FIG. 5 is a front view illustrating a placement relationship of the respective lens units according to the first embodiment.

As shown in FIGS. 2, 3, and 5, the wide angle unit 30w, which is one of the lens units 30, includes a wide angle lens barrel 32w and a wide angle lens 34w. The wide angle lens barrel 32w is formed in a hollow shape and is made of a relatively moldable rigid material such as a resin. The wide angle lens barrel 32w is fixed to the upper casing member 21 with a screw or adhesive. The wide angle lens 34w is formed in a concave meniscus lens shape and is made of a light transmissive material such as glass. The wide angle lens 34w is accommodated in the wide angle lens barrel 32w together with a rear lens set (not shown) for correcting an optical aberration such as a chromatic aberration. Therefore, the wide angle lens barrel 32w is positioned so that the inner surface 3a of the front windshield 3 is spaced apart from the wide angle lens 34w. The wide angle lens 34w forms the front end of the wide angle unit 30w and is located on the front side of the rear lens set with a specified interval.

The optical axis Aw of the wide angle unit 30w shown in FIGS. 2, 4, and 5 is set to extend obliquely downward or upward with respect to the longitudinal direction or to extend along the longitudinal direction. As shown in FIG. 4, the angle of view θw of the wide angle unit 30w is set to a relatively large angle of, for example, about 120° by using the wide angle lens 34w. However, the angle of view θw may be set to an angle wider than 120°. By using the wide angle lens 34w, the depth of recognition field Dw within the angle of view θw of the wide angle unit 30w is defined by a predetermined range in the external environment 5. This predetermined range is between a near point Dwc, which is on a closer side (hereinafter simply referred to as the closer side) viewed from the occupant of the vehicle 2, and a far point Dwf on a deeper side (hereinafter simply referred to as the deeper side) viewed from the occupant.

As shown in FIGS. 2, 3, and 5, the narrow angle unit 30n, which is another of the lens units 30, includes a narrow angle lens barrel 32n and a narrow angle lens 34n. The narrow angle lens barrel 32n is formed in a hollow shape and is made of a relatively moldable rigid material such as a resin. The narrow angle lens barrel 32n is fixed to the upper casing member 21 with a screw or adhesive. The narrow angle lens 34n is formed in a concave meniscus lens shape and is made of a light transmissive material such as glass. The narrow angle lens 34n is accommodated in the narrow angle lens barrel 32n together with a rear lens set (not shown) for correcting an optical aberration such as a chromatic aberration. Therefore, the narrow angle lens barrel 32n is positioned so that the narrow angle lens 34n is located directly above the wide angle lens 34w substantially without longitudinal shift and lateral shift. The narrow angle lens 34n forms the front end of the narrow angle unit 30n on the front side of the rear lens set. In the configuration, the further the front windshield 3 approaches the front side on the deeper side, the further the front windshield 3 is inclined toward the lower side. The wide angle unit 30w does not substantially protrude from the upper narrow angle unit 30n toward the deeper side.

The optical axis An of the narrow angle unit 30n shown in FIGS. 2, 4, and 5 is set to extend obliquely downward or upward with respect to the longitudinal direction or to extend along the longitudinal direction. In addition, the optical axis An of the narrow angle unit 30n is decentered from the optical axis Aw of the wide angle unit 30w particularly in the substantially vertical direction. In this way, the optical axis An is aligned with the optical axis Aw in the lateral position of the vehicle 2. As shown in FIG. 4, by using the narrow angle lens 34n, the angle of view θn of the narrow angle unit 30n is set to a medium angle which is narrower than the angle of view θw of the wide angle unit 30w. The medium angle is, for example, about 60°. With those settings, the respective angles of view θn and θw of the narrow angle unit 30n and the wide angle unit 30w overlap with each other. By using the narrow angle lens 34n, the depth of recognition field Dn within the angle of view θn of the narrow angle unit 30n is defined by a predetermined range in the external environment 5. This predetermined range is between a near point Dnc on the closer side and a far point Dnf on the deeper side.

More particularly, in the present embodiment, the far point Dwf of the wide angle unit 30w is set on the deeper side beyond the near point Dnc of the narrow angle unit 30n. In addition, in the present embodiment, the near point Dnc of the narrow angle unit 30n is set on the deeper side beyond the near point Dwc of the wide angle unit 30w. Further, in the present embodiment, the far point Dnf of the narrow angle unit 30n is set on the deeper side beyond the far point Dwf of the wide angle unit 30w. With those settings, the far point Dwf of the wide angle unit 30w is positioned between the near point Dnc and the far point Dnf of the narrow angle unit 30n so that the units 30n and 30w form a region Rnw in which the depths of recognition field Dn and Dw overlap with each other.

As shown in FIGS. 2, 3, and 5, a telescopic unit 30t, which is still another of the lens units 30, includes a telescopic lens barrel 32t and a telescopic lens 34t. The telescopic lens barrel 32t is formed in a hollow shape and is made of a relatively moldable rigid material such as a resin. The telescopic lens barrel 32t is fixed to the upper casing member 21 with a screw or adhesive. The telescopic lens 34t is formed in a concave lens shape and is made of a light transmissive material such as glass. The telescopic lens 34t is accommodated in the telescopic lens barrel 32t together with a rear lens set (not shown) for correcting an optical aberration such as a chromatic aberration. Therefore, the telescopic lens barrel 32t is positioned so that the telescopic lens 34t is located directly above the narrow angle lens 34n substantially without longitudinal shift and lateral shift. The telescopic lens 34t forms the front end of the telescopic unit 30t on the front side of the rear lens set. With the configuration, the narrow angle unit 30n does not substantially protrude from the upper telescopic unit 30t toward the deeper side. In addition, the wide angle unit 30w does not substantially protrude from the upper telescopic unit 30t toward the deeper side.

As shown in FIGS. 2, 4, and 5, the optical axis At of the telescopic unit 30t is set to extend obliquely downward or upward with respect to the longitudinal direction or to extend along the longitudinal direction. In addition, the optical axis At of the telescopic unit 30t is decentered from both of the respective optical axes Aw and An of the wide angle unit 30w and the narrow angle unit 30n in the substantially vertical direction. In this way, the optical axis At is aligned with both of the optical axes Aw and An in the lateral position of the vehicle 2. As shown in FIG. 4, by using the telescopic lens 34t, the angle of view θt of the telescopic unit 30t is set to a small angle which is narrower than both of the respective angles of view θw and θn of the wide angle unit 30w and the narrow angle unit 30n. The angle of view θt is, for example, about 35°. With those settings, the respective angles of view θt and θn of the telescopic units 30t and the narrow angle unit 30n overlap with each other. In addition, the respective angles of view θt and θw of the telescopic unit 30t and the wide angle unit 30w also overlap with each other. By using the telescopic lens 34t, the depth of recognition field Dt within the angle of view θt of the telescopic unit 30t is defined by a predetermined range in the external environment 5. This predetermined range is between a near point Dtc on the closer side and a far point Dtf on the deeper side.

More particularly, in the present embodiment, the far point Dnf of the narrow angle unit 30n is set on the deeper side beyond the near point Dtc of the telescopic unit 30t. In addition, in the present embodiment, the near point Dtc of the telescopic unit 30t is set on the deeper side beyond the near point Dnc of the narrow angle unit 30n and the near point Dwc and the far point Dwf of the wide angle unit 30w. Further, in the present embodiment, the far point Dtf of the telescopic unit 30t is set on the deeper side beyond the far point Dnf of the narrow angle unit 30n and the far point Dwf of the wide angle unit 30w. With those settings, the far point Dnf of the narrow angle unit 30n is positioned between the near point Dtc and the far point Dtf of the telescopic unit 30t so that the units 30t and 30n form the region Rtn in which the depths of recognition field Dt and Dn overlap with each other. However, in the present embodiment, the far point Dwf of the wide angle unit 30w is shifted from the near point Dtc and the far point Dtf of the telescopic unit 30t so that the depths of recognition field Dt and Dw of those units 30t and 30w are shifted from each other so as not to overlap with each other.

In the first embodiment described above, the first to fourth noted sets are supposed as the noted sets in which the respective lens units 30 at least partially overlap with each other when viewed in the vertical direction. More specifically, the first noted set includes the wide angle unit 30w and the narrow angle unit 30n which overlap with each other when viewed in the vertical direction. The second noted set includes the wide angle unit 30w and the telescopic unit 30t which overlap with each other when viewed in the vertical direction. The third noted set includes the narrow angle unit 30n and the telescopic unit 30t which overlap with each other when viewed in the vertical direction. The fourth noted set includes the wide angle unit 30w, the narrow angle unit 30n, and the telescopic unit 30t which overlap with each other when viewed in the vertical direction.

The respective units 30w, 30n, and 30t as the lens units 30, which belong to the first to fourth noted sets, satisfy the following Equation 1 with the respective far points Dwf, Dnf, and Dtf as corresponding far points. In this way, limit positions of the image recognition, which is implemented by individually imaging the external environment through the units 30w, 30n, and 30t, are defined by the corresponding far points Dwf, Dnf, and Dtf, respectively.

$$Lf = EFL \cdot Sf/Wf \qquad (Eq. 1)$$

In this example, Lf in Equation 1 represents the distance from each of the units 30w, 30n, and 30t to corresponding one of the corresponding far point Dwf, Dnf, and Dtf. EFL in Equation 1 represents a focal length (in detail, a combined focal point between each of the lens 34w, 34n, 34t and its subsequent lens set) in each of the units 30w, 30n, and 30t. Sf in Equation 1 represents a minimum object size required for image recognition at each of the corresponding far points Dwf, Dnf, and Dtf of corresponding one of the units 30w, 30n, and 30t. The minimum object size Sf is a minimum dimensional value set for each type of the object in each of the horizontal direction and the vertical direction. The minimum object size Sf is the minimum dimensional value, for example, at the corresponding far point Dwf, Dnf, or Dtf required for vehicle control with an external circuit. The minimum dimensional value is presumed in advance. Wf in Equation 1 represents a minimum pixel width required for image recognition with the image pickup device 511 of the imager unit 51 of corresponding one of the units 30w, 30n, and 30t in the imaging system 50. The minimum pixel width Wf is, for example, a pixel width of a number of pixels which are common in the vertical direction and the lateral direction of the image pickup device 511. The minimum pixel width Wf is set to a pixel width of a number of pixels minimally required for image recognition in pattern matching of the outside image generated through the image pickup device 511.

On the other hand, the respective units 30w, 30n, and 30t as the lens units 30, which belong to the first to fourth noted sets, satisfy the following Equation 2 with the respective near points Dwc, Dnc, and Dtc as corresponding near points. In this way, the imaging limit positions, at which the image is focused in imaging the external environment individually through the respective units 30w, 30n, and 30t, are defined by the respective near points Dwc, Dnc, and Dtc.

$$Lc = EFL^2 \cdot Pc/(FNO \cdot D_c) \qquad (Eq. 2)$$

In this example, Lc in Equation 2 represents the distance from each of the units 30w, 30n, and 30t to corresponding one of the corresponding near points Dwc, Dnc, and Dtc. EFL in Equation 2 represents a focal length of each of the units 30w, 30n, and 30t as in the case of Equation 1. Pc in Equation 2 represents a pixel pitch of multiple pixels in the image pickup device 511 of the imager unit 51 corresponding to one of the units 30w, 30n, and 30t of the imaging system 50. The pixel pitch Pc is set to, for example, an arrays pitch of the respective pixels which are common in the vertical direction and the lateral direction of the image pickup device 511. FNO in Equation 2 represents an F number of each of the units 30w, 30n, and 30t. The F number is also referred to as an F value. In detail, the F number is a composite F number of each of the lens 34w, 34n, 34t and its subsequent lens set. Dc in the Equation represents a diameter of a circle of confusion in the image pickup device 511 of the imager unit 51 corresponding to one of the units 30w, 30n, and 30t in the imaging system 50.

(Operational Effects)

The operational effects of the first embodiment described above will be described below.

According to the first embodiment, the lens units 30 of the first to fourth noted sets are configured so that at least two of the angles of view θw, θn, and θt overlap with each other. The angles of view θw, θn, and θt are different from each other and are around the optical axes Aw, An, and At. The optical axes Aw, An, and At are shifted from each other. According to the first to fourth noted sets described above, in the placement structure, the lens units 30, which configure the noted sets, overlap with each other when viewed in the vertical direction of the vehicle 2. In the first to fourth noted sets, at least two of the optical axes Aw, An, and At are in proximity to each other in the lateral direction of the vehicle 2. According to the configuration, as shown in (a) to (c) in FIG. 6, the outside images are generated individually through the respective lens units 30, which belong to the first to fourth noted sets. In the outside images, a large shift in the lateral direction unlikely arises in the positional coordinates of the pixels, which reflect the same portions Pw, Pn, and Pt, relative to the respective optical axes Ax, An, and At. Therefore, the configuration enables to enhance an image position accuracy of imaging the external environment through the respective lens units 30 of the first to fourth noted sets in the lateral direction. Herein, in view of particularly the second noted set, the high image position accuracy described above can be attained by the telescopic unit 30t of the angle of view θ and the wide angle unit 30w of the angle of view θw. The telescopic unit 30t has the angle of view θt narrower than the angle of view θw. The telescopic unit 30t is another narrow angle unit different from the narrow angle unit 30n.

In addition, according to the first to fourth noted sets of the first embodiment, at least two of the optical axes Aw, An, and At of the lens units 30, which belong to the noted sets, are decentered particularly in the vertical direction. According to the configuration, in the respective generated outside images through the respective lens units 30, which configure the first to fourth noted sets, a shift, in particular in the lateral direction, unlikely arises in the positional coordinates of the pixels reflecting the same portions Pw, Pn, and Pt. Therefore, the configuration ensures high image position accuracy in imaging of the external environment with a small shift correction amount in the lateral direction.

Further, according to the first and third noted sets in the first embodiment, two of the depths of recognition field Dw, Dn, and Dt of the lens units 30 overlap with each other to form the overlapping regions Rnw and Rtn when viewed in the vertical direction. The configuration images the external environment through the respective lens units 30, which configure the first and third noted sets, to focus an image in a wide range including the overlapping regions Rnw and Rtn and enables to enhance image position accuracy in the lateral direction.

According to the first embodiment, the optical axes Aw and An are in proximity to each other in the lateral direction with the placement structure in which the wide angle unit 30w with the wide angle of view θw and the narrow angle unit 30n with the narrow angle of view θn as the lens units 30 of the first and fourth noted sets overlap with each other when viewed in the vertical direction. According to the configuration, in the generated outside images individually through the wide angle unit 30w and the narrow angle unit 30n, large lateral shift unlikely arises in the positional coordinates of the pixels reflecting the same portions Pw and Pn. In the configuration, the outside image passes through the narrow angle unit 30n and the wide angle unit 30w. The wide angle unit 30w has the depth of recognition field Dw in which the far point Dwf is set on the deeper side beyond the near point Dnc of the depth of recognition field Dn to focus the image in a wide range including the overlapping region Rnw of those depths of recognition field. In this way, the configuration enables to enhance the image positional accuracy by imaging the external environment in the lateral direction.

According to the first embodiment, the wide angle unit 30w, the narrow angle unit 30n, and the telescopic unit 30t, which is narrower in the angle of view θt than the wide and narrow angle units, as the lens units 30 of the fourth noted set overlap with each other when viewed in the vertical direction. With the placement structure, the optical axes Aw, An, and At are in proximity to each other in the lateral direction. According to the configuration, the outside images are generated individually through the wide angle unit 30w, the narrow angle unit 30n, and the telescopic unit 30t. In the generated outside images, large lateral shift unlikely arises in the positional coordinates of the pixels reflecting the same portions Pw, Pn, and Pt. The configuration causes the outside image to pass through the telescopic unit 30t, the narrow angle unit 30n with the depth of recognition field Dn, and the wide angle unit 30w with the depth of recognition field Dw described above to focus the image in a wide range including the overlapping regions Rtn and Rnw of the respective two of those depths of recognition field. In the depth of recognition field Dn, the far point Dnf is set on the deeper side beyond the near point Dtc of the depth of recognition field Dt. In this way, the configuration enables to enhance the image positional accuracy in the lateral direction in imaging of the external environment.

According to the first embodiment, in the depths of recognition field Dn and Dw of the lens units 30, which configure the first noted set in which the angles of view θn and θw overlap with each other, another far point Dwf is set between one near point Dnc and one far point Dnf in the external environment 5. In this way, the configuration forms the region Rnw in which the depths of recognition field Dn and Dw overlap with each other. One far point Dnf and the other far point Dwf in the first noted set define limit positions of the image recognition which is implemented by imaging the external environment individually through the respective lens units 30. According to the configuration, in the respective lens units 30, depths of recognition field Dn and Dw overlap with each other in the first noted set. In any of the outside images generated through the respective lens units 30, an object moving relatively in the overlapping region Rnw can be discriminated with image recognition. The outside image is a result of imaging the external environment through the respective lens units 30 of the first noted set. The configuration enables to restrict an object in the outside image from being lost in the region Rnw where the respective depths of recognition field Dn and Dw overlap with each other.

In addition, according to the first embodiment, another far point Dnf is set in the depths of recognition field Dt and Dn of the lens units 30, which configure the third noted set in which the angles of view θt and θn overlap with each other. The far point Dnf is set between one near point Dtc and one far point Dtf in the external environment 5, thereby to form the region Rtn in which the depths of recognition field Dt and Dn overlap with each other. One far point Dtf and the other far point Dnf in the third noted set define limit positions of the image recognition which is implemented by imaging the external environment individually through the respective lens units 30. According to the configuration, depths of recognition field Dt and Dn overlap with each other in the third noted set. The configuration with image recognition enables to discriminate the object moving relatively in the overlapping region Rtn in any of the outside images generated through the respective lens units 30. Therefore, the configuration enables to restrict the object in the outside image from being lost in the region Rtn where the respective depths of recognition field Dt and Dn overlap with each other. The outside image is a result of imaging of the external environment through the respective lens units 30 of the third noted set.

Further, according to the first embodiment, the lens units 30, which configure the first and third noted sets, satisfy the above-mentioned Equation 1, with the respective far points Dwf, Dnf, and Dtf as the corresponding far points. According to the configuration, the respective far points Dwf, Dnf, and Dtf in the first and third noted sets can precisely define limit positions of the image recognition. The image recognition is implemented by imaging the external environment through the respective lens units 30. Therefore, in the overlapping regions Rnw and Rtn, reliability of the effect to restrict the loss of an object, which is caused due to an image recognition failure, can be ensured.

Further, according to the first embodiment, the lens units 30, which belong to the first and third noted sets, satisfy the above-mentioned Equation 2 with the respective near points Dwc, Dnc, and Dtc as the corresponding near points. According to the configuration, the respective near points Dwc, Dnc, and Dtc in the first and third noted sets is enabled to precisely define imaging limit positions at which the image is focused by imaging the external environment through the respective lens units 30. Therefore, in the overlapping regions Rnw and Rtn, reliability of the effect to restrict the loss of an object caused by an imaging failure can be ensured.

Second Embodiment

Figure 7:
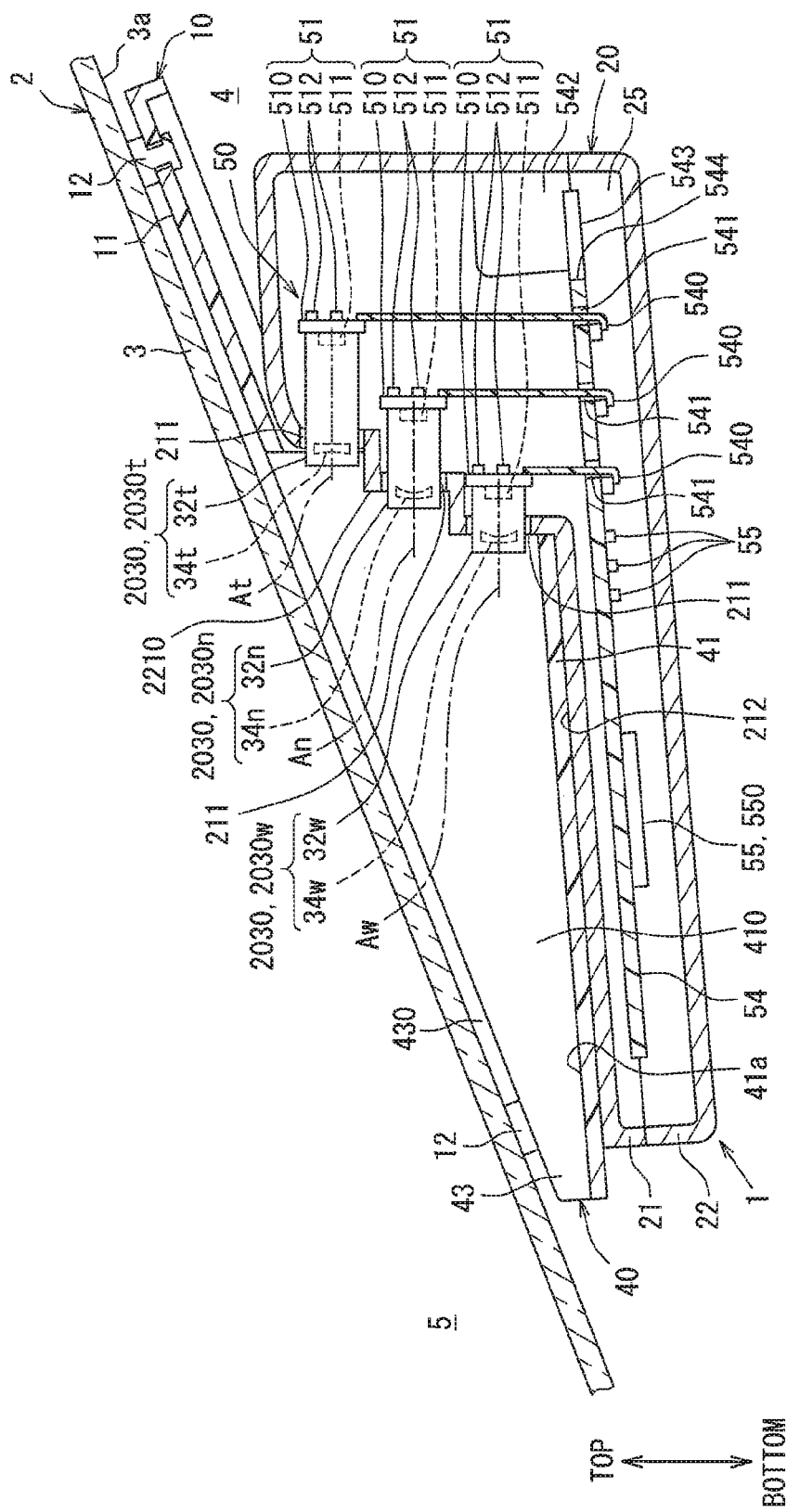
FIG. 7 is a cross-sectional view illustrating a camera module corresponding to FIG. 2 according to a second embodiment.

As shown in FIG. 7, a second embodiment is a modification of the first embodiment. In the second embodiment, a placement relationship of a wide angle unit 2030w, a narrow angle unit 2030n, and a telescopic unit 2030t as lens units 2030 is different from that in the first embodiment.

The narrow angle lens 34n, which forms the front end of the narrow angle unit 2030n, is located without substantial lateral shift on the upper side of the wide angle lens 34w, which forms the front end of the wide angle unit 2030w. The narrow angle lens 34n is shifted toward the rear side of the wide angle lens 34w. In this example, the optical axis An of the narrow angle unit 2030n is decentered from the optical axis Aw of the wide angle unit 2030w particularly in a substantially vertical direction. The configuration aligns those positions with the optical axis Aw in the lateral direction of the vehicle 2. In the configuration, the further the front windshield 3 approaches the front side, the further the front windshield 3 is inclined toward the lower side on the deeper side. The wide angle unit 2030w protrudes toward the deeper side beyond the upper narrow angle unit 2030n.

The telescopic lens 34t, which forms the front end of the telescopic unit 2030t, is located without substantial lateral shift on the upper side of the narrow angle lens 34n. The telescopic lens 34t is shifted toward the rear side of the narrow angle lens 34n. In this example, the optical axis At of the telescopic unit 2030t is decentered from both of the respective optical axes Aw and An of the wide angle unit 2030w and the narrow angle unit 2030n in the substantially vertical direction. The configuration aligns those positions with both of the optical axes Aw and An in the lateral direction of the vehicle 2. In the configuration, the narrow angle unit 2030n and the wide angle unit 2030w protrude toward the deeper side beyond the upper telescopic unit 2030t.

In the second embodiment, a vertical wall portion 2210 of the upper casing member 21 stepwise protrudes in the camera casing 20. The further the vertical wall portion 2210 approaches the lower side, the further the vertical wall portion 2210 stepwise protrudes toward the deeper side on the front side, according to the placement relationship in which the units 2030w, 2030n, and 2030t are shifted in the longitudinal direction. Each of the units 2030w, 2030n, and 2030t separately has the lens window 211, which penetrates through the vertical wall portion 2210 and exposes corresponding one of the units to the outside of the camera casing 20.

In the second embodiment described above, the first to fourth noted sets are supposed as the noted sets in which the respective lens units 2030 at least partially overlap with each other when viewed in the vertical direction. More specifically, the first noted set includes the wide angle unit 2030w and the narrow angle unit 2030n which overlap with each other when viewed in the vertical direction. The second noted set includes the wide angle unit 2030w and the telescopic unit 2030t which overlap with each other when viewed in the vertical direction. The third noted set includes the narrow angle unit 2030n and the telescopic unit 2030t which overlap with each other when viewed in the vertical direction. The fourth noted set includes the wide angle unit 2030w, the narrow angle unit 2030n, and the telescopic unit 2030t which overlap with each other when viewed in the vertical direction.

According to the first and fourth noted sets according to the second embodiment as described above, the further the wide angle unit 2030w approaches the lower side, the further the wide angle unit 2030w protrudes from the upper narrow angle unit 2030n toward the deeper side of the front windshield 3, which is inclined. According to the configuration, the clearance between each of the wide angle unit 2030w and the narrow angle unit 2030n and the front windshield 3 is narrowed as much as possible to cause both of the units to reduce excess light incidence into the angles of view θw and θn through the clearance. In addition, the wide angle unit 2030w protrudes toward the deeper side beyond the narrow angle unit 2030n. The configuration enables to restrict the narrow angle unit 2030n from entering the wide angle of view θw of the wide angle unit 2030w. From the above viewpoint, the configuration enables to enhance the image position precision in imaging of the external environment in the lateral direction through the wide angle unit 2030w and the narrow angle unit 2030n, without restriction due to excess light and interference of both of those units with each other.

In the second and fourth noted sets according to the second embodiment, the further the front windshield 3 approaches the lower side, the further the front windshield 3 is inclined toward the deeper side. The wide angle unit 2030w protrudes from the upper telescopic unit 2030t toward the deeper side of the front windshield 3. According to the configuration, the clearance between each of the wide angle unit 2030w and the telescopic unit 2030t and the front windshield 3 is narrowed as much as possible to cause both of the units to reduce to reduce excess light incidence into the angles of view θw and θt through the clearance. In addition, the wide angle unit 2030w protrudes toward the deeper side beyond the telescopic unit 2030t. Therefore, the configuration enables to restrict the telescopic unit 2030t from entering the wide angle of view θw of the wide angle unit 2030w. From the above viewpoint, the configuration enables to enhance the image position precision in imaging of the external environment in the lateral direction through the wide angle unit 2030w and the telescopic unit 2030t, without restriction due to excess light and interference of both of those units with each other. In particular, in view of particularly the second noted set, the external environment imaging described above can be attained with the telescopic unit 2030$t$, in which the angle of view θt is narrower than the angle of view θw, and the wide angle unit 2030$w$ of the angle of view θw. The telescopic unit 2030$t$ is another narrow angle unit than the narrow angle unit 2030$n$.

According to the third and fourth noted sets according to the second embodiment, the narrow angle unit 2030$n$ protrudes from the upper telescopic unit 2030$t$ toward the deeper side of the front windshield 3. The further the front windshield 3 approaches the lower side, the further the front windshield 3 is inclined toward the deeper side. According to the configuration, the clearance between each of the narrow angle unit 2030$n$ and the telescopic unit 2030$t$ and the front windshield 3 is narrowed as much as possible to cause both of the units to reduce excess light incidence into the angles of view θn and θt through the clearance. In addition, the narrow angle unit 2030$n$ protrudes toward the deeper side beyond the telescopic unit 2030$t$. Therefore, the configuration enables to restrict the telescopic unit 2030$t$ from entering the angle of view θn of the narrow angle unit 2030$n$. From the above viewpoint, the configuration enables to enhance the image position precision in imaging of the external environment in the lateral direction through the narrow angle unit 2030$n$ and the telescopic unit 2030$t$, without restriction due to excess light and interference of both of the units with each other. In particular, in the fourth noted set, the telescopic unit 2030$t$ can be restricted from entering not only the inside of the wide angle of view θw but also the inside of the angle of view θn; the angle of view θn is narrower than the angle of view θw but wider than the angle of view θt of the telescopic unit 2030$t$. Therefore, the configuration enables to produce the external environment imaging through all of the units.

Incidentally, the wide angle unit 2030$w$, the narrow angle unit 2030$n$, and the telescopic unit 2030$t$ of the second embodiment are substantially identical to corresponding ones of the first embodiment in the wide angle unit 30$w$, the narrow angle unit 30$n$, and the telescopic unit 30$t$ except for the configurations described above. More particularly, even in the second embodiment in which the longitudinal positions of the respective units 2030$w$, 2030$n$, and 2030$t$ are shifted, the depths of recognition field Dw, Dn, and Dt are set in the same manner as that in the first embodiment. From the above viewpoints, the first to fourth noted sets according to the second embodiment enable to produce the same operational effects as those in the first to fourth noted sets of the first embodiment.

Third Embodiment

Figure 8:
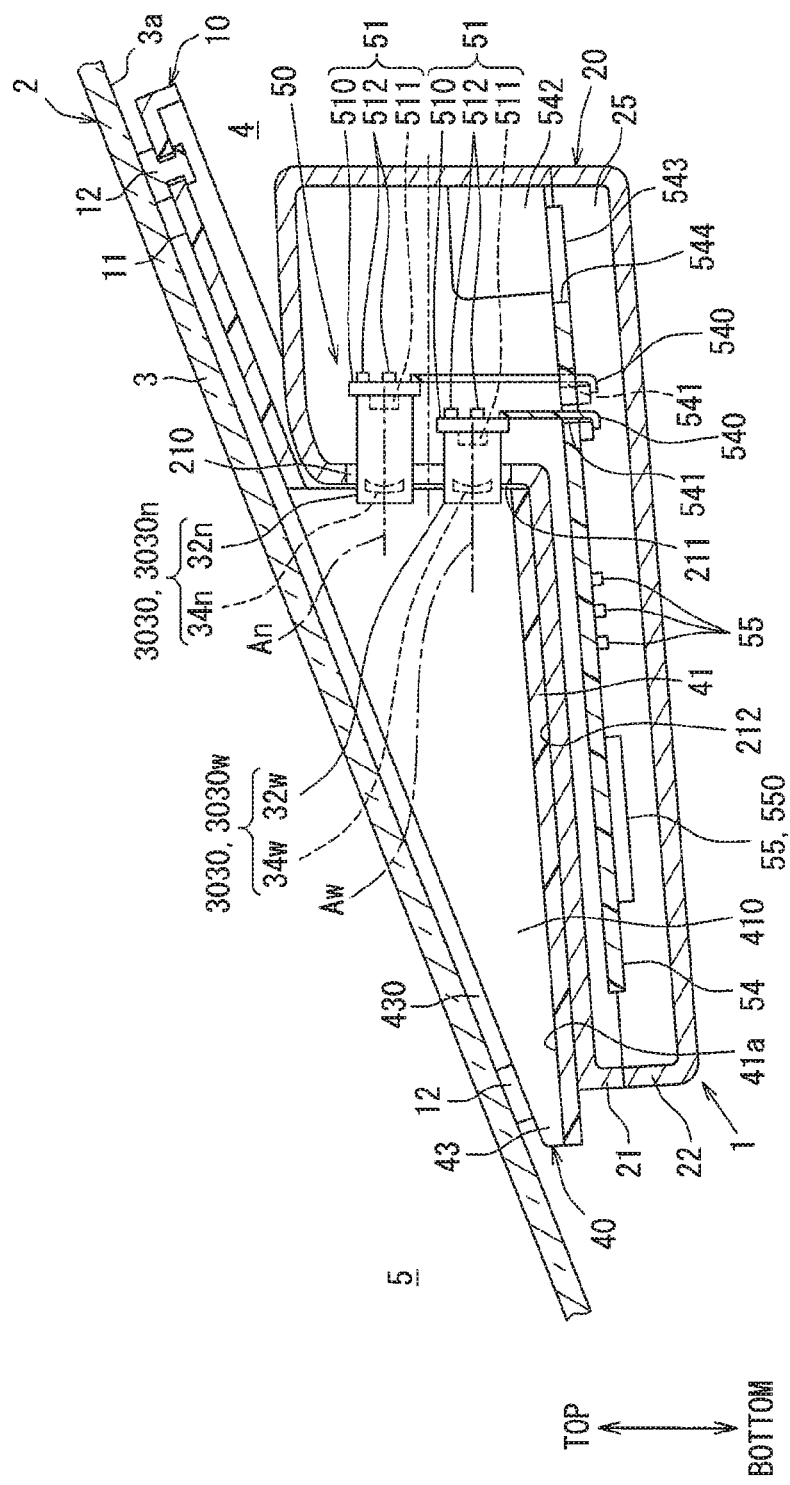
FIG. 8 is a cross-sectional view illustrating a camera module taken along a line VIII-VIII of FIG. 10 according to a third embodiment.
Figure 9:
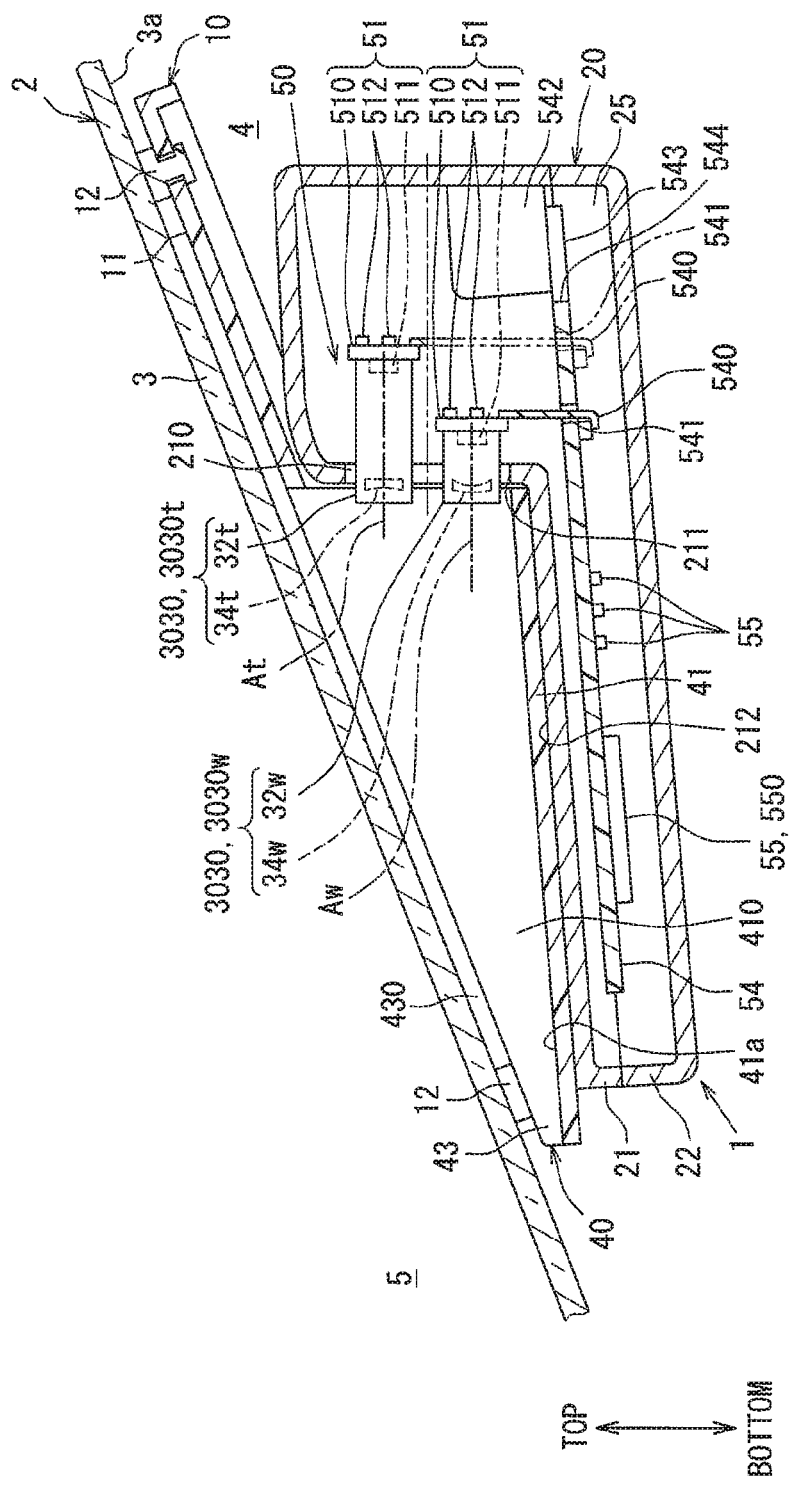
FIG. 9 is a cross-sectional view illustrating the camera module taken along a line IX-IX in FIG. 10 according to the third embodiment.
Figure 10:
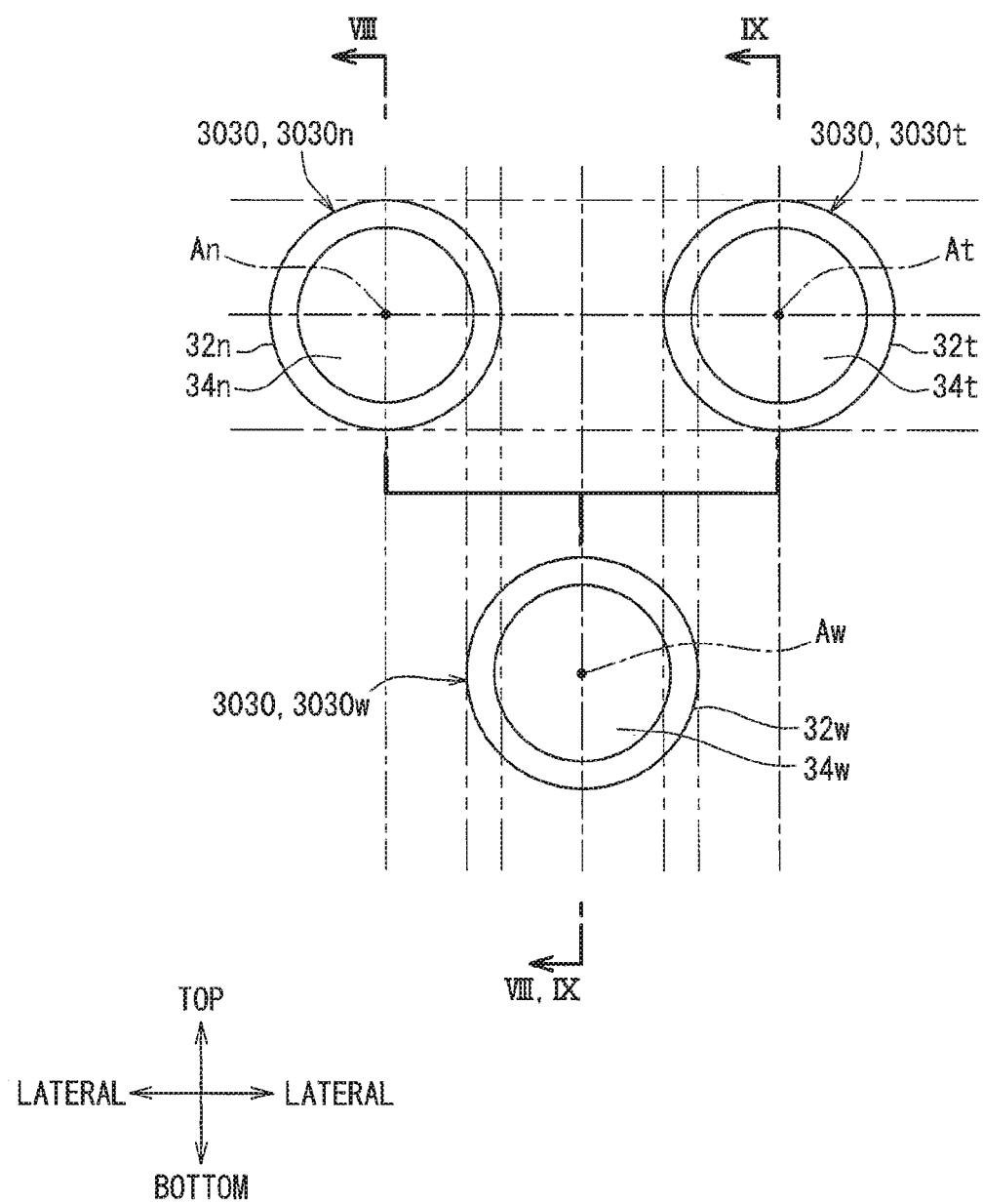
FIG. 10 is a front view illustrating a placement relationship of the respective lens units according to the third embodiment.

As illustrated in FIGS. 8 to 10, a third embodiment is a modification of the first embodiment. In the third embodiment, a placement relationship of a ide angle unit 3030$w$, a narrow angle unit 3030$n$, and a telescopic unit 3030$t$ as lens units 3030 is different from that in the first embodiment.

As shown in FIGS. 8 and 10, the narrow angle lens 34$n$, which forms the front end of the narrow angle unit 3030$n$, is located without substantial longitudinal shift on the upper side of the wide angle lens 34$w$, which forms the front end of the wide angle unit 3030$w$. The narrow angle lens 34$n$ is shifted toward one side (that is, the left side in FIG. 10) in the lateral direction from the wide angle lens 34$w$. In this example, the optical axis An of the narrow angle unit 3030$n$ is decentered in both of the vertical direction and the lateral direction from the optical axis Aw of the wide angle unit 3030$w$. With the configuration, the wide angle unit 2030$w$ does not substantially protrude from the upper narrow angle unit 2030$n$ toward the deeper side; the further the front windshield 3 approaches the lower side, the further the front windshield 3 is inclined toward the front side on the deeper side.

As shown in FIGS. 9 and 10, the telescopic lens 34$t$, which forms the front end of the telescopic unit 3030$t$, is located without substantial longitudinal shift on the upper side of the wide angle lens 34$w$. However, the telescopic lens 34$t$ is shifted toward the other side from the wide angle lens 34$w$ in the lateral direction (that is, the right side in FIG. 10 opposite to the narrow angle unit 3030$n$). In this example, the optical axis At of the telescopic unit 3030$t$ is decentered in both of the vertical direction and the lateral direction from the optical axis Aw of the wide angle unit 3030$w$. In addition, the optical axis At of the telescopic unit 30$t$ is decentered from the optical axis An of the narrow angle unit 3030$n$ particularly in the substantially lateral direction. In this way, the configuration aligns the optical axis At with the optical axis An in the vertical position the vehicle 2. In the configuration, the wide angle unit 3030$w$ does not substantially protrude from the upper telescopic unit 3030$t$ and the lateral narrow angle unit 3030$n$ toward the deeper side.

In the first embodiment described above, the first and second noted sets are supposed as the noted sets in which the respective lens units 3030 at least partially overlap with each other when viewed in the vertical direction. The third noted set is supposed as the noted set in which the lens units 3030 overlap with each other when viewed in the lateral direction. More specifically, the first noted set includes the wide angle unit 3030$w$ and the narrow angle unit 3030$n$ which overlap with each other when viewed in the vertical direction. The second noted set includes the wide angle unit 3030$w$ and the telescopic unit 3030$t$ which overlap with each other when viewed in the vertical direction. The third noted set includes the narrow angle unit 3030$n$ and the telescopic unit 3030$t$ which overlap with each other when viewed in the lateral direction.

In the first and second noted sets according to the third embodiment, the respective two of the optical axes Aw, An, and At of the lens units 3030 overlap with each other when viewed in the vertical direction and are decentered in both of the vertical direction and the lateral direction. The configuration restricts the lateral shift in the position coordinates of the pixels, which reflect the same places Pw, Pn, and Pt in the respective outside images generated through the respective lens units 3030. In addition, even though the physical size increases in the vertical direction due to the restriction in the lateral shift, the configuration enables to ensure the degree of freedom of placement for reducing, for example, the increase in the physical size; the respective lens units 3030 configure the first and second noted sets. Therefore, the configuration enables to secure high image position accuracy in the lateral direction while securing the field of view of an unprescribed occupant in the vehicle 2 in the vertical direction. In particular, in view of particularly the second noted set, the telescopic unit 3030$t$ of the angle of view θt, which is narrower than the angle of view θw, and the wide angle unit 3030$w$ of the angle of view θw enable to secure the field of view and to ensure the accuracy described above; the telescopic unit 3030$t$ is another narrow angle unit than the narrow angle unit 3030$n$.

Further, according to the third embodiment, the narrow angle unit 3030$n$ belongs to the first noted set, and the telescopic unit 3030$t$ belongs to the second noted set. The narrow angle unit 3030$n$ and the telescopic unit 3030$t$ belong to the third noted set different from the first noted set and the second noted set. The narrow angle unit 3030n and the telescopic unit 3030t overlap with each other when viewed in the lateral direction. In addition, the optical axes An and At of both the units are decentered from each other in the lateral direction. The configuration enables to enhance the effect to secure the occupant's field of view while inhibiting the increase in the physical size in the vertical direction, which is caused by the restriction in the lateral shift, as much as possible.

Incidentally, the wide angle unit 3030w, the narrow angle unit 3030n, and the telescopic unit 3030t according to the third embodiment are substantially identical to corresponding ones in the wide angle unit 30w, the narrow angle unit 30n, and the telescopic unit 30t of the first embodiment except for the configurations described above. More particularly, in the third embodiment, the narrow angle unit 3030n and the telescopic unit 3030t are aligned side by side on the upper side of the wide angle unit 3030w. Even in the configuration, the depths of recognition field Dw, Dn, and Dt are set in the same manner as those in the first embodiment. From the above viewpoints, the first and second noted sets according to the third embodiment enable to produce the same operational effects as those in the first and second noted sets of the first embodiment.

Fourth Embodiment

Figure 11:
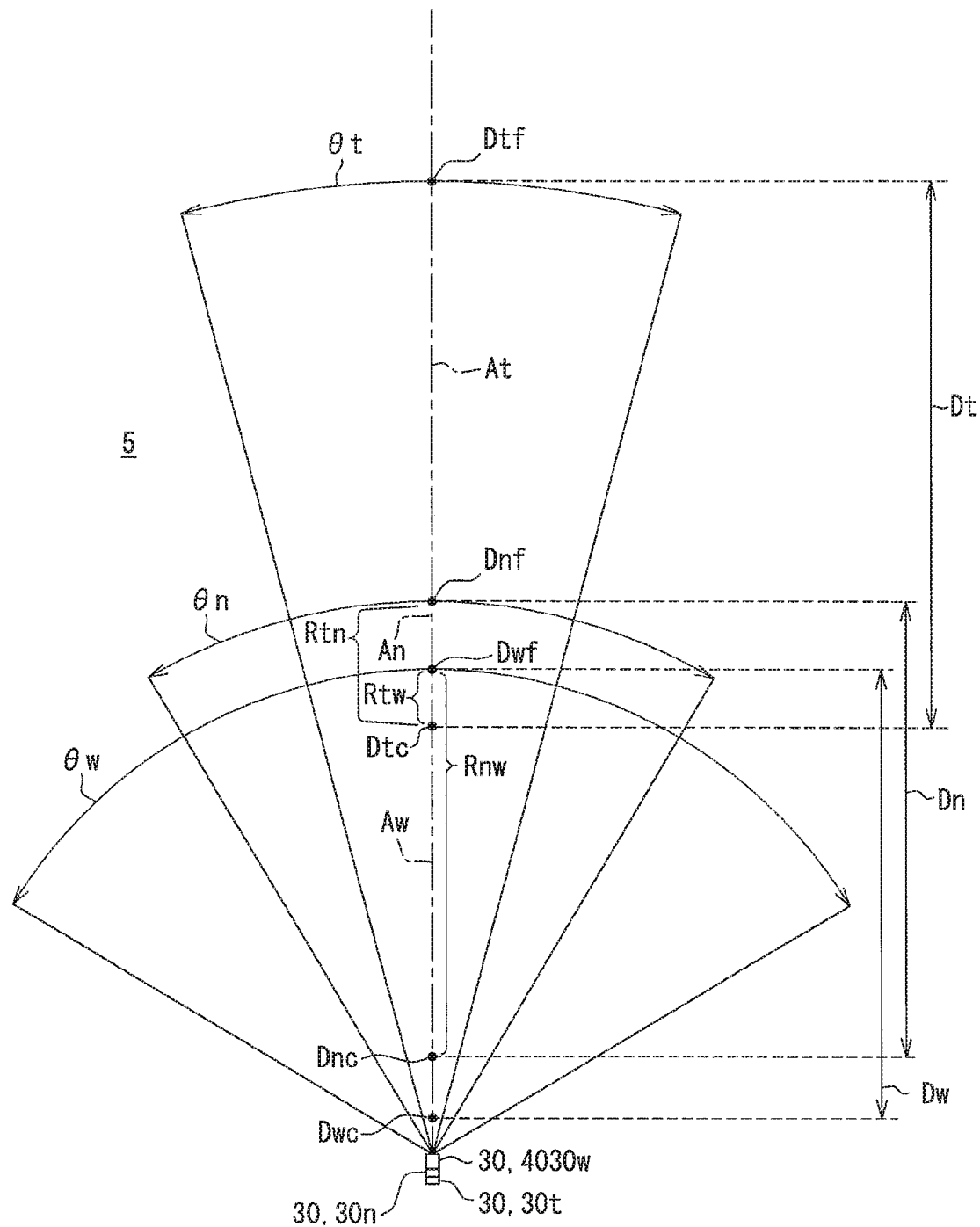
FIG. 11 is a schematic top view illustrating an imaging range of respective lens units according to the fourth embodiment.

As shown in FIG. 11, a fourth embodiment is a modification of the first embodiment. In the fourth embodiment, the setting of the depth of recognition field Dw for a wide angle unit 4030w of the lens units 30 is different from that in the first embodiment.

The far point Dwf of the wide angle unit 4030w defines the depth of recognition field Dw within the wide angle of view θw. The far point Dwf is set on the deeper side beyond the near point Dtc of the telescopic unit 30t. The near point Dtc defines the depth of recognition field Dt within the angle of view θt which is narrower than the angle of view θw. In addition, the far point Dwf of the wide angle unit 4030w is set on the closer side of the far point Dtf of the telescopic unit 30t. With those settings, the far point Dwf of the wide angle unit 4030w is positioned between the near point Dtc and the far point Dtf of the telescopic unit 30t. In this way, the units 30t and 4030w form the region Rtw in which the depths of recognition field Dt and Dw overlap with each other. In the fourth embodiment described above, in particular, the second noted set includes the wide angle unit 4030w and the telescopic unit 30t which overlap with each other when viewed in the vertical direction as in the first embodiment.

Further, according to the second noted set in the fourth embodiment, the respective depths of recognition field Dt and Dw of the lens units 30 overlap with each other when viewed in the vertical direction and form an overlapping region Rtw. The configuration focuses the image in a wide range including the overlapping region Rtw and images the external environment through the respective lens units 30, which belong to the second noted set. In this way, the configuration enables to enhance image position accuracy in the lateral direction.

According to the fourth embodiment, the wide angle unit 4030w with the wide angle of view θw and the telescopic unit 30t with the narrow angle of view θt, which are the lens units 30 of the second noted set, overlap with each other when viewed in the vertical direction. With the placement structure, the optical axes Aw and An are in proximity to each other in the lateral direction. According to the configuration, in the generated outside images through the wide angle unit 4030w and the telescopic unit 30t, a large shift unlikely arises in the positional coordinates of the pixels, which reflect the same portions Pw and Pt, in the lateral direction. In the depth of recognition field Dw, the far point Dwf is set on the deeper side beyond the near point Dtc of the depth of recognition field Dt. Therefore, the configuration enables to focus the outside image through the telescopic unit 30t and the wide angle unit 4030w in a wide range including the overlapping region Rtw of those depths of recognition field. In this way, the configuration enables to enhance the image positional accuracy in imaging of the external environment in the lateral direction. As described above, in the fourth embodiment, the telescopic unit 2030t is another narrow angle unit than the narrow angle unit 30n. The second noted set includes the telescopic unit 2030t, in which the angle of view θt is narrower than the angle of view θw, and the wide angle unit 4030w of the angle of view θw. The second noted set enables to produce the external environment imaging described above.

Incidentally, the wide angle unit 4030w of the fourth embodiment is substantially identical to the wide angle unit 30w of the first embodiment except for the configurations described above. Therefore, the first to fourth noted sets according to the fourth embodiment enable to produce the same operational effects as those in the first to fourth noted sets of the first embodiment.

Fifth Embodiment

Figure 12:
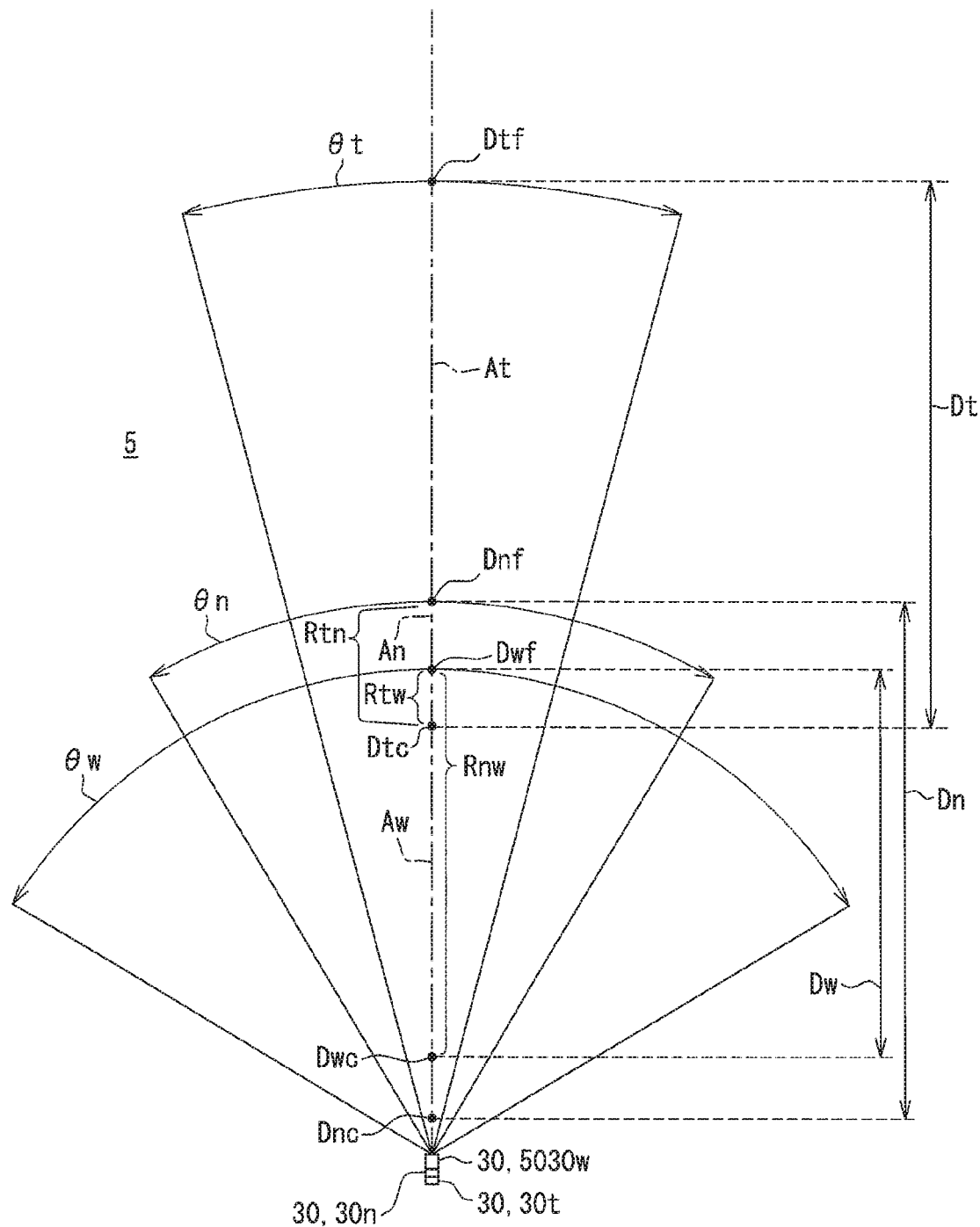
FIG. 12 is a schematic top view illustrating an imaging range of respective lens units according to a fifth embodiment.

As shown in FIG. 12, a fifth embodiment is a modification of the fourth embodiment. In the fifth embodiment, the setting of the depth of recognition field Dw for a wide angle unit 5030w of the lens units 30 is different from that in the fourth embodiment.

The wide angle unit 5030w defines the depth of recognition field Dw within the wide angle of view θw. The narrow angle unit 30n defines the depth of recognition field Dn within the angle of view θn narrower than the angle of view θw. The near point Dwc of the wide angle unit 5030w is set on the deeper side beyond the near point Dnc of the narrow angle unit 30n. In addition, the far point Dwf of the wide angle unit 5030w is set on the closer side of the far point Dnf of the narrow angle unit 30n. With those settings, both of the near point Dwc and the far point Dwf of the wide angle unit 5030w are positioned between the near point Dnc and the far point Dnf of the narrow angle unit 30n. In this way, the units 30n and 5030w form the region Rnw in which the depths of recognition field Dn and Dw overlap with each other. In the fifth embodiment described above, in particular, the second noted set includes the wide angle unit 5030w and the telescopic unit 30t which overlap with each other when viewed in the vertical direction as in the fourth embodiment.

The wide angle unit 5030w of the fifth embodiment is substantially identical to the wide angle unit 4030w of the fourth embodiment except for the configurations described above. Therefore, the first to fourth noted sets according to the fifth embodiment enable to produce the same operational effects as those in the first to fourth noted sets according to the fourth embodiment.

Sixth Embodiment

As illustrated in FIGS. 13 to 18, a sixth embodiment is a modification of the first embodiment. In the sixth embodiment, a placement relationship of a wide angle unit 6030w, a narrow angle unit 6030n, and a telescopic unit 6030t as lens units 6030 is different from that in the first embodiment.

As shown in FIGS. 13, 14, 16, and 18, the narrow angle lens 34n, which forms the front end of the narrow angle unit 6030n, is located without substantial vertical shift from the wide angle lens 34w, which forms the front end of the wide angle unit 6030w. The narrow angle lens 34n is shifted from the wide angle lens 34w on the front end and one side (that is, a left side in FIG. 18) in the lateral direction as the external environment 5 side. In this example, the optical axis An of the narrow angle unit 6030n is decentered substantially in the lateral direction from the optical axis Aw of the wide angle unit 6030w.

Figure 15:
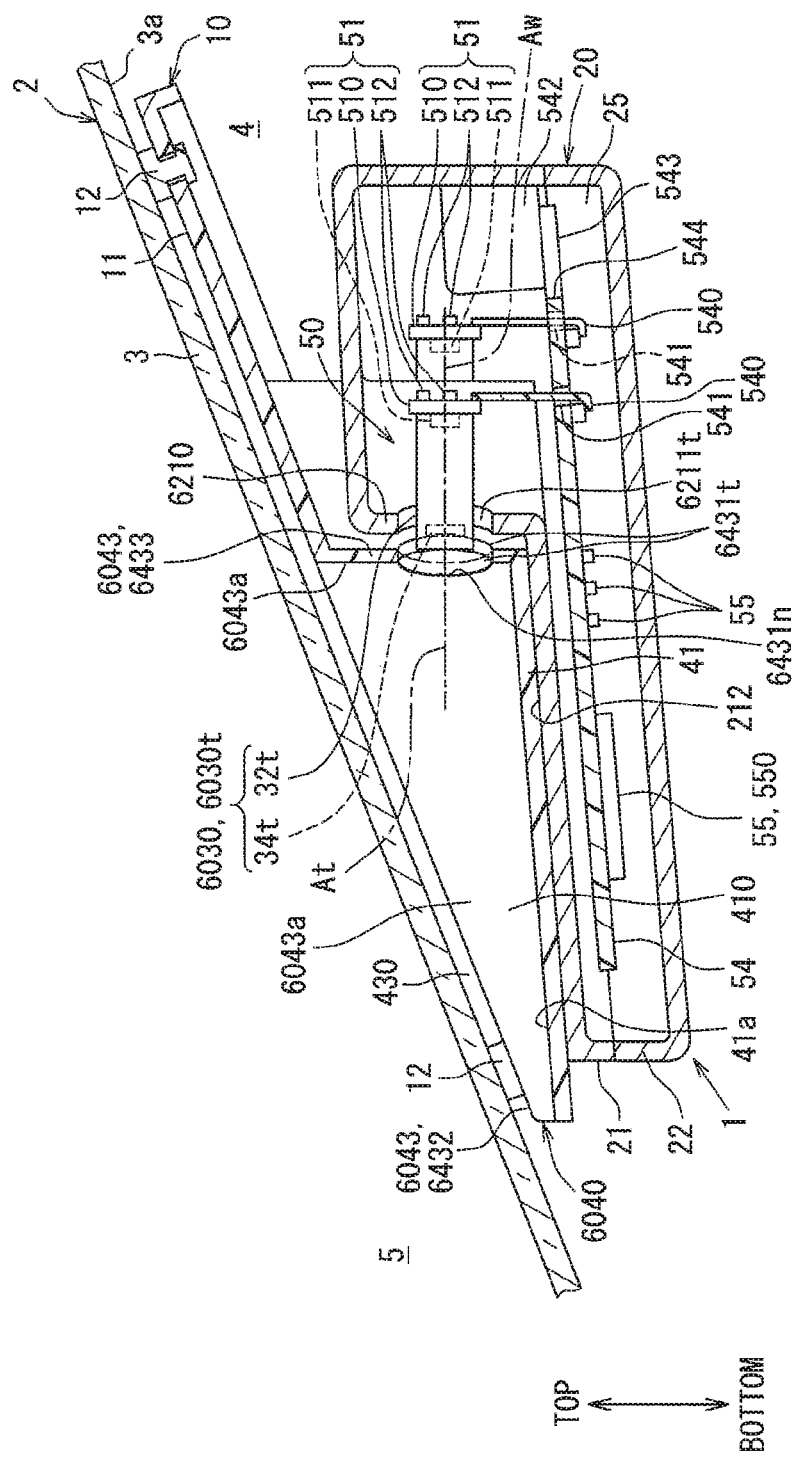
FIG. 15 is a cross-sectional view illustrating the camera module taken along a line XV-XV of FIG. 18 according to the sixth embodiment.
Figure 16:
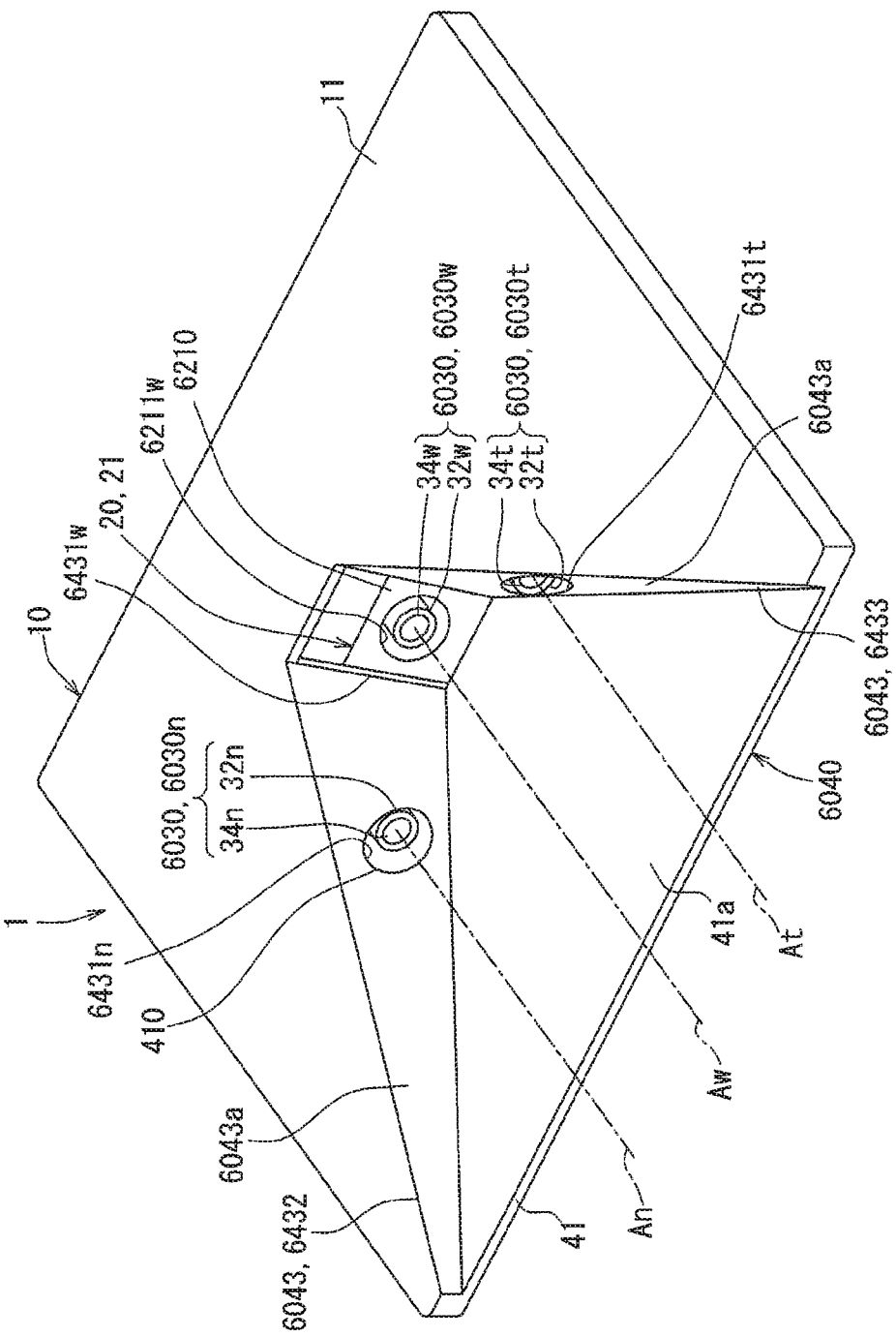
FIG. 16 is a perspective view illustrating the camera module according to the sixth embodiment.
Figure 18:
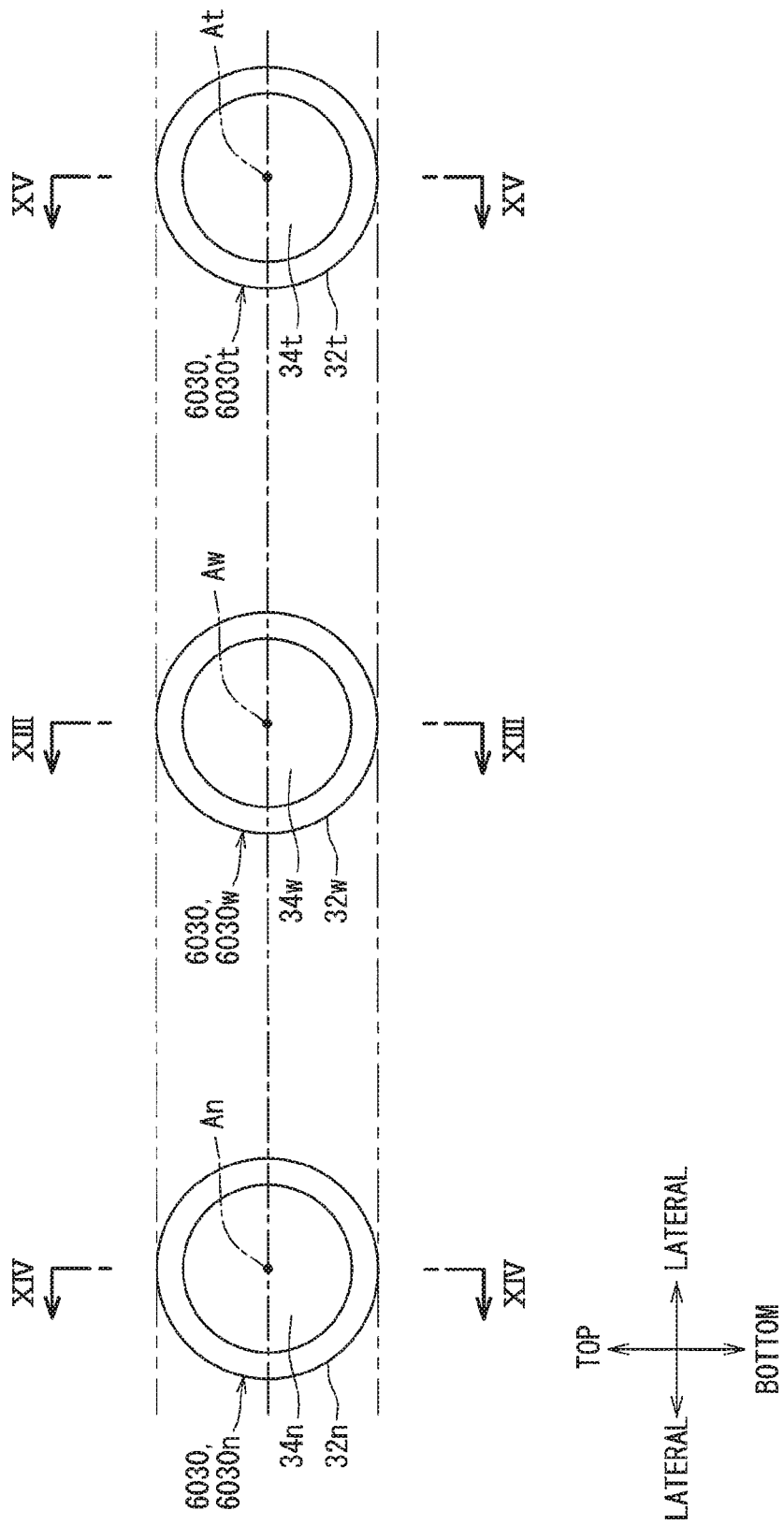
FIG. 18 is a front view illustrating a placement relationship of the respective lens units according to the sixth embodiment.

As shown in FIGS. 15, 16, and 18, the telescopic lens 34t, which forms the front end of the telescopic unit 6030t, is located without substantial vertical shift from the wide angle lens 34w. The telescopic lens 34t is shifted from the wide angle lens 34w toward the front end on the external environment 5 side. The telescopic lens 34t is further shifted from the wide angle lens 34w toward the other side (that is, the right side in FIG. 18) in the lateral direction. In this example, the optical axis At of the telescopic unit 6030t is decentered substantially in the lateral direction from both of the optical axis Aw of the wide angle unit 6030w and the optical axis An of the narrow angle unit 6030n.

In the sixth embodiment described above, a vertical wall portion 6210 of an upper casing member 21 of the camera casing 20 shown in FIGS. 13 to 16 is formed to meet a placement relationship in which the respective units 6030w, 6030n, and 6030t are shifted from each other in the longitudinal direction described above. Specifically, the further the vertical wall portion 6210 approaches both of its right and left lateral sides from its center portion in the lateral direction, the further the vertical wall portion 6210 obliquely protrudes toward the front side on the external environment 5 side (that is, the deeper side described in the first embodiment). The lens windows 6211w, 6211n, and 6211t are separately formed for each of the units. The lens windows 6211w, 6211n, and 6211t penetrate through the vertical wall portion 6210 and expose the units 6030w, 6030n, and 6030t, respectively, to the outside of the camera casing 20. In this example, the vertical positions of the lens windows 6211w, 6211n, and 6211t corresponding to the respective units 6030w, 6030n, and 6030t are aligned with each other. In addition, the longitudinal positions of the lens windows 6211n and 6211t corresponding to the narrow angle unit 6030n and the telescopic unit 6030t, respectively, are aligned with each other in a state where being shifted from the longitudinal position of the lens window 6211w corresponding to the wide angle unit 6030w.

In the sixth embodiment described above, the first to fourth noted sets are supposed as the noted sets in which the respective lens units 6030 overlap with each other when viewed in the lateral direction. More specifically, the first noted set includes the wide angle unit 6030w and the narrow angle unit 6030n which overlap with each other when viewed in the lateral direction. The second noted set includes the wide angle unit 6030w and the telescopic unit 6030t which overlap with each other when viewed in the lateral direction. The third noted set includes the narrow angle unit 6030n and the telescopic unit 6030t which overlap with each other when viewed in the lateral direction. The fourth noted set includes the wide angle unit 6030w, the narrow angle unit 6030n, and telescopic unit 6030t, which overlap with each other when viewed in the lateral direction.

Incidentally, the wide angle unit 6030w, the narrow angle unit 6030n, and the telescopic unit 6030t according to the sixth embodiment described above are substantially identical to corresponding ones in the wide angle unit 30w, the narrow angle unit 30n, and the telescopic unit 30t of the first embodiment except for the configurations described above. More particularly, even in the sixth embodiment, in which the longitudinal positions of the respective units 6030w, 6030n, and 6030t are shifted, the depths of recognition field Dw, Dn, and Dt are set in the same manner as that in the first embodiment.

Therefore, the first and third noted sets according to the sixth embodiment enables to produce the operational effects other than image position accuracy in the lateral direction in the same manner as that in the first and third noted sets of the first embodiment. Furthermore, the first to fourth noted sets, as the operational effects inherent in the sixth embodiment, enable to secure the image positional accuracy in the lateral direction by correcting the shift in the position coordinates. In particular, in view of particularly the second noted set, the telescopic unit 6030t of the angle of view θt and the wide angle unit 6030w of the angle of view θw enable to secure the accuracy as described above; the telescopic unit 6030t is another narrow angle unit than the narrow angle unit 6030n and has the angle of view θt is narrower than the angle of view θw.

As shown in FIGS. 13 to 17, in the sixth embodiment, according to the placement relationship of the respective lens units 6030, a pair of side wall portions 6043 is different in each structure from that in the first embodiment. The pair of side wall portions 6043 is provided on both of lateral sides of an imaging space 410. In a hood 6040, the imaging space 410 is on the upper side of the base wall portion 41.

Figure 17:
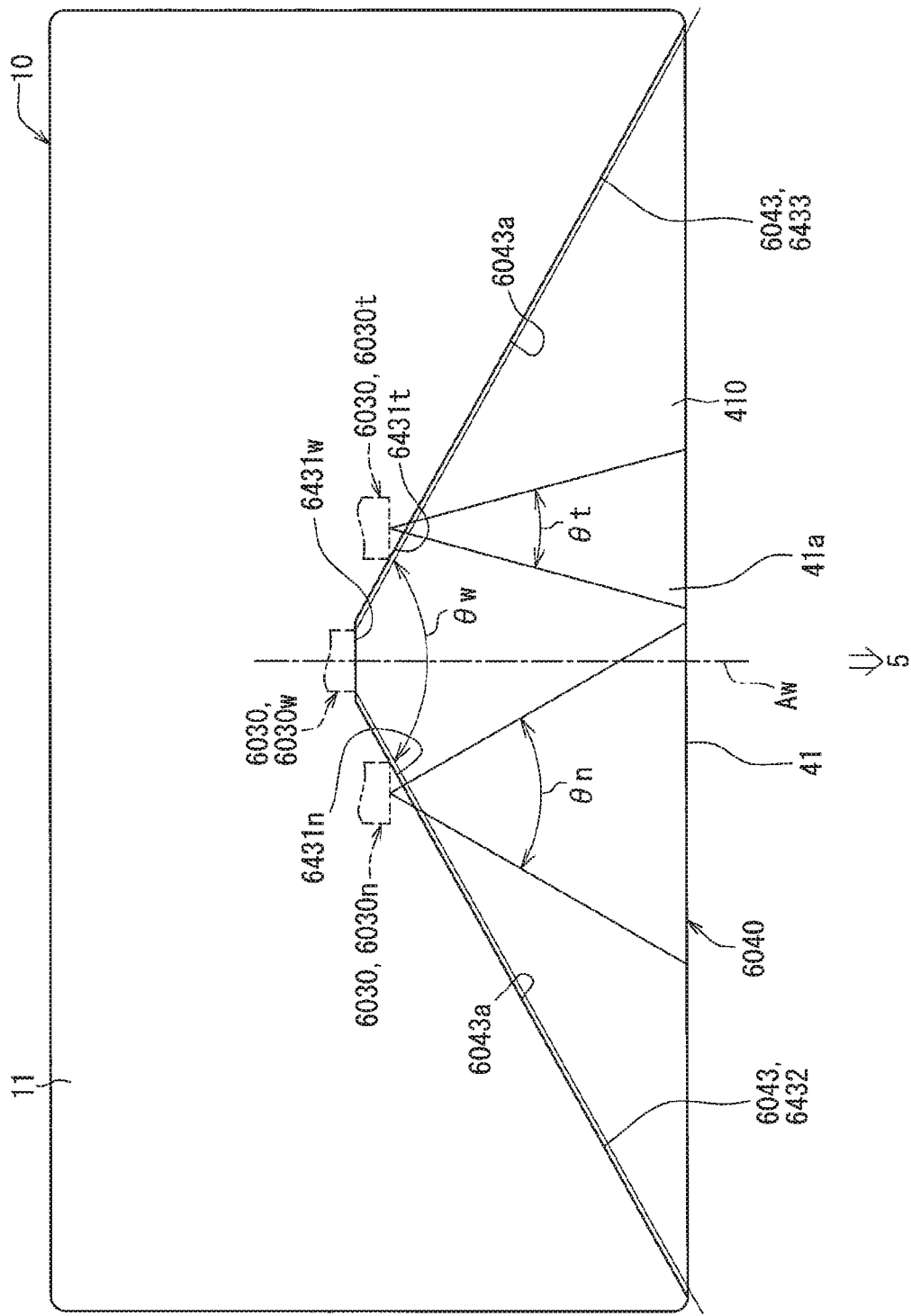
FIG. 17 is a top view illustrating a hood according to the sixth embodiment.

Each of the side wall portions 6043 is provided symmetrically with respect to the optical axis Aw of the wide angle unit 6030w. The wide angle unit 6030w is located at a center of the lens units 6030 aligned in the lateral direction. Each of the side wall portions 6043, which is in a straight plate-like shape, is inclined relative to the optical axis Aw of the unit 6030w toward the outer lateral side corresponding to the wide angle of view θw of the unit 6030w, as the side wall portion 6043 extends from the periphery of the wide angle unit 6030w toward the front side on the external environment 5 side. In each of the side wall portions 6043, a trapezoidal planar inner wall surface 6043a is formed to spread along a taper line of the angle of view θw outside the angle of view θw as shown in FIG. 17 when viewed in the vertical direction (that is, when viewed to the horizontal plane) of the vehicle 2, which is on the horizontal plane. In this way, the respective angles of view θn and θt of the narrow angle unit 6030n and the telescopic unit 6030t, which are narrower than the angle of view θw of the wide angle unit 6030w, are partially located inside the angle of view θw within the imaging space 410 when viewed in the vertical direction.

Figure 13:
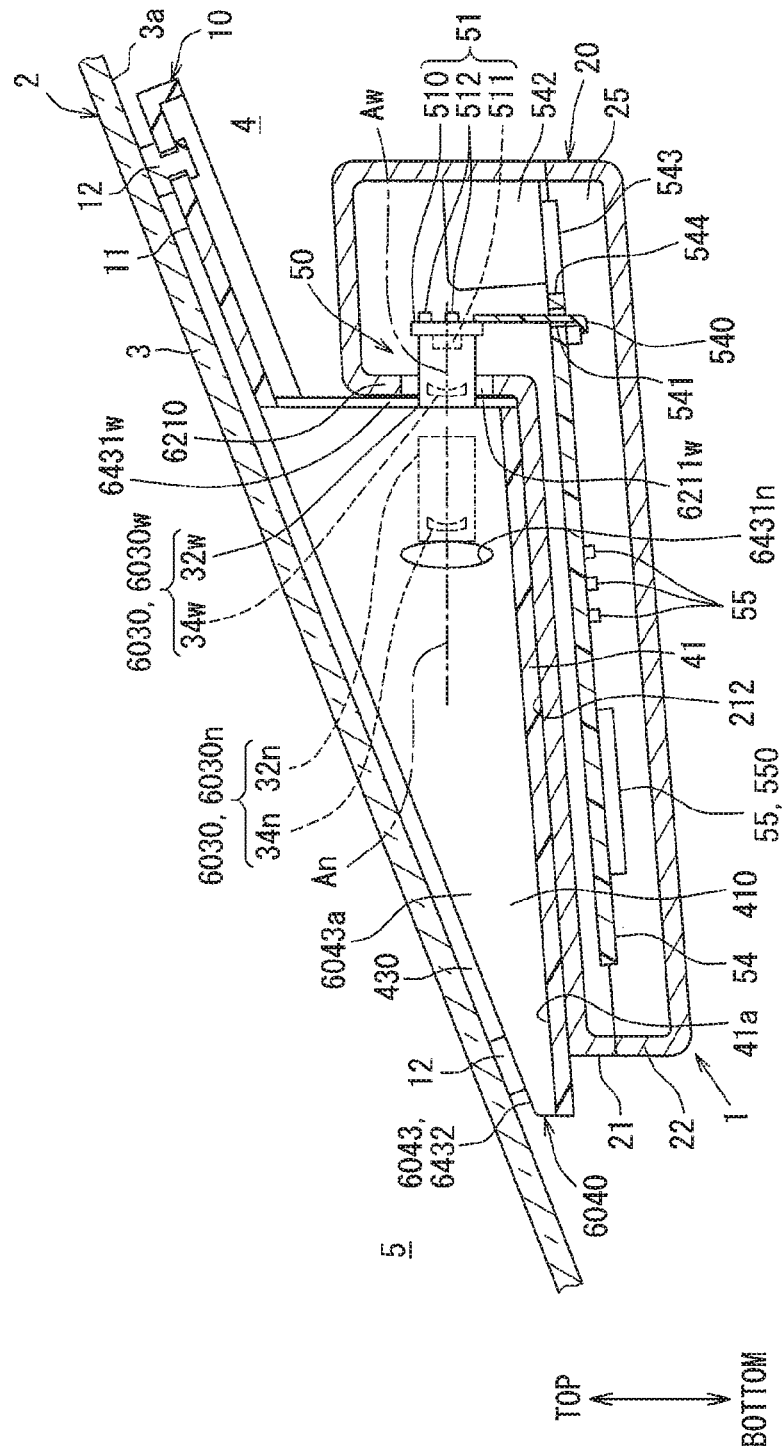
FIG. 13 is a cross-sectional view illustrating a camera module taken along a line VIII-VIII of FIG. 18 according to a sixth embodiment.
Figure 14:
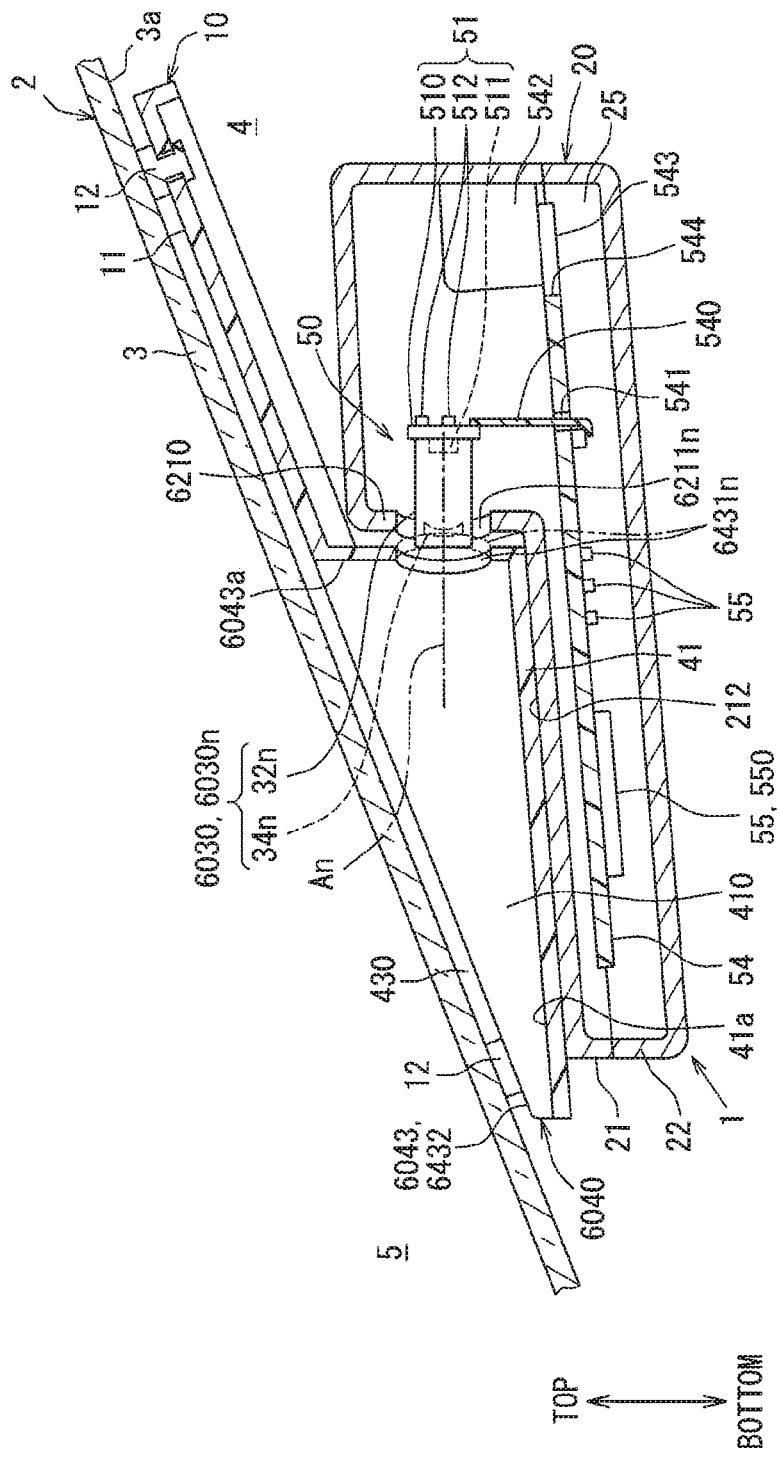
FIG. 14 is a cross-sectional view illustrating a camera module taken along a line XIV-XIV of FIG. 18 according to the sixth embodiment.

As shown in FIGS. 13, 16, and 17, a wide angle exposure window 6431w opens between rear ends of the side wall portions 6043 on the front side of the lens window 6211w of the vertical wall portion 6210. The front end of the wide angle unit 6030w on the external environment 5 side enters the inside of the wide angle exposure window 6431w from the inside of the lens window 6211w. The front end of the wide angle unit 6030w is still out of the imaging space 410. In this way, the wide angle exposure window 6431w exposes the wide angle unit 6030w toward the imaging space 410.

As shown in FIGS. 13 to 17, a narrow angle exposure window 6431n opens on the front side of the lens window 6211n of the vertical wall portion 6210 in a first side wall portion 6432. The first side wall portion 6432 is a part of a side wall portion 6043 on one side in the lateral direction. The vertical position of the narrow angle exposure window 6431*n* is aligned with the wide angle exposure window 6431*w*. The front end of the narrow angle unit 6030*n* on the external environment 5 side enters the inside of the narrow angle exposure window 6431*n* from the inside of the lens window 6211*n*. The front end of the narrow angle unit 6030*n* is still out of the imaging space 410. In this way, the narrow angle exposure window 6431*n* exposes the narrow angle unit 6030*n* toward the imaging space 410.

As shown in FIGS. 15 to 17, a telescopic exposure window 6431*t* opens on the front side of the lens window 6211*t* of the vertical wall portion 6210 in a second side wall portion 6433. The second side wall portion 6433 is a part of the side wall portion 6043 on the other side in the lateral direction. The vertical position of the telescopic exposure window 6431*t* is aligned with the wide angle exposure window 6431*w* and the narrow angle exposure window 6431*n*. In addition, the longitudinal position of the telescopic exposure window 6431*t* is aligned with the narrow angle exposure window 6431*n* in a state where the longitudinal direction is shifted from the wide angle exposure window 6431*w*. In this example, the front end of the telescopic unit 6030*t* on the external environment 5 side enters the inside of the telescopic exposure window 6431*t* from the inside of the lens window 6211*t*. The front end of the telescopic unit 6030*t* is still out of the imaging space 410. In this way, the telescopic exposure window 6431*t* exposes the telescopic unit 6030*t* toward the imaging space 410 on the front side of the wide angle unit 6030*w* on the external environment 5 side and directly beside the narrow angle unit 6030*n*.

The hood 6040 according to the sixth embodiment is substantially identical to the hood 40 of the first embodiment except for the configurations described above. Therefore, according to the hood 6040 of the sixth embodiment, on the lateral side of the imaging space 410, which is for guiding an optical image within the imaging target range to the units 6030*w* and 6030*n* of the lens units 6030, the first side wall portion 6432 is inclined according to the angle of view θw of the wide angle unit 6030*w* from the periphery of the wide angle unit 6030*w* toward the external environment side. The first side wall portion 6432 is one of the pair of side wall portions 6043. The units 6030*w* and 6030*n* belong to the first and fourth noted sets. More particular, in the hood 6040 of the sixth embodiment, the first side wall portion 6432 is located in an inclined state spreading along the angle of view θw of the wide angle unit 6030*w*. In this example, in the first side wall portion 6432, the narrow angle exposure window 6431*n* opens on the external environment side of the wide angle unit 6030*w* to expose the narrow angle unit 6030*n* toward the imaging space 410. According to the configuration, the angle of view θn of the narrow angle unit 6030*n* falls within the inside of the angle of view θw of the wide angle unit 6030*w* that regulates the inclination of the first side wall portion 6432 to share the imaging space 410 between both of those units. Therefore, a formation range of the first side wall portion 6432, in which the narrow angle exposure window 6431*n* opens in the inclined state, is confined to a necessary range for the wide angle unit 6030*w*. In this way, the configuration enables to reduce the size of the camera module 1 including the hood 6040.

In the first and fourth noted sets according to the sixth embodiment, the front end of the narrow angle unit 6030*n* on the external environment 5 side is located out of the imaging space 410. Therefore, the narrow angle unit 6030*n* unlikely enters the inside of the angle of view θw of the wide angle unit 6030*w*. In this way, the narrow angle unit 6030*n* unlikely disturbs and unlikely interferes with the imaging of the normal optical image of the external environment 5 in the imaging target range. In particular, the narrow angle unit 6030*n* unlikely disturbs and unlikely interferes with the external environment imaging that can avoid loss of an object in the first noted set.

According to the sixth embodiment, the front end of the narrow angle unit 6030*n* of the first, third, and fourth noted sets enters the inside of the narrow angle exposure window 6431*n*. The front end of the narrow angle unit 6030*n* is still out of the imaging space 410. According to the configuration, the narrow angle unit 6030*n* can be brought closer to the front windshield 3 to restrict incidence of excess light into the angle of view θn through the clearance between the element 6030*n* and the element 3. Therefore, excess light incidence unlikely disturbs the imaging of the normal optical image of the external environment 5 in the imaging target range. In particular, excess light incidence unlikely disturbs the external environment imaging that can avoid loss of an object in the first noted set.

Moreover, according to the hood 6040 of the sixth embodiment, on the lateral side of the imaging space 410 for guiding an optical image within the imaging target range to the respective units 6030*w* and 6030*t* of the lens units 6030, the second side wall portion 6433 is inclined according to the angle of view θw of the wide angle unit 6030*w* from the periphery of the wide angle unit 6030*w* toward the external environment side. The respective units 6030*w* and 6030*t* belong to the second and fourth noted sets. The second side wall portion 6433 is one of the pair of side wall portions 6043. More particular, in the hood 6040 of the sixth embodiment, the second side wall portion 6433 is located in an inclined state spreading along the angle of view θw of the wide angle unit 6030*w*. In this example, in the second side wall portion 6433, a telescopic exposure window 6431 opens on the external environment side of the wide angle unit 6030*w* to expose the telescopic unit 6030*t* toward the imaging space 410. According to the configuration, the angle of view θt of the telescopic unit 6030*t* falls within the inside of the angle of view θw of the wide angle unit 6030*w* that regulates the inclination of the second side wall portion 6433 to share the imaging space 410 between both of those units. Therefore, a formation range of the second side wall portion 6433 for opening the telescopic exposure window 6431*t* in the inclined state is confined to a necessary range for the wide angle unit 6030*w*. In this way, the configuration enables to reduce the size of the camera module 1 including the hood 6040.

In the second and fourth noted sets according to the sixth embodiment, the front end of the telescopic unit 6030*t* on the external environment 5 side is located out of the imaging space 410. Therefore, the telescopic unit 6030*t* unlikely enters the inside of the angle of view θw of the wide angle unit 6030*w*. In this way, the telescopic unit 6030*t* unlikely disturbs and unlikely interferes with the imaging of the normal optical image of the external environment 5 within the imaging target range.

According to the sixth embodiment, the front end of the telescopic unit 6030*t* of the second to fourth noted sets enters the inside of the telescopic exposure window 6431*t*. The front end of the telescopic unit 6030*t* is still out of the imaging space 410. According to the configuration, the telescopic unit 6030*t* can be brought closer to the front windshield 3 to restrict incidence of excess light into the angle of view θt through the clearance between the element 6030*t* and the element 3. Therefore, excess light incidence unlikely disturbs the imaging of the normal optical image of the external environment 5 within the imaging target range.

In particular, in view of particularly the second noted set, the reduction in size and the imaging of the normal optical image can be attained in the telescopic unit 6030t in which the angle of view θt is narrower than the angle of view θw by the telescopic exposure window 6431t as described above. The telescopic unit 6030t is another narrow angle unit than the narrow angle unit 6030n. The telescopic exposure window 6431t is another narrow angle exposure window than the narrow angle exposure window 6431n.

Seventh Embodiment

Figure 19:
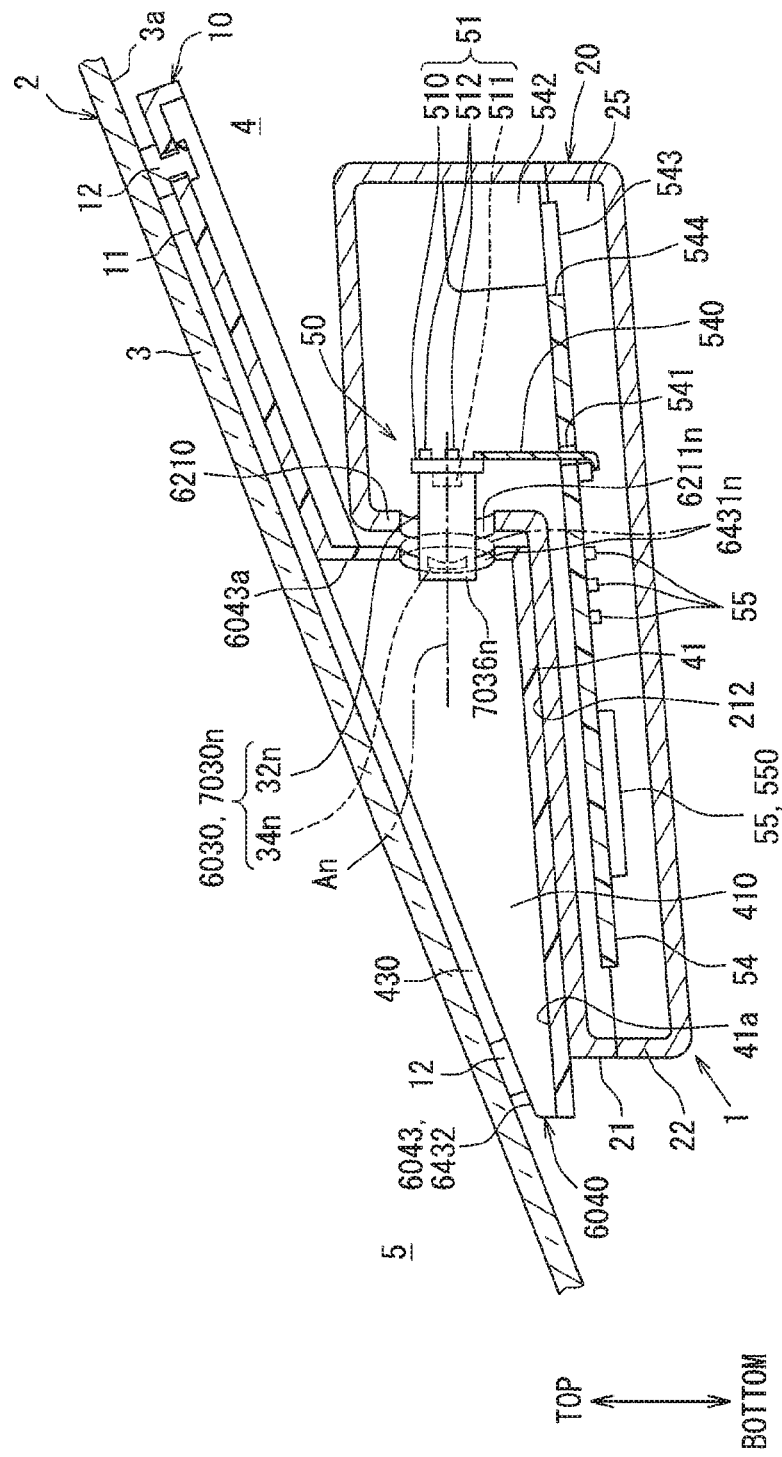
FIG. 19 is a cross-sectional view illustrating a camera module corresponding to FIG. 14 according to a seventh embodiment.
Figure 20:
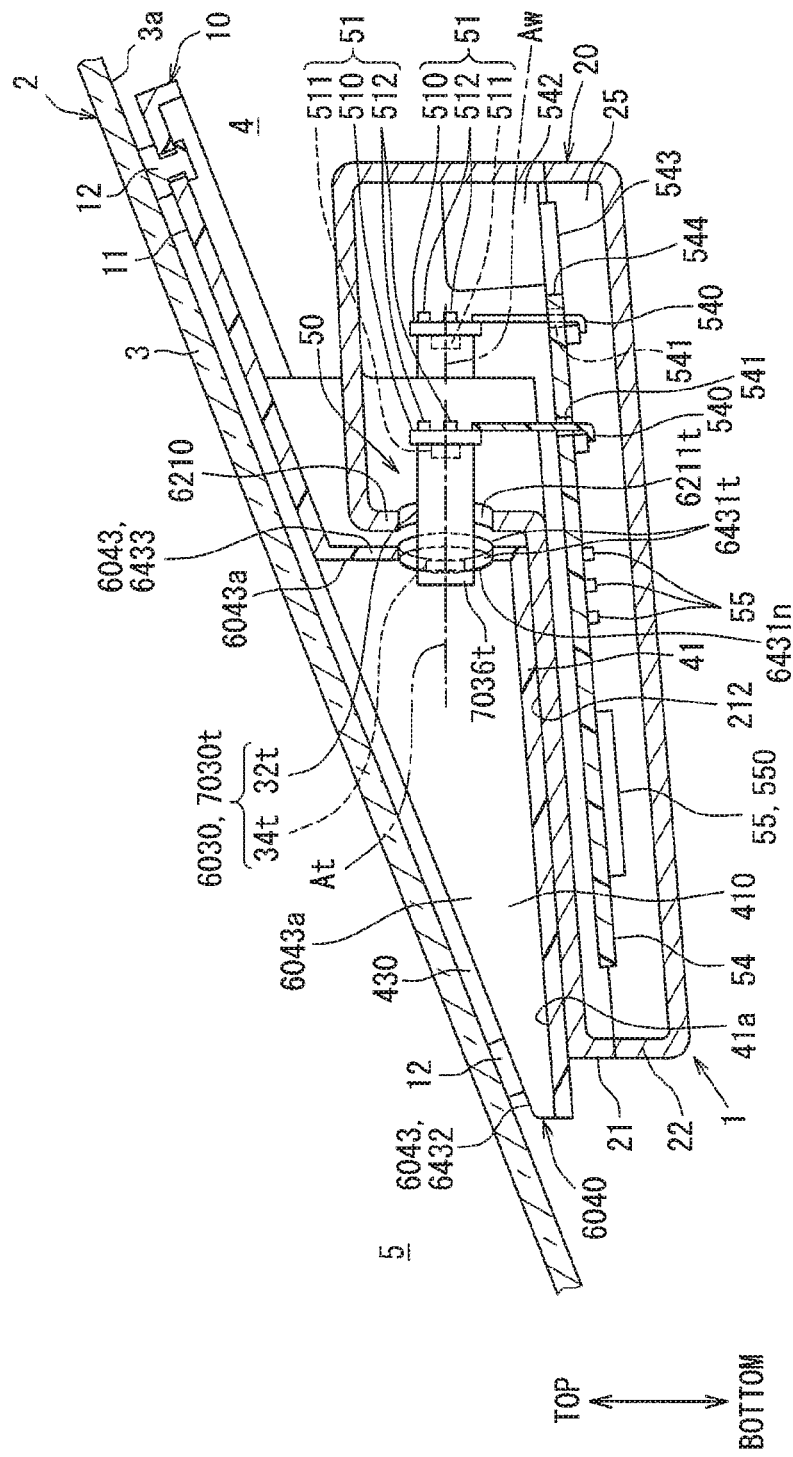
FIG. 20 is a cross-sectional view illustrating the camera module corresponding to FIG. 15 according to the seventh embodiment.
Figure 21:
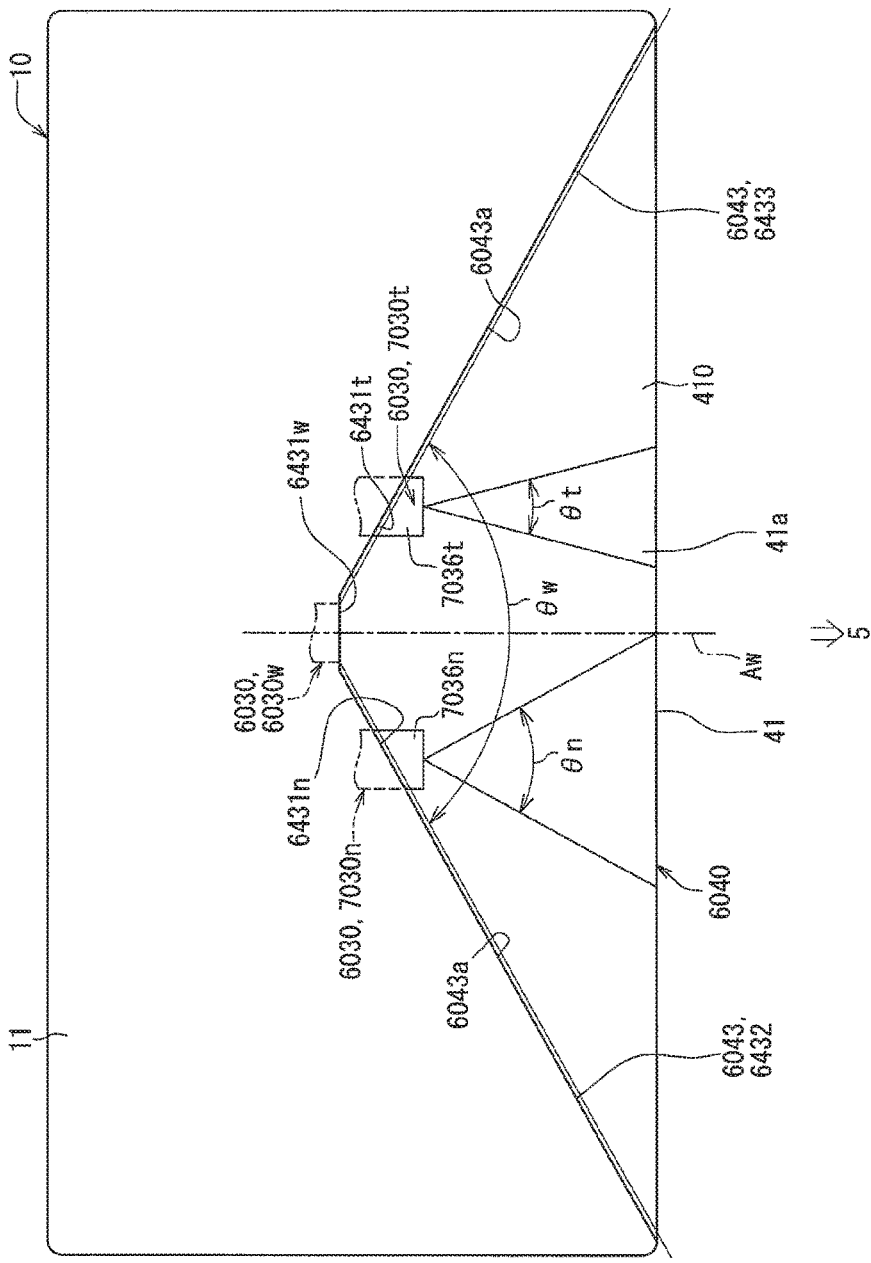
FIG. 21 is a top view illustrating a hood according to the seventh embodiment.

As illustrated in FIGS. 19 to 21, a seventh embodiment is a modification of the first embodiment. In the seventh embodiment, the placement position of a narrow angle unit 7030n and a telescopic unit 7030t as the lens units 6030 are different from that in the sixth embodiment.

As shown in FIGS. 19 and 21, the front end of the narrow angle unit 7030n on the side of the external environment 5 further enters the imaging space 410 from the inside of a lens window 6211n and the inside of the narrow angle exposure window 6431n. In this way, the narrow angle exposure window 6431n exposes the narrow angle unit 7030n to the imaging space 410. In addition, as shown in FIG. 21, an angle of view θn of the narrow angle unit 7030n, which is narrower than the angle of view θw of the wide angle unit 6030w, is completely located inside the angle of view θw within the imaging space 410 when viewed in the vertical direction.

As shown in FIGS. 19 and 21, the narrow angle unit 7030n has a reflection restriction portion 7036n in its entire circumferential area and in its entire end surface area at a portion including at least the front end of the narrow angle unit 7030n. The narrow angle unit 7030n enters and is exposed in the imaging space 410. The reflection restriction portion 7036n is formed by, for example, applying black coating or painting to the narrow angle lens barrel 32n of the narrow angle unit 7030n. Incidentally, for example, when the narrow angle lens barrel 32n itself is made of a black material, the reflection restriction portion 7036n is not necessarily provided.

As shown in FIGS. 20 and 21, the front end of the telescopic unit 7030t on the external environment 5 side further enters the imaging space 410 from the inside of a lens window 6211t and the inside of the telescopic exposure window 6431t. In this way, the telescopic exposure window 6431t exposes the telescopic unit 7030t to the imaging space 410 on the front side of the wide angle unit 6030w on the external environment 5 side and directly beside the narrow angle unit 7030n. In addition, as shown in FIG. 21, an angle of view θt of the telescopic unit 7030t, which is narrower than the angle of view θw of the wide angle unit 6030w, is completely located inside the angle of view θw within the imaging space 410 when viewed in the vertical direction.

As shown in FIGS. 20 and 21, the telescopic unit 7030t has a reflection restriction portion 7036t in its entire circumferential area and in its entire end surface area at a portion including at least the front end of the telescopic unit 7030t which enters and is exposed in the imaging space 410. The reflection restriction portion 7036t is formed by, for example, applying black coating or painting to the telescopic lens barrel 32t of the telescopic unit 7030t. Incidentally, for example, when the telescopic lens barrel 32t itself is made of a black material, the reflection restriction portion 7036t is not necessarily provided.

In the seventh embodiment described above, as in the sixth embodiment, the first to fourth noted sets are supposed as the noted sets in which the respective lens units 6030 overlap with each other when viewed in the lateral direction. More specifically, the first noted set includes the wide angle unit 6030w and the narrow angle unit 7030n which overlap with each other when viewed in the lateral direction. The second noted set includes the wide angle unit 6030w and the telescopic unit 7030t which overlap with each other when viewed in the lateral direction. The third noted set includes the narrow angle unit 7030n and the telescopic unit 7030t which overlap with each other when viewed in the lateral direction. The fourth noted set includes the wide angle unit 6030w, the narrow angle unit 7030n, and the telescopic unit 7030t, which overlap with each other when viewed in the lateral direction.

According to the seventh embodiment described above, the front end of the narrow angle unit 7030n of the first, third and fourth noted sets enters the imaging space 410 from the inside of the narrow angle exposure window 6431n. According to the configuration, the clearance between the narrow angle unit 7030n and the front windshield 3 is narrowed as much as possible, and the effect of reducing excess light incidence into the angle of view θn through the clearance can be enhanced. Therefore, the imaging of the normal optical image of the external environment 5 in the imaging target range, in particular, the external environment imaging that can avoid loss of an object in the first noted set can be attained without being disturbed by excess light incidence.

Further, according to the seventh embodiment, the front end of the narrow angle unit 7030n of the first and fourth noted sets enters the imaging space 410. At the front end of the narrow angle unit 7030n, reflection of light can be regulated by the reflection restriction portion 7036n. The configuration enables to restrict reflected light, which is reflected on the front end of the narrow angle unit 7030n in the imaging space 410 from entering the inside of the angle of view θw of the wide angle unit 6030w. Therefore, the imaging of the normal optical image of the external environment 5 in the imaging target range, in particular, the external environment imaging that can avoid loss of an object in the first noted set can be attained without being disturbed by the reflected light incidence.

According to the seventh embodiment, the front end of the telescopic unit 7030t of the second to fourth noted sets enters the imaging space 410 from the inside of the telescopic exposure window 6431t. According to the configuration, the clearance between the telescopic unit 7030t and the front windshield 3 is narrowed as much as possible, and the effect of reducing excess light incidence into the angle of view θt through the clearance can be enhanced. Therefore, the imaging of the normal optical image of the external environment 5 within the imaging target range can be attained without being disturbed by incidence of excess light.

Further, according to the seventh embodiment, the front end of the telescopic unit 7030t of the second and fourth noted sets enters the imaging space 410. At the front end of the telescopic unit 7030t, reflection of light can be regulated by the reflection restriction portion 7036t. The configuration enables to restrict light, which is reflected on the front end of the telescopic unit 7030t in the imaging space 410, from entering the inside of the angle of view θw of the wide angle unit 6030w. Therefore, the imaging of the normal optical image of the external environment 5 within the imaging target range can be attained without being disturbed by incidence of reflected light.

In particular, in view of particularly the second noted set, the normal optical image can be imaged as described above with the telescopic unit 7030t in which the angle of view θt is narrower than the angle of view θw. The telescopic unit 7030t is another narrow angle unit than the narrow angle unit 7030n.

Incidentally, the narrow angle unit 7030n and the telescopic unit 7030t according to the seventh embodiment are substantially identical to the narrow angle unit 6030n and the telescopic unit 6030t of the sixth embodiment except for the configurations described above. Therefore, according to the seventh embodiment, the first to fourth noted sets enable to produce the same operational effects as those in the first to fourth noted sets according to the sixth embodiment except for the operational effects related to the placement structure out of the imaging space 410.

Eighth Embodiment

Figure 22:
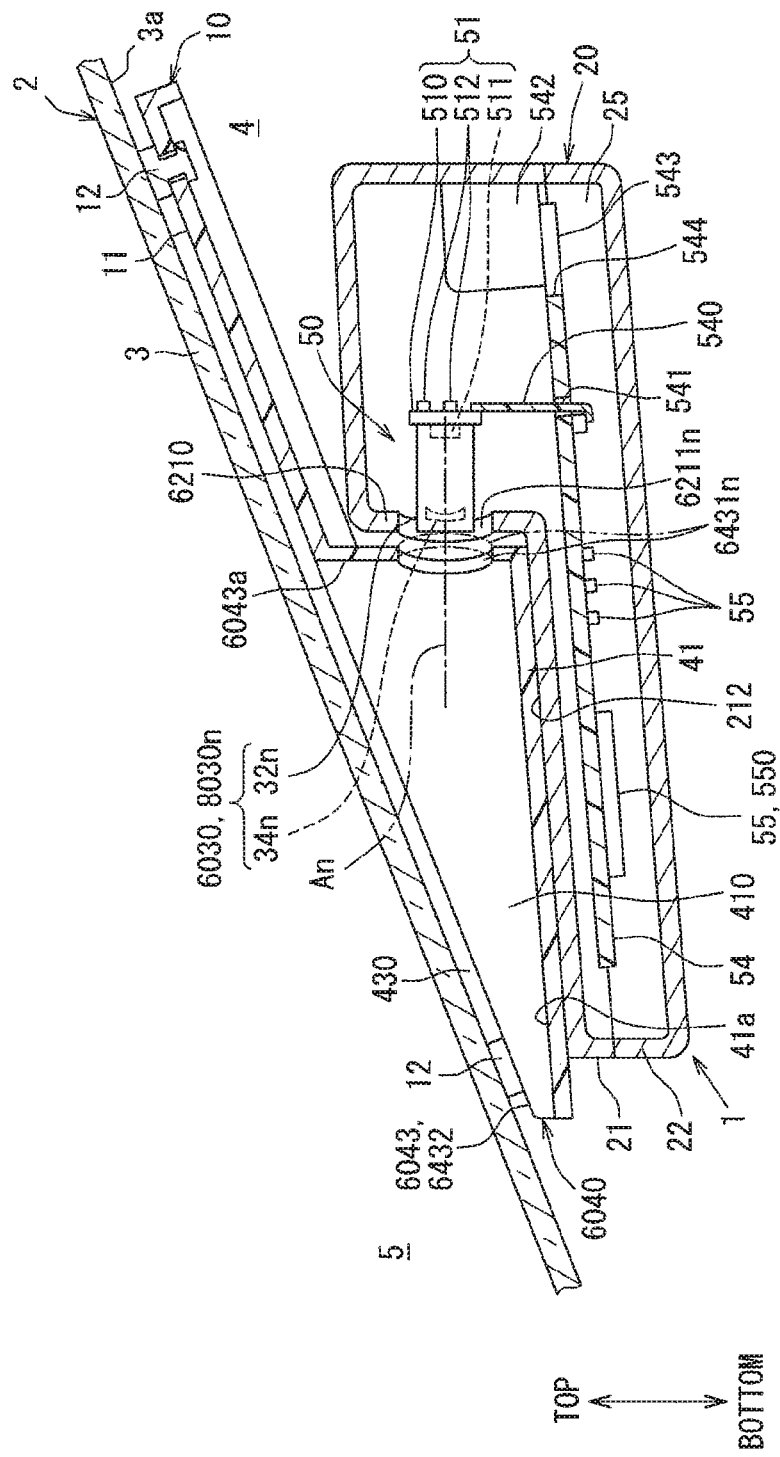
FIG. 22 is a cross-sectional view illustrating a camera module corresponding to FIG. 14 according to an eighth embodiment.
Figure 23:
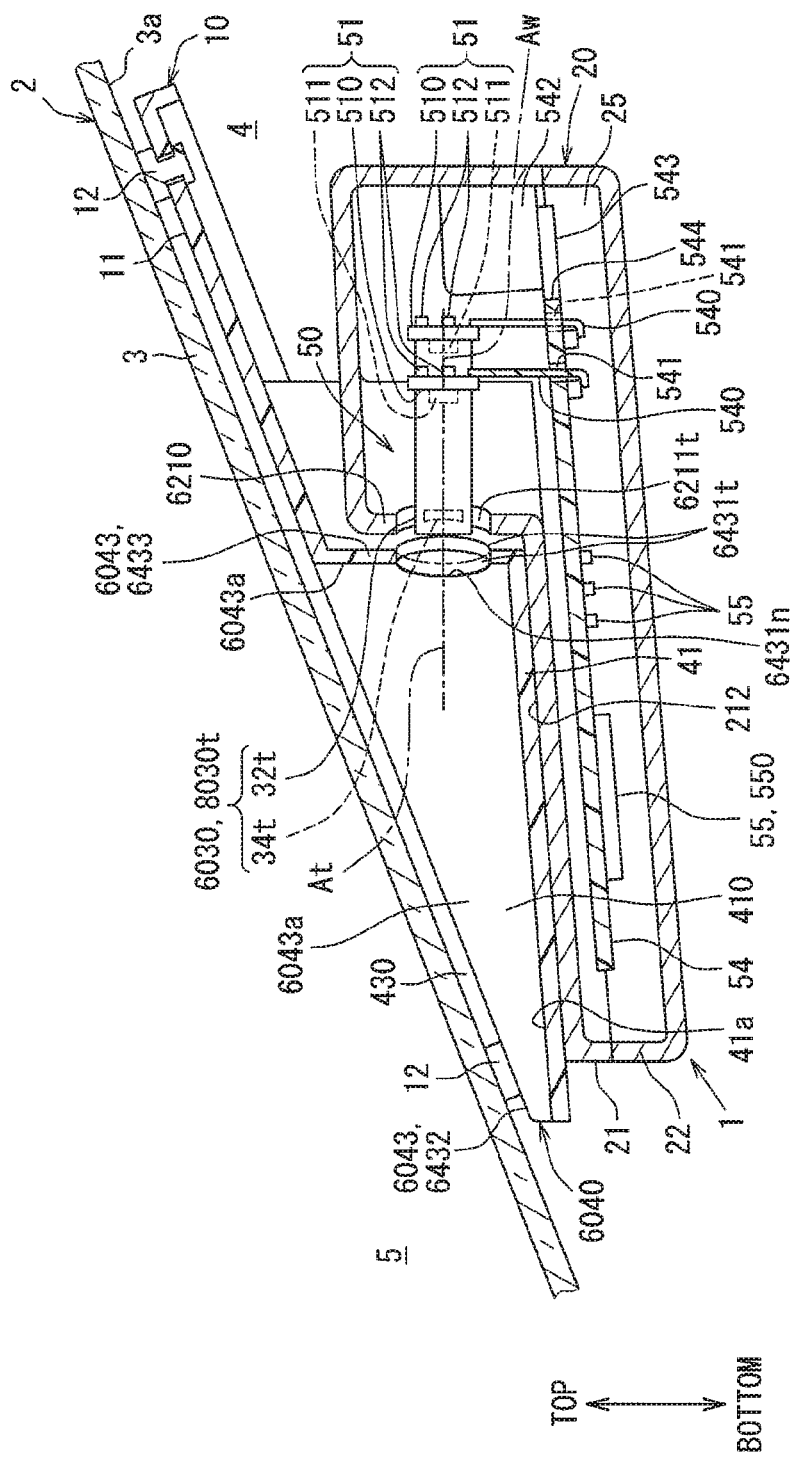
FIG. 23 is a cross-sectional view illustrating the camera module corresponding to FIG. 15 according to the eighth embodiment.
Figure 24:
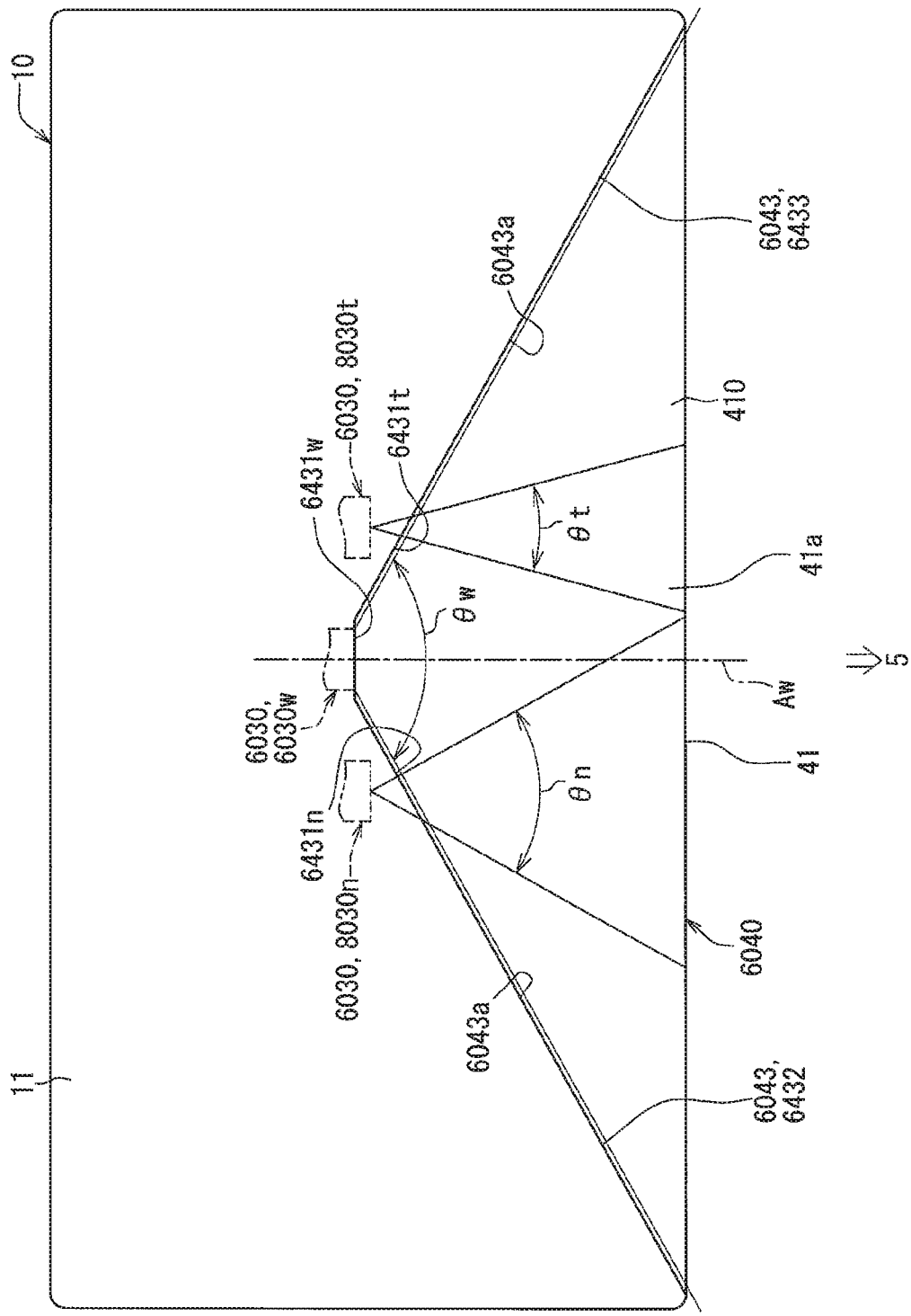
FIG. 24 is a top view illustrating a hood according to the eighth embodiment.
Figure 25:
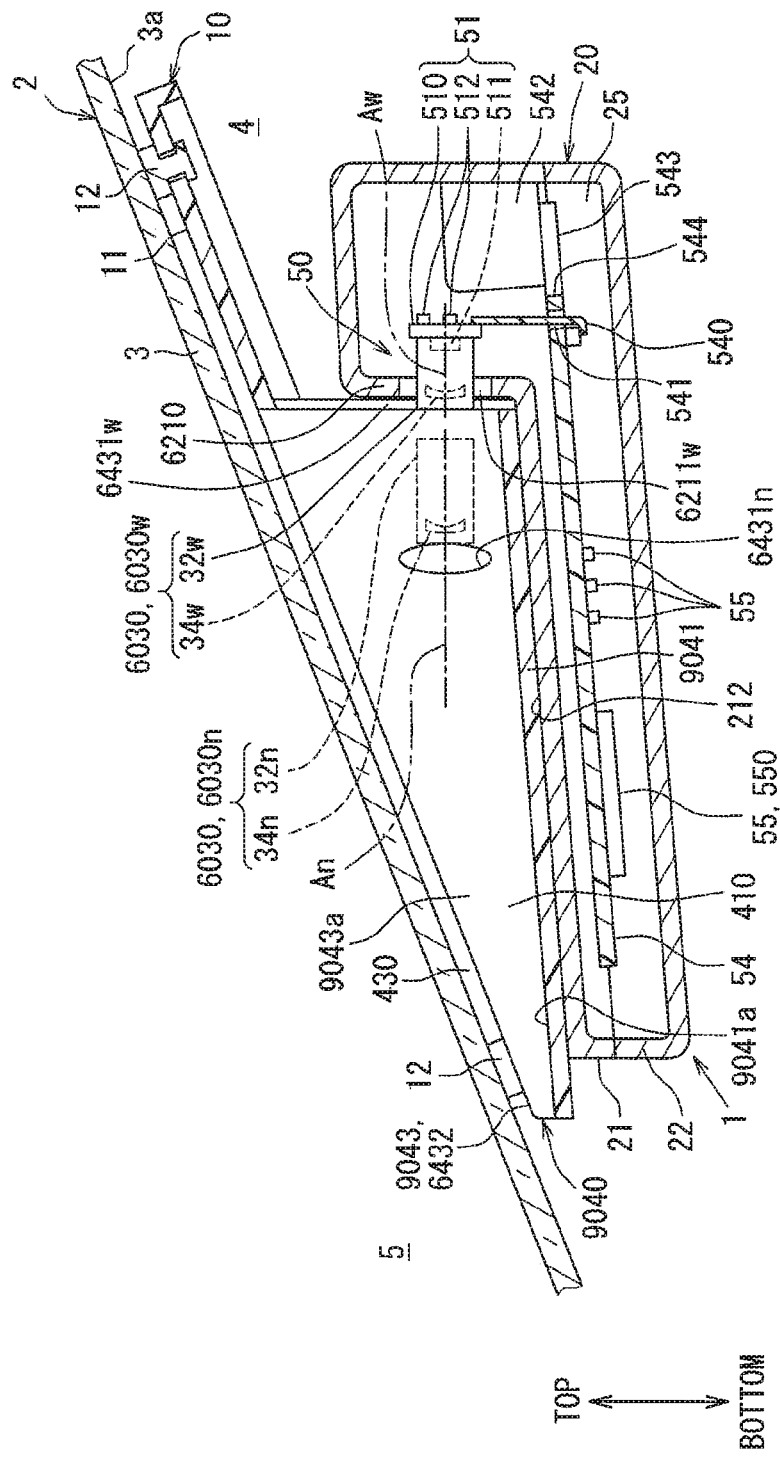
FIG. 25 is a cross-sectional view illustrating a camera module corresponding to FIG. 13 according to a ninth embodiment.
Figure 26:
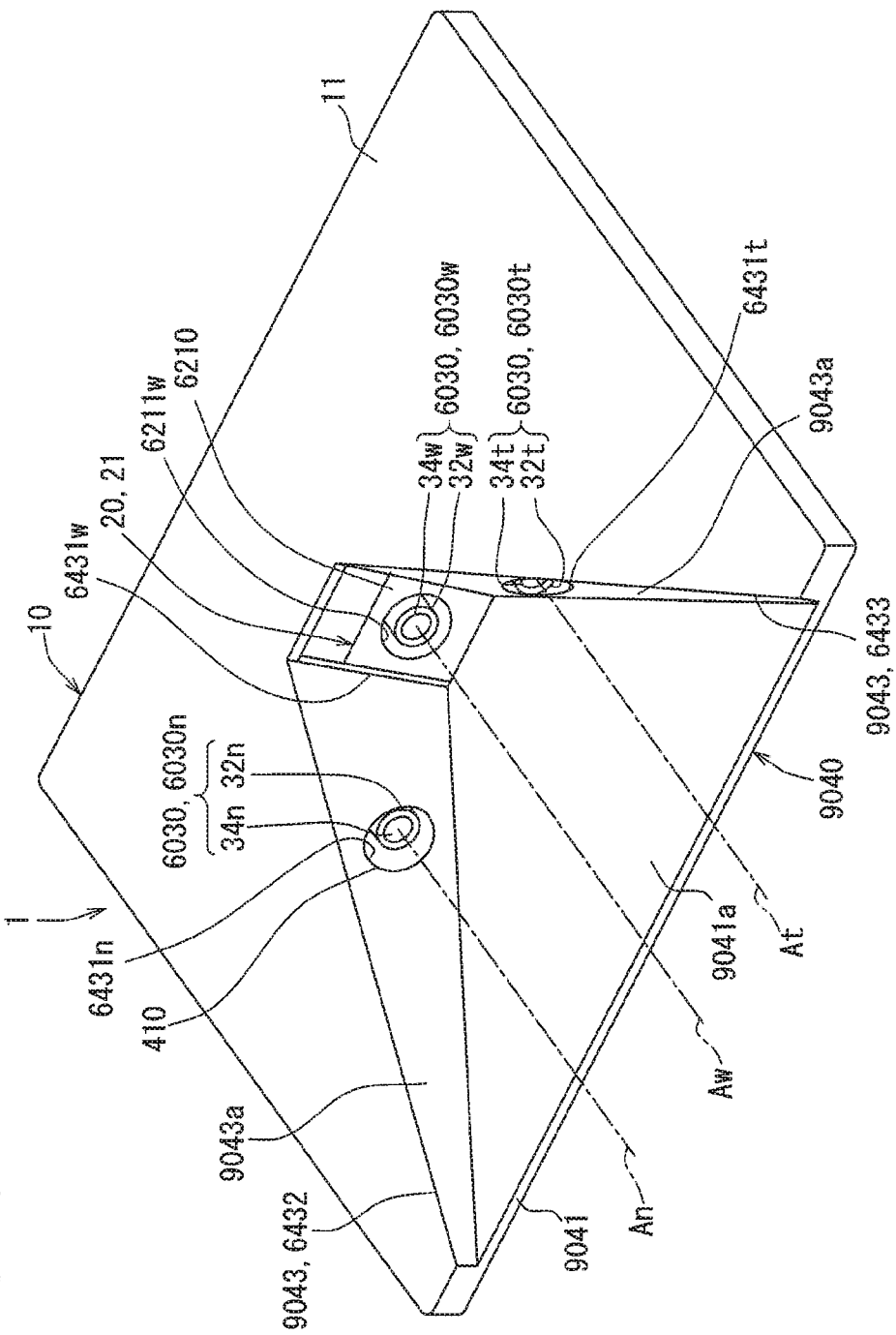
FIG. 26 is a perspective view illustrating the camera module according to the ninth embodiment.

As illustrated in FIGS. 22 to 24, an eighth embodiment is a modification of the first embodiment. In the eighth embodiment, the placement position of a narrow angle unit 8030n and a telescopic unit 8030t as lens units 6030 is different from that in the sixth embodiment.

As shown in FIGS. 22 and 24, the front end of the narrow angle unit 8030n on the side of the external environment 5 enters the lens window 6211n.

In addition, the front end of the narrow angle unit 8030n is out of the imaging space 410 and is inside behind the narrow angle exposure window 6431n. In this way, the narrow angle exposure window 6431n exposes the narrow angle unit 8030n to the imaging space 410. In addition, as shown in FIG. 24, an angle of view θn of the narrow angle unit 8030n, which is narrower than the angle of view θw of the wide angle unit 6030w, are partially located inside the angle of view θw within the imaging space 410 when viewed in the vertical direction.

As shown in FIGS. 23 and 24, the front end of the telescopic unit 8030t on the side of the external environment 5 enters the lens window 6211t. In addition, the front end of the telescopic unit 8030t is out of the imaging space 410 and is inside behind the telescopic exposure window 6431t. In this way, the telescopic exposure window 6431t exposes the telescopic unit 8030t to the imaging space 410 on the front side of the wide angle unit 6030w on the external environment 5 side and directly beside the narrow angle unit 8030n. In addition, as shown in FIG. 24, the angle of view θt of the telescopic unit 8030t, which is narrower than the angle of view θw of the wide angle unit 6030w, is partially located inside the angle of view θw within the imaging space 410 when viewed in the vertical direction.

In the eighth embodiment described above, as in the sixth embodiment, the first to fourth noted sets are supposed as the noted sets in which the respective lens units 6030 overlap with each other when viewed in the lateral direction. More specifically, the first noted set includes the wide angle unit 6030w and the narrow angle unit 8030n which overlap with each other when viewed in the lateral direction. The second noted set includes the wide angle unit 6030w and the telescopic unit 8030t which overlap with each other when viewed in the lateral direction. The third noted set includes the narrow angle unit 8030n and the telescopic unit 8030t which overlap with each other when viewed in the lateral direction. The fourth noted set includes the wide angle unit 6030w, the narrow angle unit 8030n, and telescopic unit 8030t, which overlap with each other when viewed in the lateral direction.

The narrow angle unit 8030n and the telescopic unit 8030t according to the eighth embodiment described above are substantially identical to the narrow angle unit 6030n and the telescopic unit 6030t of the sixth embodiment except for the configurations described above. Therefore, according to the eighth embodiment, the first to fourth noted sets enable to produce the same operational effects as those in the first to fourth noted sets according to the sixth embodiment except for the operational effects related to the entrance structure into the exposure windows 6431n and 6431t.

Ninth Embodiment

As illustrated in FIGS. 25 to 32, a ninth embodiment is a modification of the sixth embodiment. In the ninth embodiment, in a hood 9040 shown in FIGS. 25 to 27, a pair of side wall portions 9043 provided on both sides of the imaging space 410 and a base wall portion 9041 provided on a lower side of the imaging space 410 are different in structure from those in the sixth embodiment and are structured in association with the control functions of the vehicle 2.

Figure 28:
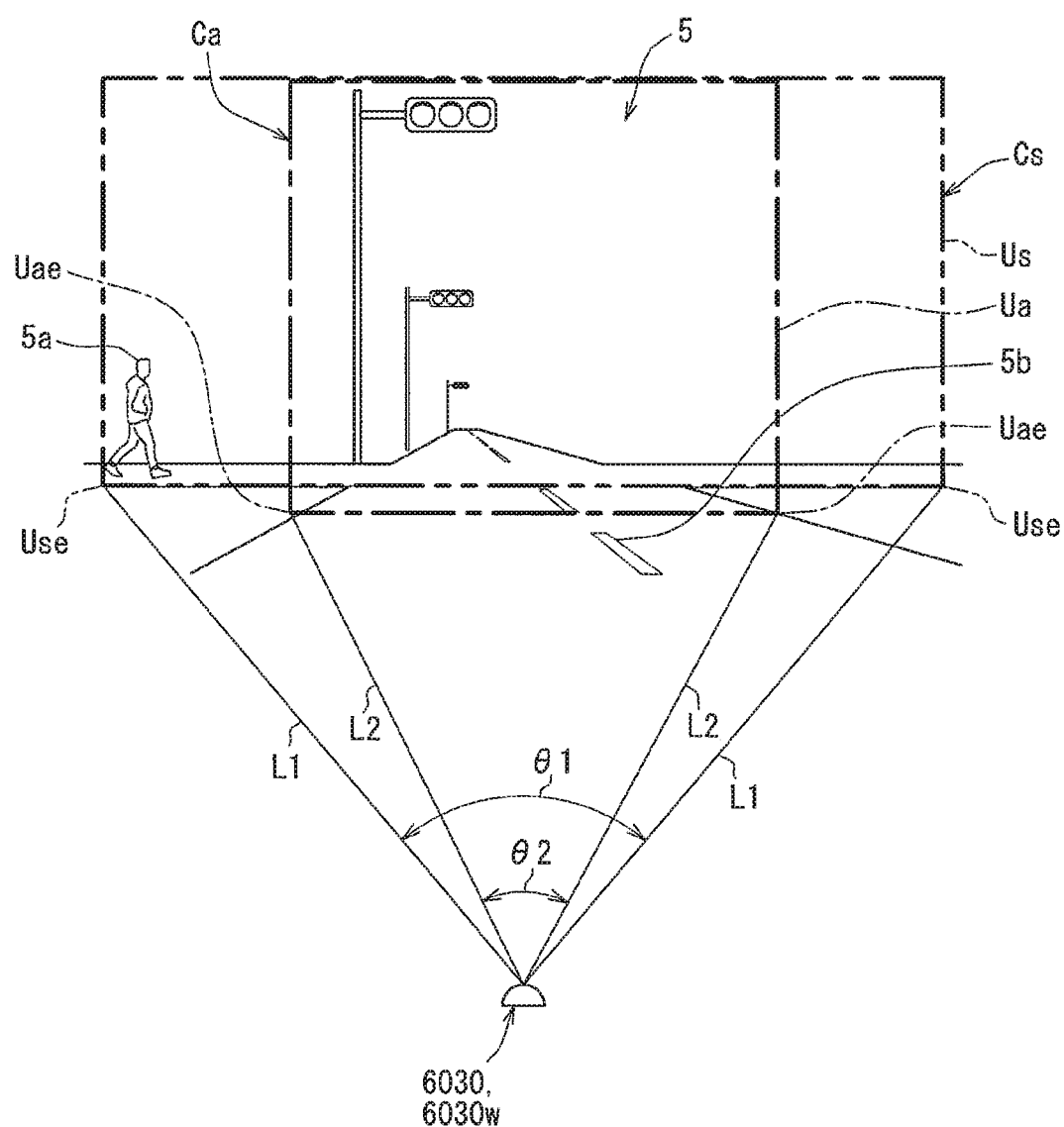
FIG. 28 is a front schematic view illustrating a control function according to the ninth embodiment.
Figure 29:
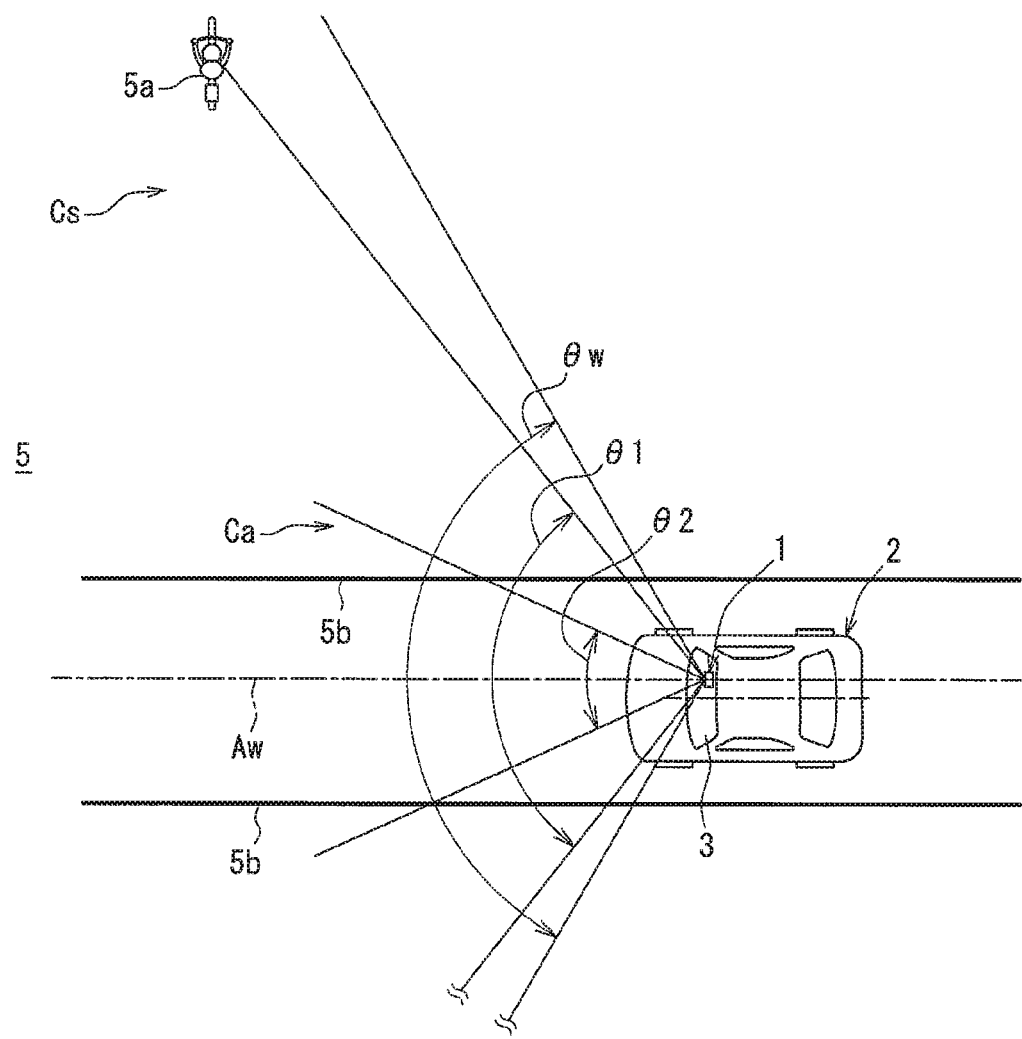
FIG. 29 is a schematic top view illustrating a vehicle control function according to the ninth embodiment.

In the ninth embodiment, the control functions of the vehicle 2 according to a situation of the external environment 5 shown in FIGS. 28 and 29 are installed in the control circuit 55 or in an external circuit such as an ECU connected to the external connector 542. In this example, one of the control functions is a collision restriction control of the vehicle 2 against a front obstacle 5a (for example, a pedestrian, a bicycle, another vehicle, or the like) which is an object in the external environment 5. The one of the control functions is a specific control Cs of the vehicle 2. A specific example of the specific control Cs is an autonomous emergency braking (AEB) that automatically controls a vehicle speed of the vehicle 2 when an emergency control condition, in which a time to collision (TTC) is close to several seconds or less, is established, thereby to forcedly decelerate the vehicle 2, or the like. In addition, one of the control functions is a driving control of the vehicle 2 in a traveling lane. The one of the control functions is another control Ca of the vehicle 2 than the specific control Cs. A specific example of the other control Ca is a lane keeping assist (LKA) that automatically controls the position of the vehicle 2 in the width direction of the traveling lane to restrict a shift of the vehicle 2 from a lane marking 5b such as a lane line, a yellow lane line on a road surface, or the like in the external environment 5.

As shown in FIGS. 27 to 30, a horizontal angle of view range of the external environment 5, which is necessary for the specific control Cs of the vehicle 2, falls within the imaging target range of the camera module 1 mounted on the front windshield 3. The horizontal angle of view range is defined by a first taper angle θ1 with the optical axis Aw of the wide angle unit 6030w, which is a bisector, when viewed in the vertical direction (that is, in a horizontal plane view) of the vehicle 2 on the horizontal plane. In this example, the first taper angle θ1 is smaller than a horizontal angle of view range of the angle of view θw of the wide angle unit 6030w defined around the optical axis Aw. For example, the first taper angle θ1 is set to an angle of 100° or more. For example, the first taper angle θ1 is set to an angle at which the front obstacle 5a preceding the vehicle 2 by 13 m or more can be imaged when the TTC is equal or more than 2.4 seconds.

Figure 31:
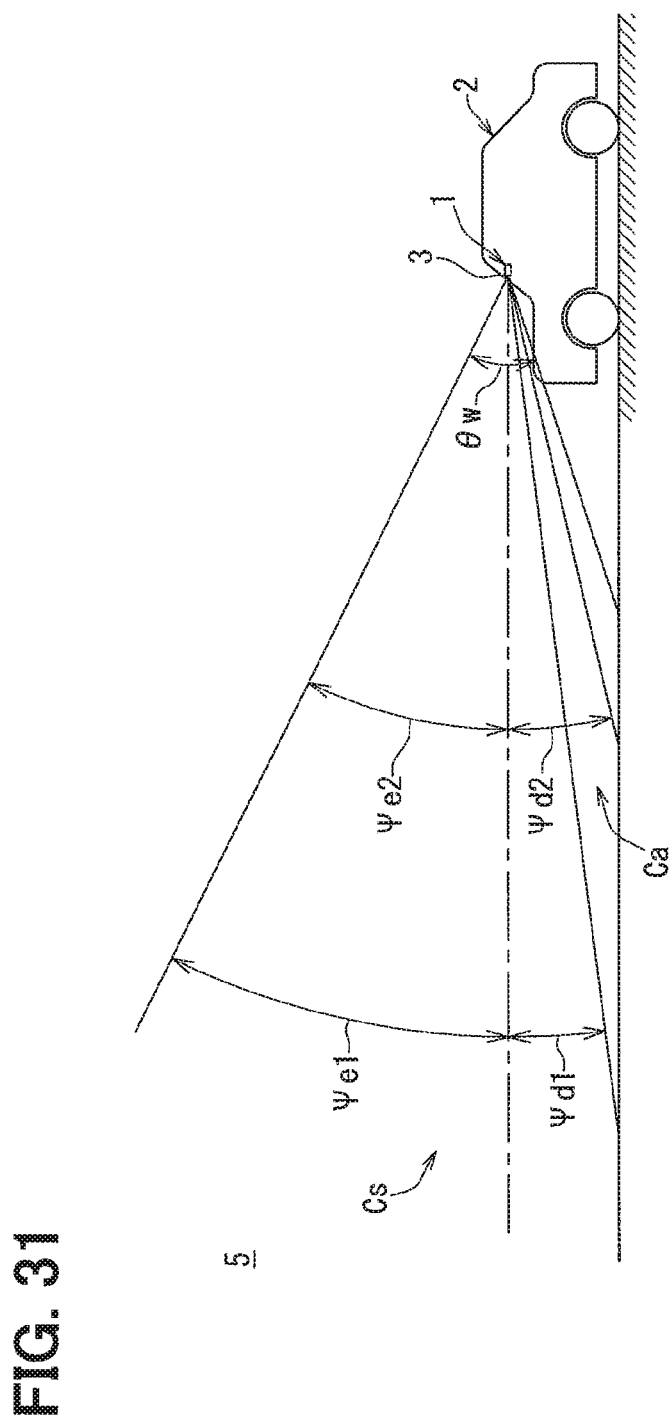
FIG. 31 is a schematic side view illustrating a vehicle control function according to the ninth embodiment.
Figure 32:
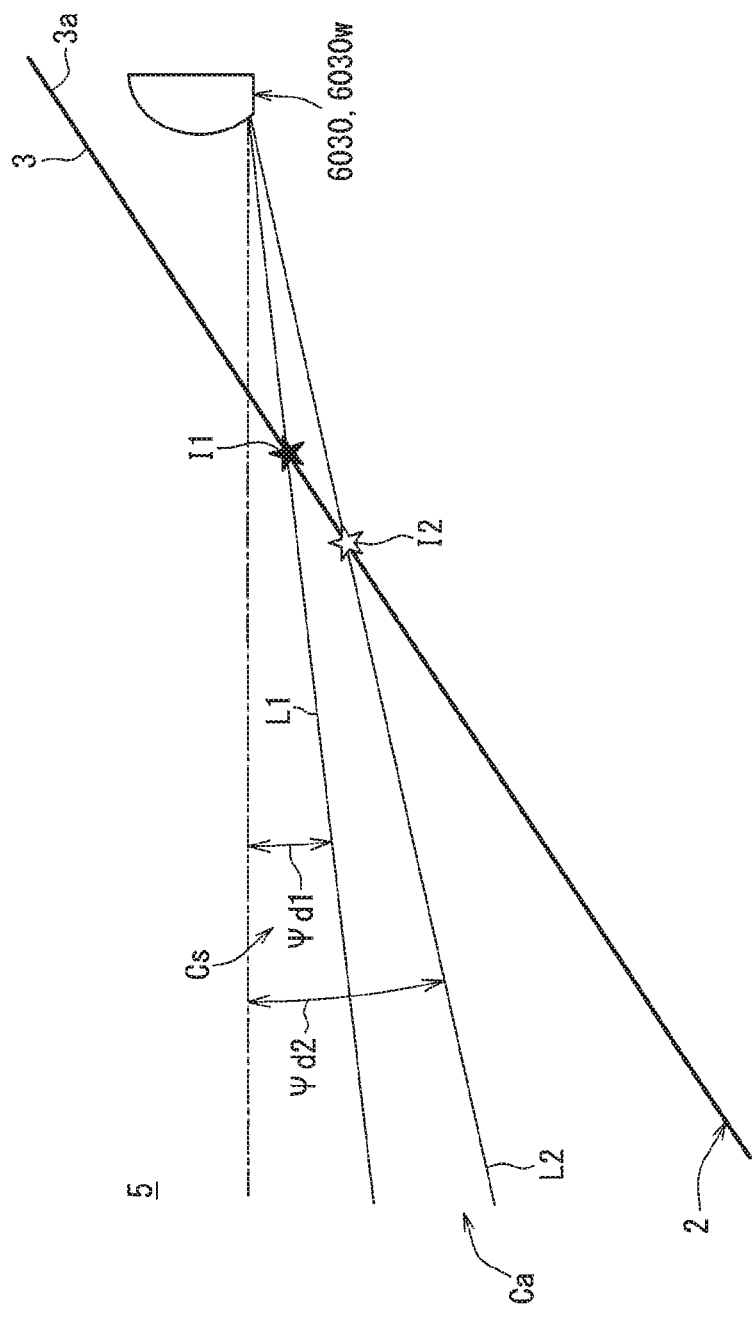
FIG. 32 is a schematic side view illustrating the structure of the hood according to the ninth embodiment.

As shown in FIGS. 31 and 32, a vertical angle of view range of the external environment 5, which is necessary for the specific control Cs of the vehicle 2, falls within the imaging target range of the camera module 1 mounted on the front windshield 3. The vertical angle of view range is defined by a sum of a first depression angle ψd1 and a first elevation angle ψe1 in the horizontal view (that is, side view) of the vehicle 2, which is on the horizontal plane. In this example, the sum of the first depression angle ψd1 and the first elevation angle ψe1 is smaller than the vertical angle of view range of the angle of view θw of the wide angle unit 6030w. For example, the first depression angle ψd1 is set to an angle of 6° or less or the like. For example, the first depression angle ψd1 is set to an angle at which the front obstacle 5a preceding the vehicle 2 by 13 m or more can be imaged when the TTC is equal or more than 2.4 seconds.

Figure 27:
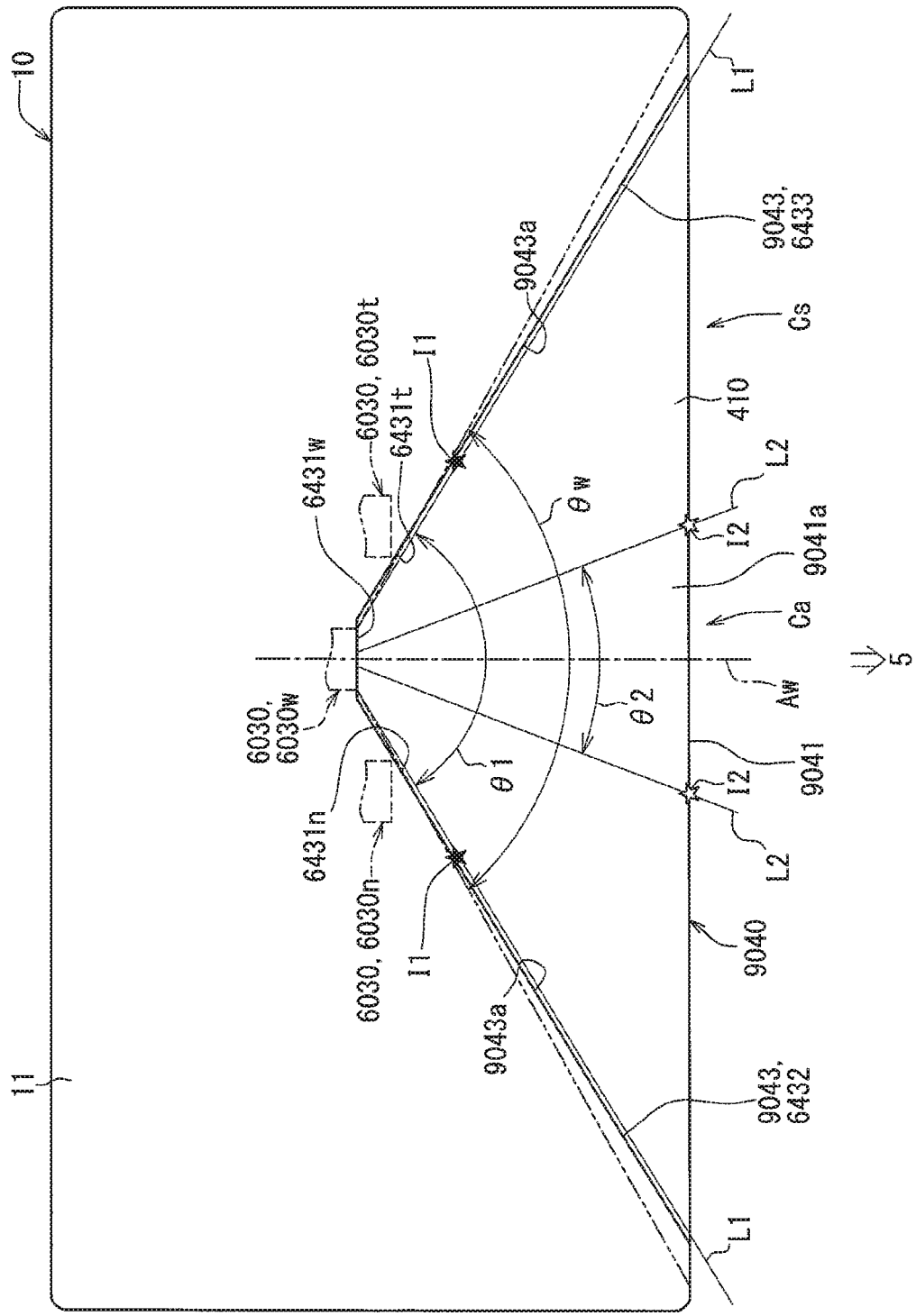
FIG. 27 is a top view illustrating a hood according to the ninth embodiment.
Figure 30:
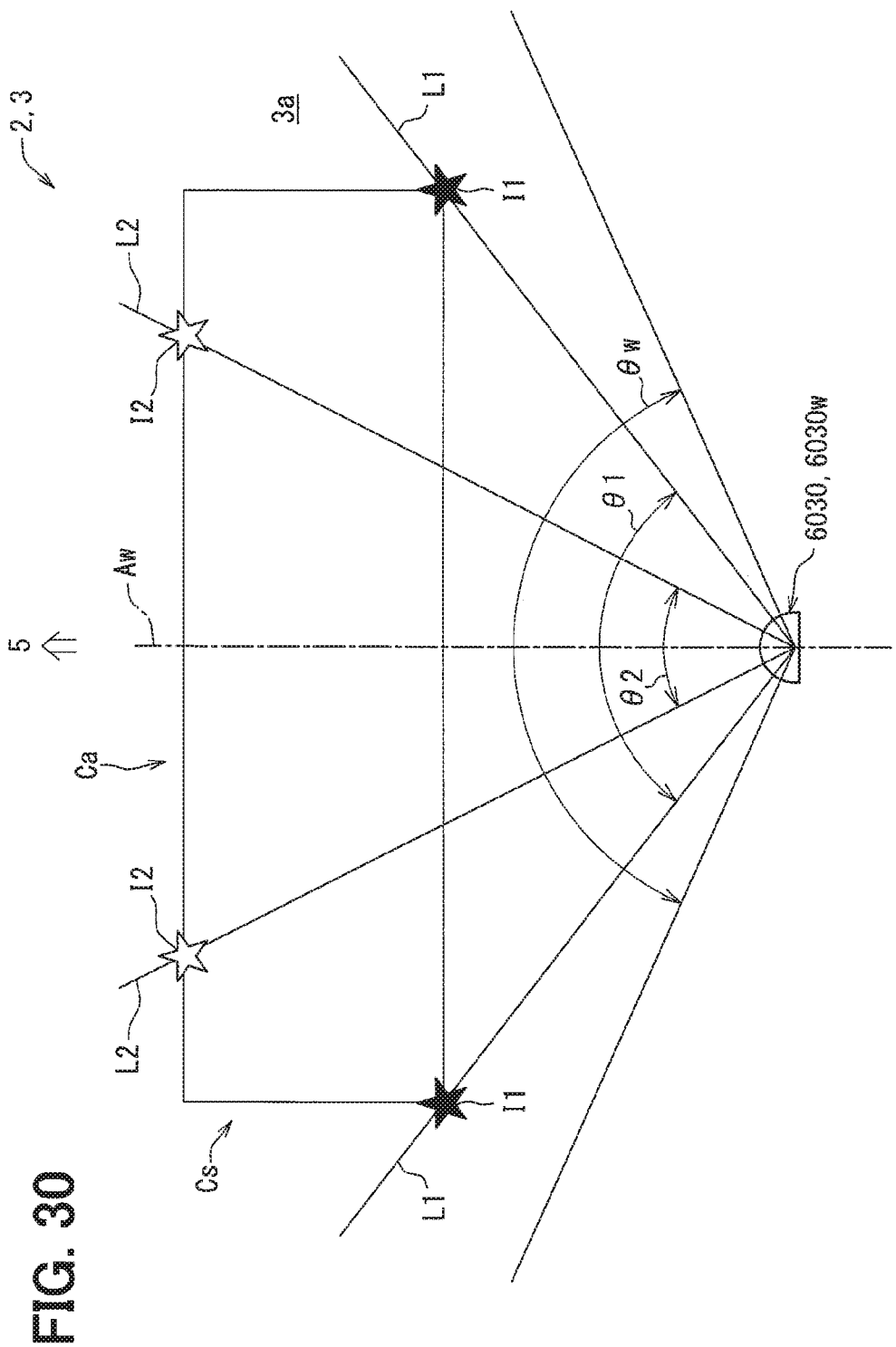
FIG. 30 is a schematic top view illustrating a structure of the hood according to the ninth embodiment.

As shown in FIG. 28, an individual imaging range Us, which is specialized for the specific control Cs, is determined according to the horizontal angle of view range and the vertical angle of view range of the external environment 5, which are necessary for the specific control Cs. As shown in FIGS. 27, 28, 30, and 32, a first lower light ray L1 is supposed as a light ray entering the wide angle unit 6030w at the first taper angle θ1 and at the first depression angle ψd1 from both of right and left ends Use of a lowermost portion of the individual imaging range Us. Under the above supposition, points, at which the first lower light rays L1, which are associated with the specific control Cs, imaginarily intersect with the inner surface 3a of the front windshield 3 of the vehicle 2, are defined as first imaginary intersections 11 as shown in FIGS. 27, 30, and 32. As shown in FIG. 27, each of the first imaginary intersections 11 is associated with an upper side of an intermediate portion between the front end and the rear end of the side wall portion 9043. In this way, each of the side wall portions 9043 is configured as follows.

The respective side wall portions 9043 define inner wall surfaces 9043a on the wide angle unit 6030w side on the rear side of the first imaginary intersections 11 in the vehicle 2. The inner wall surfaces 9043a have slight clearances from both right and left taper lines of the first taper angle θ1, respectively, on the outside. The right and left taper lines of the first taper angle θ1 substantially overlap with the first lower light rays L1, respectively. The respective side wall portions 9043 define the inner wall surfaces 9043a on the external environment 5 side of the first imaginary intersections 11 on the front side in the vehicle 2. The inner wall surfaces 9043a have slight clearances from both the right and left taper lines of the first taper angle θ1, respectively, on the outside. In this example, the inner wall surfaces 9043a of the side wall portion 9043 are continuous in a singular plane by setting those inclination angles with respect to the optical axis Aw of the wide angle unit 6030w to be substantially equal to each other. In this way, in the vehicle 2, the respective side wall portions 9043, extend from the periphery of the wide angle unit 6030w to the first imaginary intersections 11 and further extend from the first imaginary intersections 11 toward the external environment 5 side. In addition, the respective side wall portions 9043 are in a state where the inner wall surfaces 9043a are inclined along the taper lines at the first taper angle θ1 and are outside the first taper angle θ1, which corresponds to the angle of view θw of the wide angle unit 6030w, when viewed in the vertical direction. In the inclined state, the respective side wall portions 9043 enter the inside of the angle of view θw when viewed in the vertical direction.

The respective side wall portions 9043 function as the first side wall portion 6432 and the second side wall portion 6433 in which the exposure windows 6431n and 6431t open, respectively. In this example, the exposure windows 6431n and 6431t according to the ninth embodiment are opened in inclined portions of the side wall portions 9043, respectively, on the wide angle unit 6030w side of the first imaginary intersections 11. That is, the exposure windows 6431n and 6431t are opened on the first side wall portion 6432 and the second side wall portion 6433, respectively.

To the contrary, as shown in FIGS. 27 to 30, the horizontal angle of view range required for the other control Ca of the vehicle 2 falls within the imaging range of the external environment 5. The horizontal angle of view range is defined by a second taper angle θ2 with the optical axis Aw of the wide angle unit 6030w, which is a bisector, when viewed in the vertical direction of the vehicle 2, which is on the horizontal plane. In this example, the second taper angle θ2 is further smaller than the first taper angle θ1 which is smaller than the horizontal angle of view range of the angle of view θw of the wide angle unit 6030w. For example, the second taper angle θ2 is set to an angle of 50° or more and less than 100°. For example, the second taper angle θ2 is set to an angle at which the lane marking 5b on a road surface preceding the vehicle 2 by 8.5 m or more can be imaged.

As shown in FIGS. 31 and 32, the vertical angle of view range required for the other control Ca of the vehicle 2 falls within the imaging target range of the external environment 5. The vertical angle of view range is defined by a sum of a second depression angle ψd2 and a second elevation angle ψe2 in the horizontal view of the vehicle 2 on the horizontal plane. In this example, the sum of the second depression angle ψd2 and the second elevation angle ψe2 is smaller than the vertical angle of view range of the angle of view θw of the wide angle unit 6030w. For example, the second depression angle ψd2 is set to an angle of 6° or more and 12° or less. For example, the second depression angle ψd2 is set to an angle at which the lane marking 5b on the road surface preceding the vehicle 2 by 8.5 m or more can be imaged. The second depression angle ψd2 is larger than the first depression angle ψd1.

As shown in FIG. 28, an individual imaging range Ua specialized for the other control Ca is determined according to the horizontal angle of view range and the vertical angle of view range of the external environment 5, which are necessary for the other control Ca. As shown in FIGS. 28, 29, 30, and 32, second lower light rays L2 are supposed as light rays, which enter the wide angle unit 6030w at the second taper angle θ2 and at the second depression angle ψd2 from both of right and left ends Uae of a lowermost portion of the individual imaging range Ua. Under the above supposition, points at which the second lower light rays L2, which are associated with the other control Ca, imaginarily intersect with the inner surface 3a of the front windshield 3 of the vehicle 2, are defined as second imaginary intersections 12 as shown in FIGS. 27, 30, and 32. As shown in FIG. 27, the second imaginary intersections 12 are associated with an upper portion of the front end of the base wall portion 9041 thereby to produce the following configuration of the base wall portion 9041 and the side wall portions 9043.

In the vehicle 2, on the wide angle unit 6030w side, that is, on the rear side behind the second imaginary intersections 12, the base wall portion 9041 forms a bottom wall surface 9041a. The base wall portion 9041 forms the bottom wall surface 9041a in an entire inside area and in predetermined outside areas. The entire inside area and one of the predetermined outside areas interpose corresponding one of the right and left taper lines of the second taper angle θ2 therebetween. The right and left taper lines of the second taper angle θ2 substantially overlap with the respective second lower light rays L2. In this way, the base wall portion 9041 extends from the periphery of the wide angle unit 6030w toward the second imaginary intersections 12 and extends inside and outside of the second imaginary intersections 12 in the vehicle 2. In the base wall portion 9041, the bottom wall surface 9041a extends to the slight outside portions of the taper lines of the first taper angle θ1 in the outside portions of the second imaginary intersections 12. In addition, the inner wall surfaces 9043a of the respective side wall portions 9043, extend to the slight outside portions of the taper lines of the first taper angle θ1 in the outside portions of the second imaginary intersections 12, respectively. With the configuration, the base wall portion 9041 and the respective side wall portions 9043 are formed to extend laterally outward beyond the second imaginary intersections 12.

The hood 9040 according to the ninth embodiment is substantially identical to the hood 6040 of the first embodiment except for the configuration. According to the hood 9040 of the ninth embodiment, in the vehicle 2, the side wall portions 9043 spread from the periphery of the wide angle unit 6030w toward the imaginary intersections 11. According to the configuration, even in a case where the hood 9040 is formed small, incidence of the lower light rays L1, which intersect with the front windshield 3 at the imaginary intersections L1 at the taper angle θ1, are unlikely blocked by the side wall portion 9043. The taper angle θ1 defines the horizontal angle of view range in the imaging target range; the horizontal angle of view range is smaller than the angle of view θw of the wide angle unit 6030w. Therefore, the configuration enables to reduce the size of the camera module 1 including the hood 9040 that secures the taper angle θ1 capable of capturing the normal optical image.

According to the hood 9040 of the ninth embodiment, the side wall portions 9043 of the vehicle 2 spread along the taper angle θ1 outside the taper angle θ1 on the wide angle unit 6030w side of the imaginary intersections 11. According to the configuration, the hood 9040 securing the taper angle θ1 can be formed in a limited size. The configuration enables to promote size reduction of the camera module 1 including the hood 9040 which secures the taper angle θ1 capable of imaging the normal optical image.

According to the hood 9040 of the ninth embodiment, in the vehicle 2, the side wall portions 9043 spread along the taper angle θ1 to the outside of the taper angle θ1 on the side unlikely to affect the taper angle θ1. The taper angle θ1 is secured by the side wall portions 9043 spreading from the wide angle unit 6030w toward the imaginary intersections 11, that is, on the external environment 5 side beyond the imaginary intersections 11. The side wall portions 9043 are raised on the base wall portion 9041 in a wide region on the external environment 5 side beyond the imaginary intersections 11. The side wall portions 9043 and the base wall portion 9041 are enabled in cooperation to block light before the light is reflected on the front windshield 3 and to restrict the light from entering the inside of the taper angle θ1 if reflected on the front windshield 3. Therefore, the configuration enables to enhance the effect to restrict reflected light on the front windshield 3 from being superimposed on the normal optical light and from interfering with the imaging, without largely impairing size reduction of the camera module 1, which includes the hood 9040 to secure the taper angle θ1 and is capable of imaging the normal optical image.

In addition, according to the hood 9040 of the ninth embodiment, as described above, the side wall portions 9043 hardly block incidence of the lower light rays L1, which intersect with the front windshield 3 at the imaginary intersections 11 at the taper angle θ1 within the imaging target range. The taper angle θ1 is necessary for the specific control Cs of the vehicle 2. Therefore, the configuration enables to reduce the size of the camera module 1 including the hood 9040, which is capable of imaging the normal optical image within the taper angle θ1 necessary for the specific control Cs.

According to the hood 9040 of the ninth embodiment, in the vehicle 2, the side wall portions 9043 spread from the periphery of the wide angle unit 6030w toward the first imaginary intersections 11. The first imaginary intersections 11 are the imaginary intersections 11. According to the configuration, even in a case where the hood 9040 is formed small, the side wall portions 9043 hardly block incidence of the first lower light rays L1, which intersect with the front windshield 3 at the first imaginary intersections I1 at the first depression angle ψd1 and at the taper angle θ1. Moreover, in the vehicle 2, the base wall portion 9041 spreads from the periphery of the wide angle unit 6030w toward the second imaginary intersections 12. According to the configuration, the base wall portion 9041 and the side wall portions 9043 hardly block incidence of the second lower light rays L2, which intersect with the front windshield 3 at the second imaginary intersections 12 at the second taper angle θ2 and at the second depression angle 42. The second taper angle θ2 is smaller than the first taper angle θ1. The second depression angle ψd2 is larger than the first depression angle ψd1. From the above viewpoints, the configuration enables to reduce the size of the camera module 1 including the hood 9040. The hood 9040 is capable of not only capturing the normal optical image within the first taper angle θ1, which is necessary for the specific control Cs of the vehicle 2, but also capturing the normal optical image within the second taper angle θ2 which is necessary for the other control Ca of the vehicle 2.

Further, according to the hood 9040 of the ninth embodiment, in the vehicle 2, the side wall portions 9043 and the base wall portion 9041 spread toward the second imaginary intersections 12 on the side where the side wall portions 9043 and the base wall portion 9041 unlikely affect the first taper angle θ1. The first taper angle θ1 is secured by the side wall portions 9043 and the base wall portion 9041 spreading from the wide angle unit 6030w toward the first imaginary intersections 11, that is, on the external environment 5 side beyond the first imaginary intersections 11. The side wall portions 9043 and the base wall portion 9041 are in cooperation enabled to block light before being reflected on the front windshield 3 and to restrict the light from entering the inside of the first taper angle θ1 and from entering the inside of the second taper angle θ2 if reflected on the front windshield 3. Therefore, the configuration enables to capture the normal optical image within the first taper angle θ1, which is necessary for the specific control Cs, and to capture the normal optical image within the second taper angle θ2 which is necessary for the other control Ca.

According to the ninth embodiment, in the collision restriction control of the vehicle 2 against the front obstacle 5a as the specific control Cs, the relatively large first taper angle θ1 can be ensured and the desired collision restriction function can be attained. On the other hand, in the driving control of the vehicle 2 in the traveling lane, which is the other control Ca than the specific control Cs, the configuration enables to ensure the relatively large second depression angle ψd2 of the second lower light ray L2 which is incident at the second taper angle θ2. In this case, the second taper angle θ2 may be relatively small. The configuration enables to exhibit a desired driving control function.

Incidentally, in the ninth embodiment including the narrow angle unit 6030*n* and the telescopic unit 6030*t* together with the wide angle unit 6030*w* described above, the same operational effects as those of the first to fourth noted sets of the sixth embodiment can be produced.

Tenth Embodiment

Figure 33:
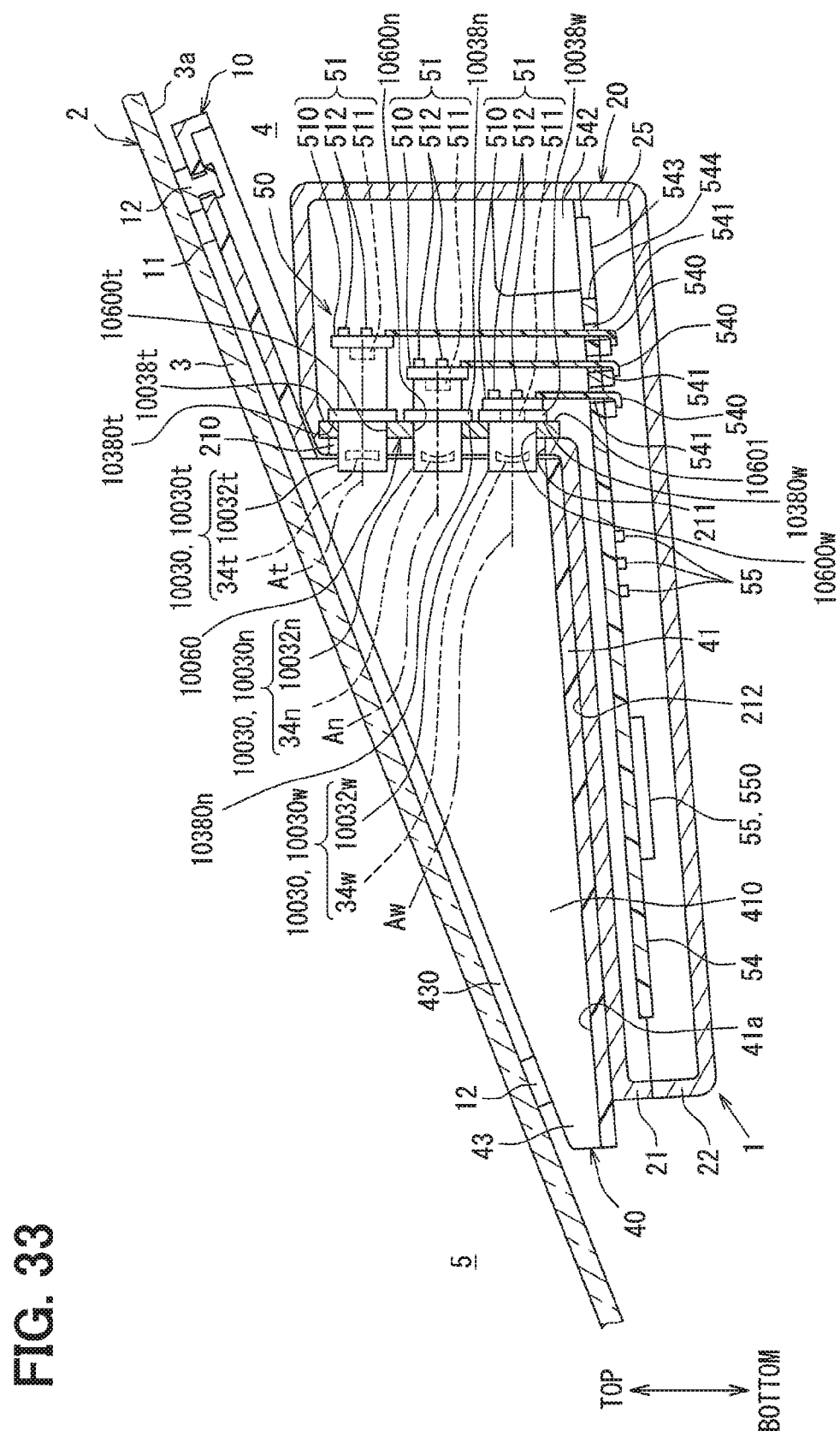
FIG. 33 is a cross-sectional view illustrating a camera module corresponding to FIG. 2 according to a tenth embodiment.

As shown in FIG. 33, a tenth embodiment is a modification of the first embodiment. In the tenth embodiment, a common positioning member 10060 common to respective lens units 30 is added to the camera module 1.

The common positioning member 10060 is formed in a plate-like shape and is made of a rigid material such as metal or resin. The common positioning member 10060 is fixed to the upper casing member 21 of the camera casing 20. The camera casing 20 accommodates respective lens units 10030 and the imaging system 50 in the accommodation space 25 by using a screw or adhesive or by press fitting. In this example, as in the first embodiment, the camera casing 20 is mounted inside the front windshield 3 through the bracket assembly 10 so that the common positioning member 10060 is positioned in the vehicle 2.

The common positioning member 10060 has multiple (in the present embodiment, three) insertion holes 10600*w*, 10600*n*, and 10600*t* corresponding to the respective lens units 10030, individually, in other words, the respective units 10030*w*, 10030*n*, and 10030*t*, individually. The respective insertion holes 10600*w*, 10600*n*, and 10600*t* penetrate through the common positioning member 10060 in a cylindrical hole shape aligned with optical axes Aw, An, and At of the respective units 10030*w*, 10030*n*, and 10030*t*, respectively. In other words, the respective insertion holes 10600*w*, 10600*n*, and 10600*t* penetrate through the common positioning member 10060 in the axial direction. The axial direction intersects with each of the lateral direction and the vertical direction. Lens barrels 10032*w*, 10032*n*, and 10032*t* of the respective units 10030*w*, 10030*n*, and 10030*t* are formed in cylindrical shapes having outer diameters, respectively. The outer diameters complement the diameters of the respective insertion holes 10600*w*, 10600*n*, and 10600*t*, respectively.

The common positioning member 10060 has a reference surface portion 10601 in which the respective insertion holes 10600*w*, 10600*n*, and 10600*t* are opened on its rear surface opposite to the external environment 5. The reference surface portion 10601 is formed in a flat surface shape and is located substantially perpendicular to the optical axes Aw, An, and At of the respective units 10030*w*, 10030*n*, and 10030*t*. The reference surface portion 10601 spreads along a singular plane at a position where the respective units 10030*w*, 10030*n*, and 10030*t* overlap with each other when viewed in the vertical direction. In this example, the lens barrels 10032*w*, 10032*n*, and 10032*t* of the respective units 10030*w*, 10030*n*, and 10030*t* are integrated with flanges 10038*w*, 10038*n*, and 10038*t* in annular plate-like shapes, respectively, at locations that overlap with the reference surface portion 10601 in the axial direction. In the respective units 10030*w*, 10030*n*, and 10030*t*, the flanges 10038*w*, 10038*n*, and 10038*t* have abutment surface portions 10380*w*, 10380*n*, and 10380*t*, respectively, on its front surfaces on the external environment 5 side. The abutment surface portions 10380*w*, 10380*n*, and 10380*t* are in flat surface shapes and are substantially perpendicular to the respective optical axes Aw, An, and At.

In the configuration, the lens barrels 10032*w*, 10032*n*, and 10032*t* of the respective units 10030*w*, 10030*n*, and 10030*t* are coaxially fitted into the insertion holes 10600*w*, 10600*n*, and 10600*t*, respectively, correspondingly along the axes. In addition, the lens barrels 10032*w*, 10032*n*, and 10032*t* of the respective units 10030*w*, 10030*n*, and 10030*t* are in surface contact with the abutment surface portions 10380*w*, 10380*n*, and 10380*t* of the respective flanges 10038*w*, 10038*n*, and 10038*t*, respectively, on the common reference surface portion 10601 in the axial direction. In this way, the respective units 10030*w*, 10030*n*, and 10030*t* are positioned in the axial direction with respect to the camera casing 20 on the same plane along the reference surface portion 10601. In addition, the units 10030*w*, 10030*n*, and 10030*t* are fitted into the insertion holes 10600*w*, 10600*n*, and 10600*t*, respectively, to be positioned also in the lateral direction and in the vertical direction.

The lens barrels 10032*w*, 10032*n*, and 10032*t* of the respective units 10030*w*, 10030*n*, and 10030*t* are positioned in the manner described above and are fixed to the common positioning member 10060 with the respective flanges 10038*w*, 10038*n*, and 10038*t* by using screws. Alternatively, the lens barrels 10032*w*, 10032*n*, and 10032*t* of the units 10030*w*, 10030*n*, and 10030*t* are fixed to the insertion holes 10600*w*, 10600*n*, and 10600*t*, respectively, by using adhesive or by press fitting.

According to the tenth embodiment described above, in the vehicle 2, the respective lens units 10030 are accommodated in the camera casing 20, which is attached to the front windshield 3, to be positioned in the axial direction by using the common positioning member 10060 which is common to those units. In other words, according to the first embodiment, the units 10030*w*, 10030*n*, and 10030*t* as the lens units 10030, which belong to the first to fourth noted sets, are positioned in the axial direction by using the common positioning member 10060 with respect to the camera casing 20. In this way, the common positioning member 10060 enables to reduce variation in a mutual axial positional relationship of the respective units 10030*w*, 10030*n*, and 10030*t* in the vehicle 2. In other words, the positioning accuracy of the respective units 10030*w*, 10030*n*, and 10030*t* in the vehicle 2 can be secured. Further, the axial positions of the respective units 10030*w*, 10030*n*, and 10030*t* can be adjusted collectively by using the common positioning member 10060. Therefore, productivity can be enhanced.

According to the common positioning member 10060 of the tenth embodiment, the reference surface portion 10601 abuts against the respective units 10030*w*, 10030*n*, and 10030*t* in the axial direction in the vehicle 2, thereby to position all of the units. In particular, in the tenth embodiment, all of the units 10030*w*, 10030*n*, and 10030*t* are positioned on the same plane by the abutment against the reference surface portion 10601. According to the configuration, the respective units 10030*w*, 10030*n*, and 10030*t* are enabled to be precisely positioned on the same plane. Therefore, the configuration hardly causes variation per se in the mutual axial positional relationship in the vehicle 2. In other words, the respective units 10030*w*, 10030*n*, and 10030*t* in the vehicle 2 can be positioned with high accuracy. In addition, the respective units 10030*w*, 10030*n*, and 10030*t* can be easily and collectively positioned in the axial direction by being abutted against the reference surface portion 10601 on the same plane. Therefore, the configuration enables to promote high productivity.

Incidentally, the respective units 10030*w*, 10030*n*, and 3030*t* according to the tenth embodiment are substantially identical to the units 30*w*, 30*n*, and 30*t* of the first embodiment except for the configurations described above. Therefore, according to the tenth embodiment, the same operational effects as those of the first to fourth noted sets in the first embodiment can be produced. In particular, according to the tenth embodiment, the depths of recognition field Dw, Dn, and Dt can be accurately set by positioning the respective units 10030w, 10030n, and 10030t in the axial direction. Therefore, the configuration enables to secure reliability of the effect to restrict loss of an object in the overlap regions Rnw and Rtn. In particular, according to the tenth embodiment, the respective units 10030w, 10030n, and 10030t are fitted into the insertion holes 10600w, 10600n, and 10600t, which penetrate through the common positioning member 10060 in the axial direction, respectively, thereby being positioned in the lateral direction. Therefore, according to the tenth embodiment, the configuration enables to secure reliability of the effect of enhancing image position accuracy in the lateral direction in the external environment imaging.

Other Embodiments

Figure 34:
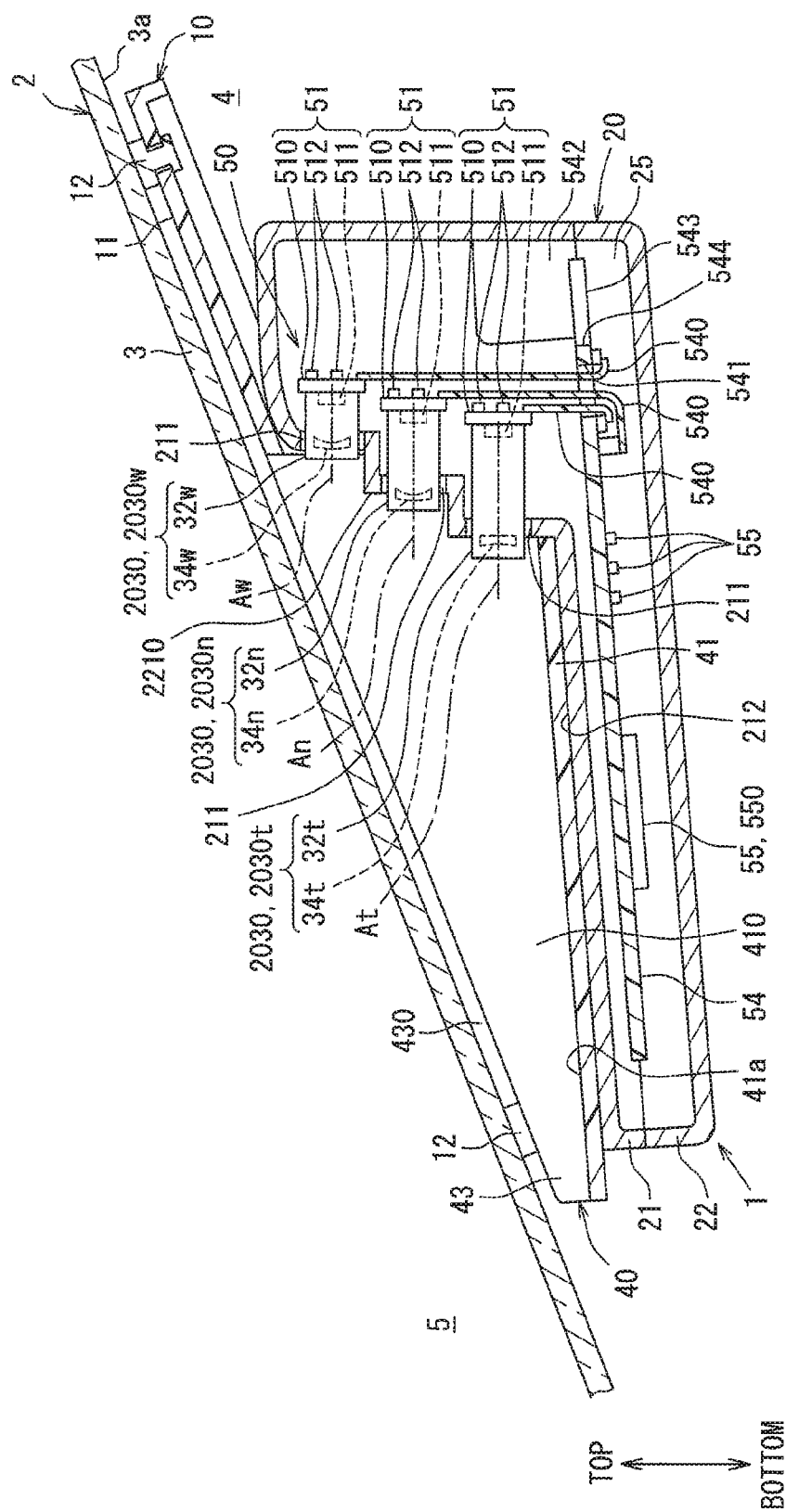
FIG. 34 is a cross-sectional view illustrating a modification of FIG. 7.
Figure 37:
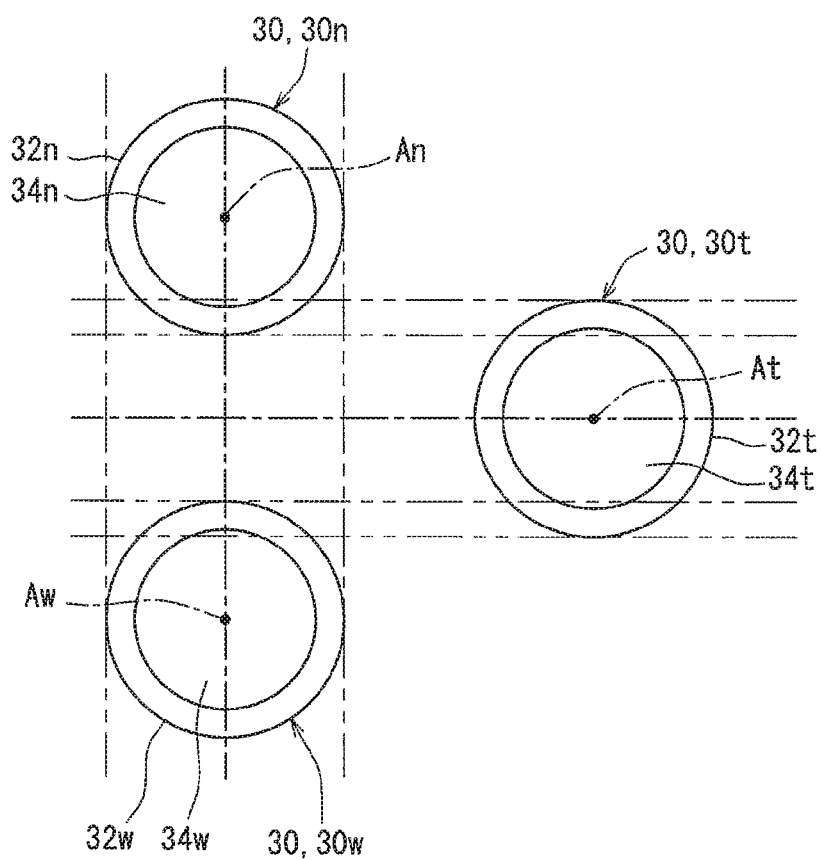
FIG. 37 is a front view illustrating a modification of FIG. 5.
Figure 38:
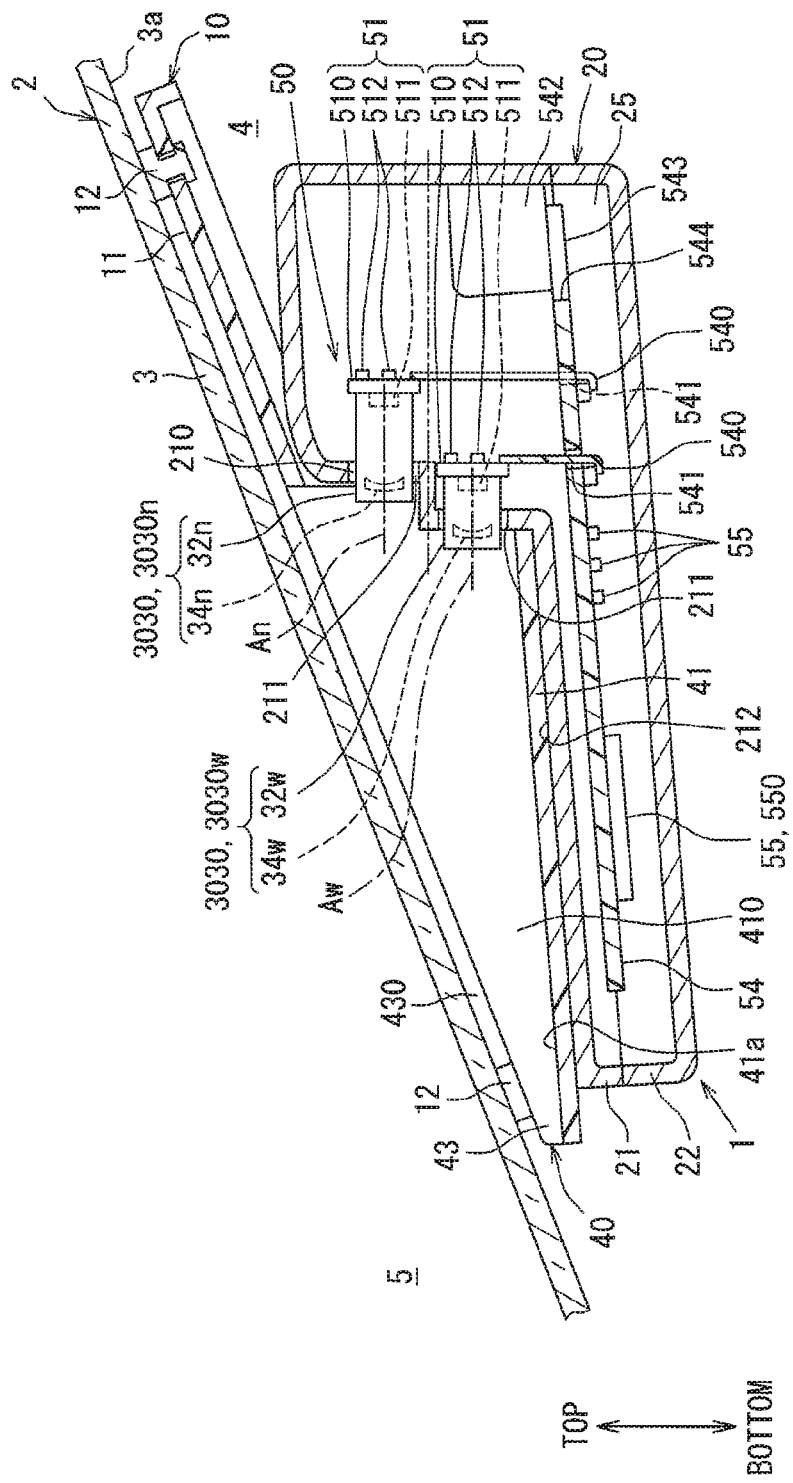
FIG. 38 is a cross-sectional view illustrating a modification of FIG. 8.
Figure 39:
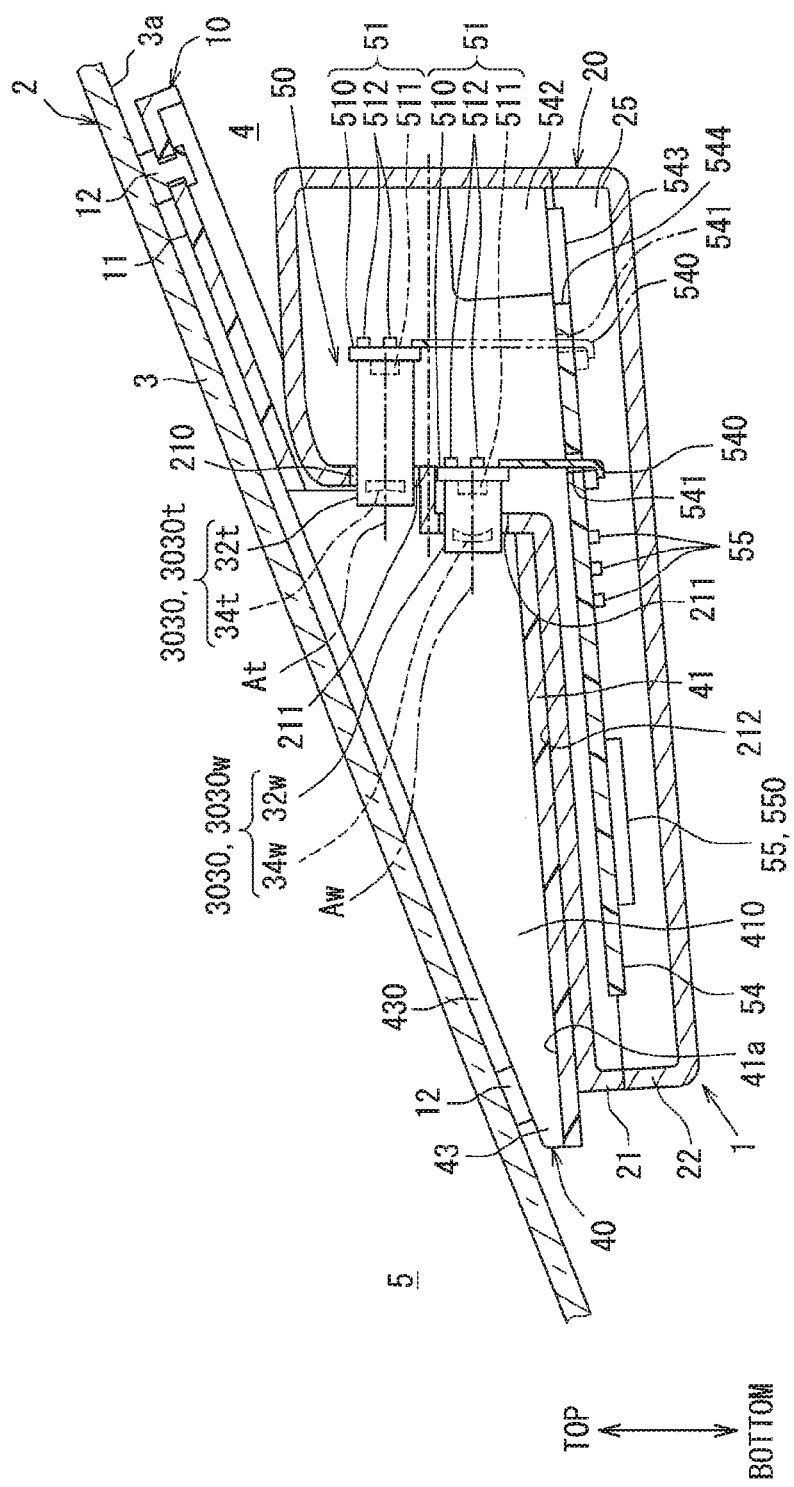
FIG. 39 is a cross-sectional view illustrating a modification of FIG. 9.
Figure 45:
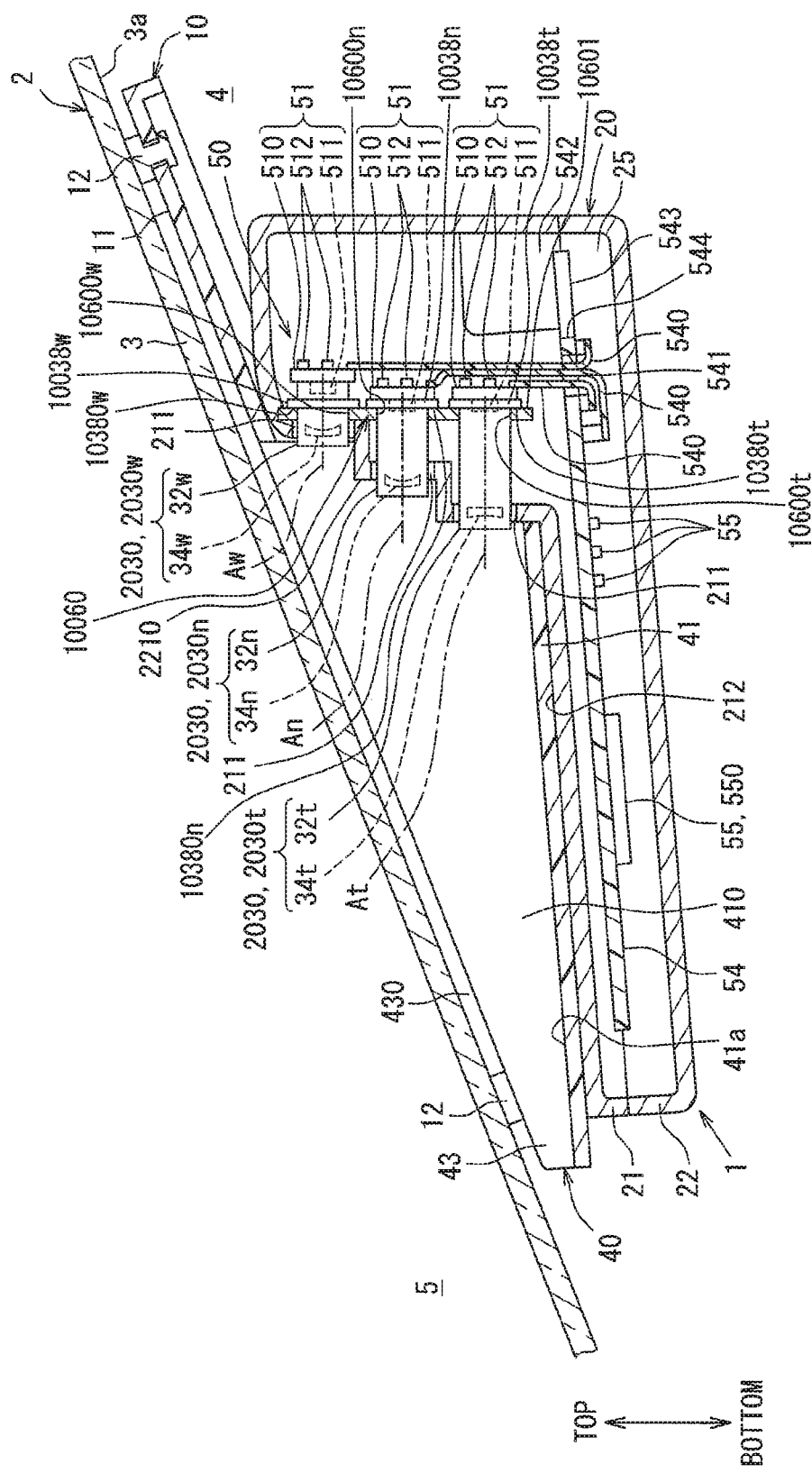
FIG. 45 is a cross-sectional view illustrating a modification of FIG. 34.
Figure 46:
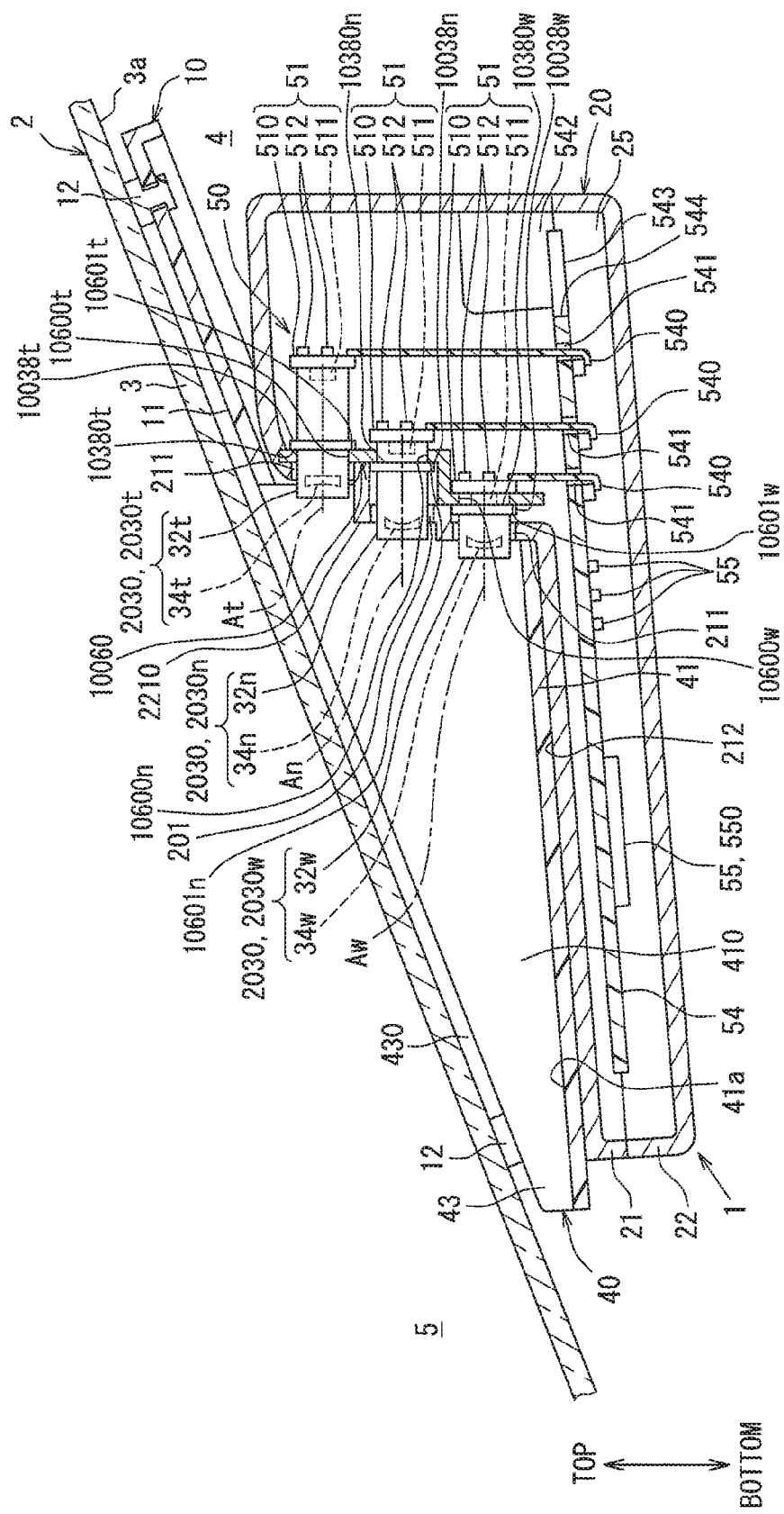
FIG. 46 is a cross-sectional view illustrating a modification of FIG. 7.
Figure 47:
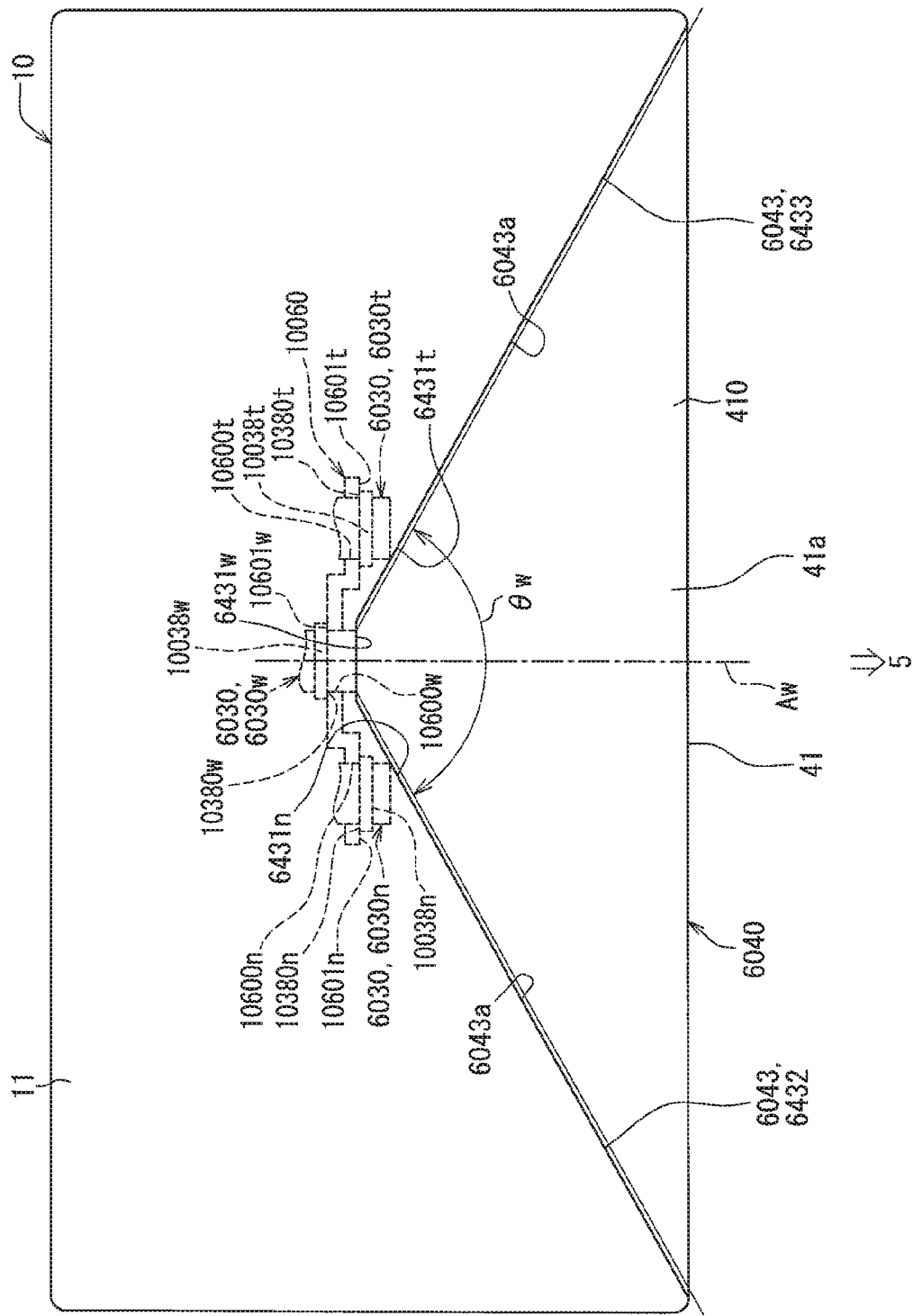
FIG. 47 is a top view illustrating one modification of FIG. 17.
Figure 48:
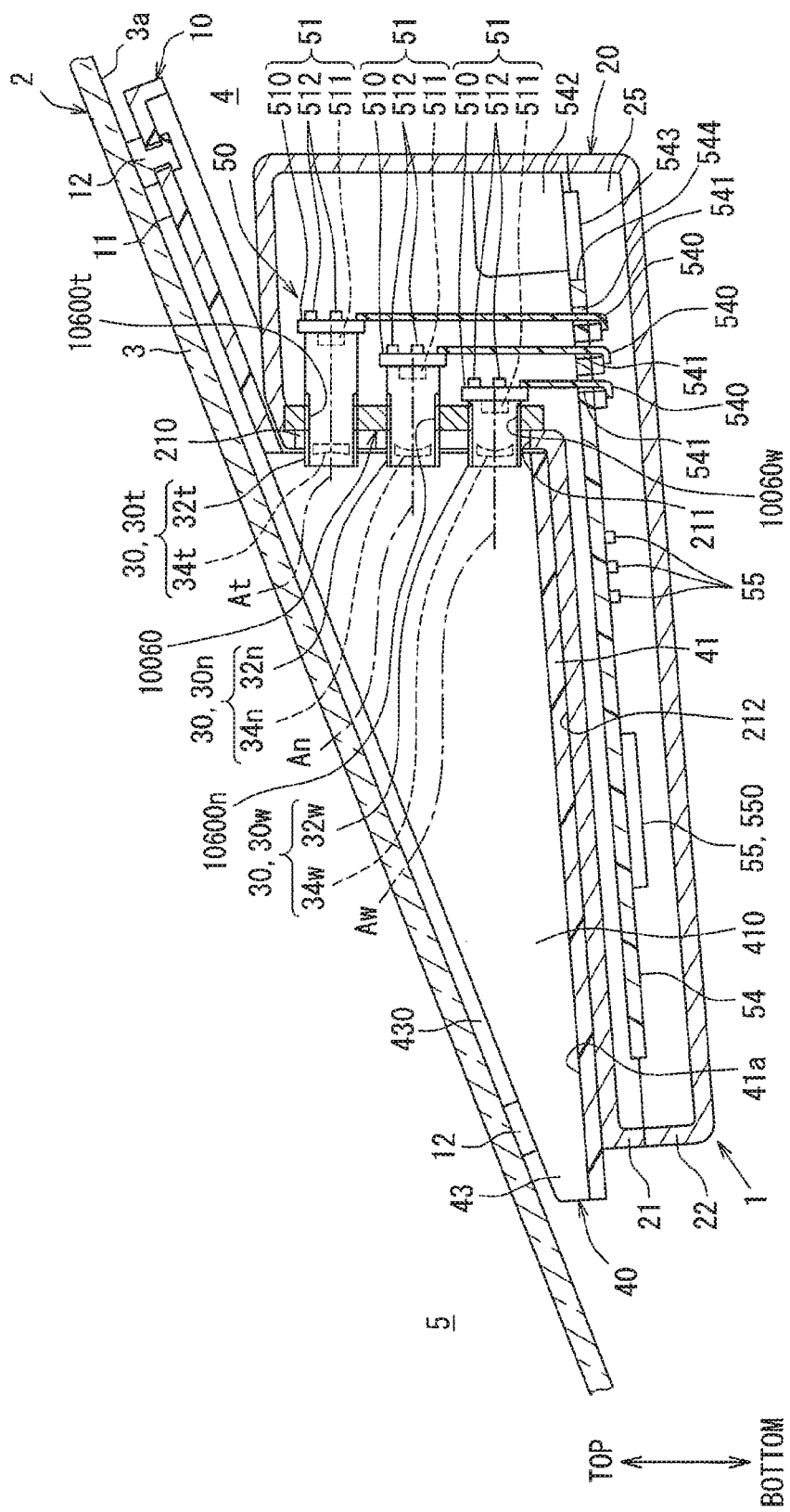
FIG. 48 is a cross-sectional view illustrating a modification of FIG. 2.

The multiple embodiments have been described above. However, the present disclosure is not to be interpreted as being limited to the embodiments, and may be applied to various embodiments and combinations without departure from the spirit of the present disclosure. In the following description, FIGS. 34, 45, and 46 represent representative examples of modifications relating to the second embodiment, and FIGS. 35 to 37, 40, 48 and 49 represent representative examples of modifications relating to the first embodiment, and FIGS. 38, 39, 43, and 44 represent representative examples of modifications relating to the third embodiment. In the following description, FIGS. 41 and 42 typically illustrate modifications of the ninth embodiment, and FIG. 47 typically illustrates a modification of the sixth embodiment.

Specifically, in Modification 1 related to the first to fifth and tenth embodiments, placement positions of at least two kinds of units of the wide angle units 30w, 2030w, 3030w, 4030w, 5030w, and 10030w, the narrow angle units 30n, 2030n, 3030n, and 10030n and the telescopic units 30t, 2030t, 3030t, and 10030t may be replaced with each other. In a specific example shown in FIG. 34 in this case, the placement positions of the wide angle unit 2030w and the telescopic unit 2030t are replaced with each other in the second embodiment. In this example, due to focal lengths corresponding to the angles of view θw, θn, and θt (more specifically, combined focal points of the lenses 34w, 34n, 34t and their subsequent lens sets), the distance between each of the front end of the telescopic unit 2030t and the front end of the narrow angle unit 2030n and the corresponding imager unit 51 is longer than the distance between the front end of the wide angle unit 2030w and the corresponding imager unit 51. Therefore, in the specific example shown in FIG. 34, the telescopic unit 2030t and the narrow angle unit 2030n protrude toward the deeper side further than the wide angle unit 2030w, thereby being capable of reducing the size of the camera module 1 in the longitudinal direction.

In Modification 2 of the first to tenth embodiments, the telescopic units 30t, 2030t, 3030t, 6030t, 7030t, 8030t, and 10030t may not be provided. In this case, even in a case where the narrow angle lens 34n of the narrow angle units 30n, 2030n, 3030n, 6030n, 7030n, 8030n, and 10030n is replaced with the telescopic lens 34t of the telescopic units 30t, 2030t, 3030t, 6030t, 7030t, 8030t, and 10030t, the same operational effects as those of the first to tenth embodiments can be produced.

In Modification 3 relating to the first, second, fourth, fifth and tenth embodiments, the placement positions of the telescopic units 30t, 2030t, and 10030t may be other than the upper side of the narrow angle units 30n, 2030n, and 1003n. In a specific example shown in FIGS. 35 to 37 in that case, the telescopic unit 30t is located on one side of at least one of the wide angle unit 30w and the narrow angle unit 30n in the lateral direction. In this way, the telescopic unit 30t overlaps with at least one of the wide angle unit 30w and the narrow angle unit 30n in the lateral direction.

In Modification 4 related to the third to fifth and tenth embodiments, according to the second embodiment, the wide angle units 3030w, 4030w, 5030w, and 10030w may protrude toward the deeper side further than at least one of the upper narrow angle units 3030n, 10030n and the telescopic units 3030t, 10030t. In a specific example shown in FIGS. 38 and 39 in that case, the wide angle unit 3030w protrudes toward the deeper side further than both of the narrow angle unit 3030n and the telescopic unit 3030t.

In Modification 5 related to the first, third, fourth, fifth and tenth embodiments, the lens window 211 may be provided in each of the units 30w, 30n, 30t, 3030w, 3030n, 3030t, 4030w, 5030w, 10030w, 10030n, and 10030t, separately, according to the second embodiment. In Modification 6 related to the second embodiment, the lens window 211 may be provided in common to all of the units 2030w, 2030n, and 2030t according to the first embodiment.

Figure 40:
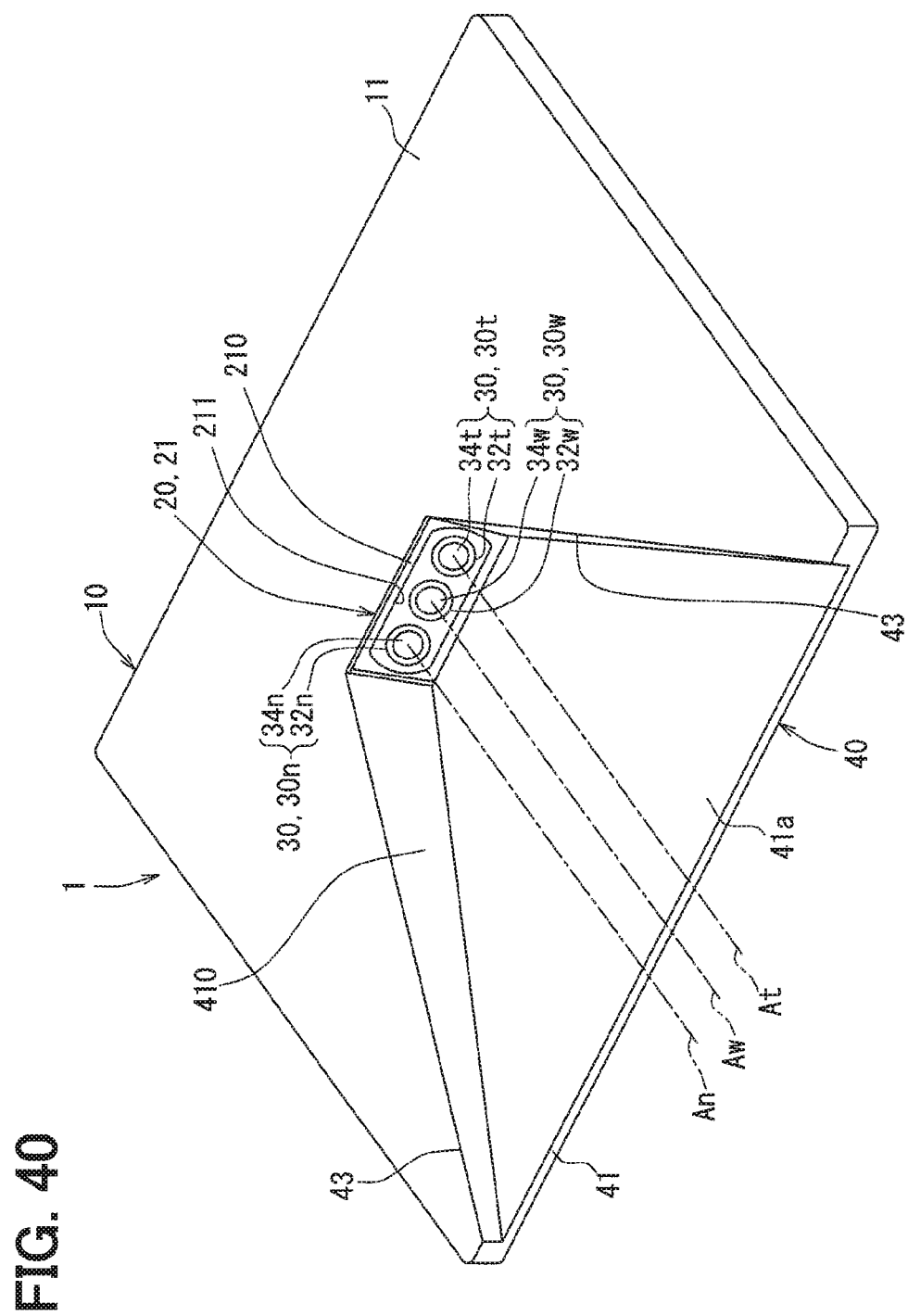
FIG. 40 is a cross-sectional view showing a modification of FIG. 7.
Figure 41:
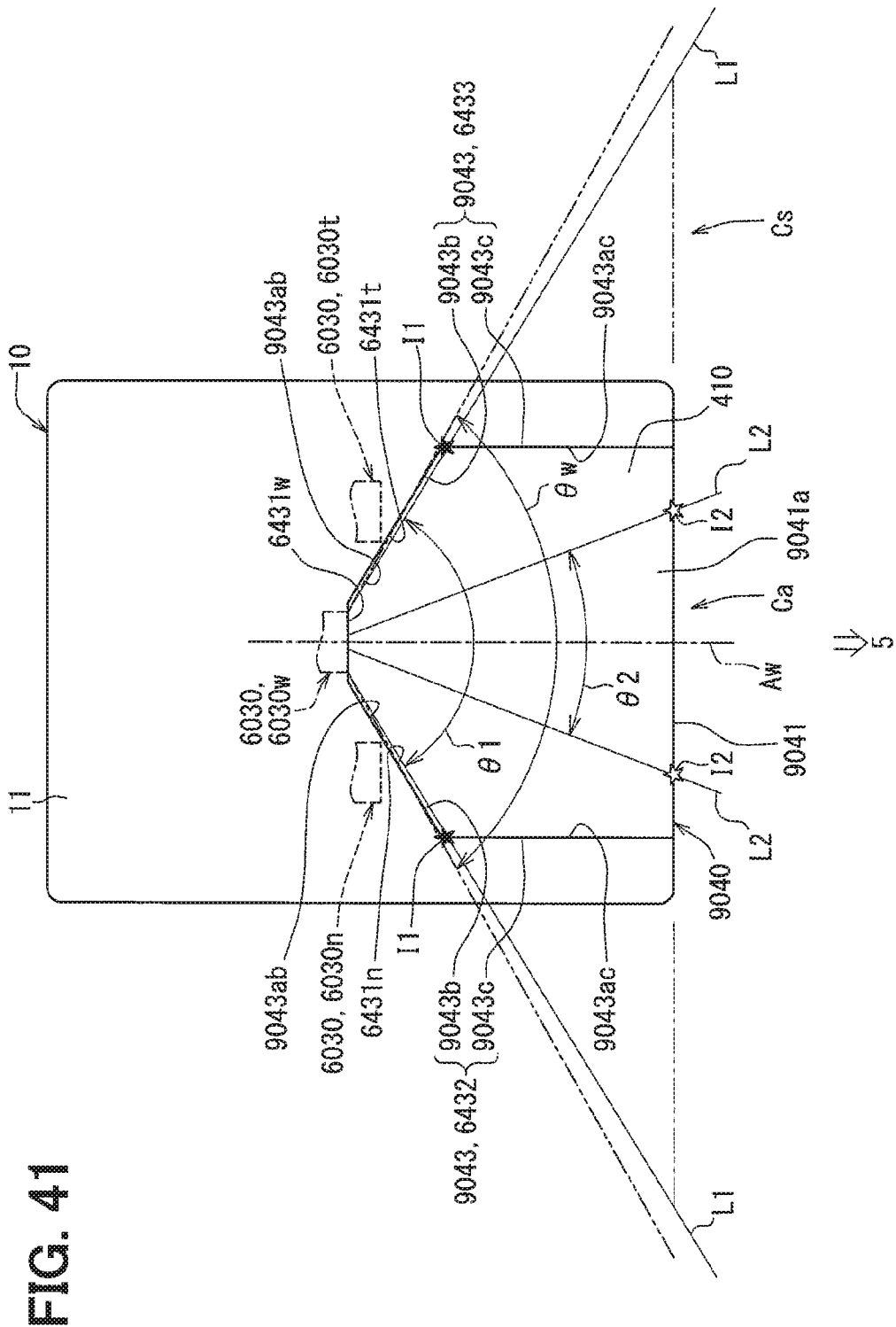
FIG. 41 is a cross-sectional view illustrating a modification of FIG. 27.

In Modification 7 relating to the first, fourth, fifth and tenth embodiments, the optical axes Aw, An, and At of the respective units 30w, 30n, 30t, 4030w, 5030w, 10030w, 10030n, and 10030t shown in FIG. 40 are decentered from each other particularly in the lateral direction so that those units may overlap with each other when viewed in the lateral direction. In that case, the operational effects other than those related to image position accuracy in the lateral direction can be produced in the same manner as that in the first embodiment. In addition, image position accuracy in the lateral direction can be secured by correcting the shift in the position coordinates.

In Modification 8 relating to the second, third and sixth to tenth embodiments, the depth of recognition field Dw of the wide angle units 2030w, 3030w, 6030w, and 10030w may be set according to the fourth embodiment. In Modification 9 relating to the second, third and sixth to tenth embodiments, the depth of recognition field Dw of the wide angle units 2030w, 3030w, 6030w, and 10030w may be set according to the fifth embodiment.

In Modification 10 relating to the sixth to ninth embodiments, the placement positions of the narrow angle units 6030n, 7030n, 8030n and the telescopic units 6030t, 7030t, and 8030t may be replaced with each other. In Modification 11 relating to the sixth to ninth embodiments, the front end of the wide angle unit 6030w may enter the imaging space 410 from the inside of the lens window 6211w and the inside of the wide angle exposure window 6431w. In Modification 12 relating to the sixth to ninth embodiments, the front end of the wide angle unit 6030w may enter the inside of the lens window 6211w in a state being out of the imaging space 410 and being out of the wide angle exposure window 6431w.

In Modification 13 according to the sixth to ninth embodiments, at least two of the optical axes Aw, An, and At of the respective units 6030w, 6030n, 6030t, 7030n, 7030t, 8030n, and 8030t may be decentered from each other in both of the lateral direction and the vertical direction, and shifted in the vertical direction. In Modification 14 according to the ninth to the seventeenth embodiments, the specific control Cs may be other than the collision restriction control of the vehicle 2. In Modification 15 according to the ninth embodiment, as long as the other control Ca is different from the specific control Cs, the other control Ca may be other than the driving control of the vehicle 2 in a traveling lane. In Modification 16 according to the ninth embodiment, the other control Ca may not be executed. In that case, the second taper angle θ2 is not defined. Therefore, the second imaginary intersection 12 may not be imaginarily defined. For example, the base wall portion 9041 may be formed along the second depression angle ψd2 as specified.

In Modification 17 according to the first to tenth embodiments, at least one side wall portions 43, 6043, and 9043 may be raised upright from the base wall portions 41 and 9041 at an acute or obtuse angle. In Modification 18 according to the first to tenth embodiments, the side wall portion 43, 6043, and 9043 on at least one side may be formed in a bent plate shape or in a curved plate shape. In a specific example shown in FIG. 41 in this case, the side wall portions 9043 are bent at positions corresponding to the first imaginary intersections 11 to have bend portions 9043b and straight portions 9043c, respectively. In this example, the bend portions 9043b are formed such that those inner wall surfaces 9043ab spread along the taper lines of the angle of view θ1 on the outside of the first taper angle θ1 on the wide angle unit 6030w side of the first imaginary intersections 11 as in the ninth embodiment. The first taper angle θ1 corresponds to the angle of view θw of the wide angle unit 6030w. The exposure windows 6431n and 6431t are opened in the bend portions 9043b. On the other hand, the straight portion 9043c is different from that in the ninth embodiment on the external environment 5 side beyond the first imaginary intersections 11. Inner wall surfaces 9043ac spread substantially in parallel to the optical axis Aw of the wide angle unit 6030w inside the taper lines of the first taper angle θ1.

Figure 42:
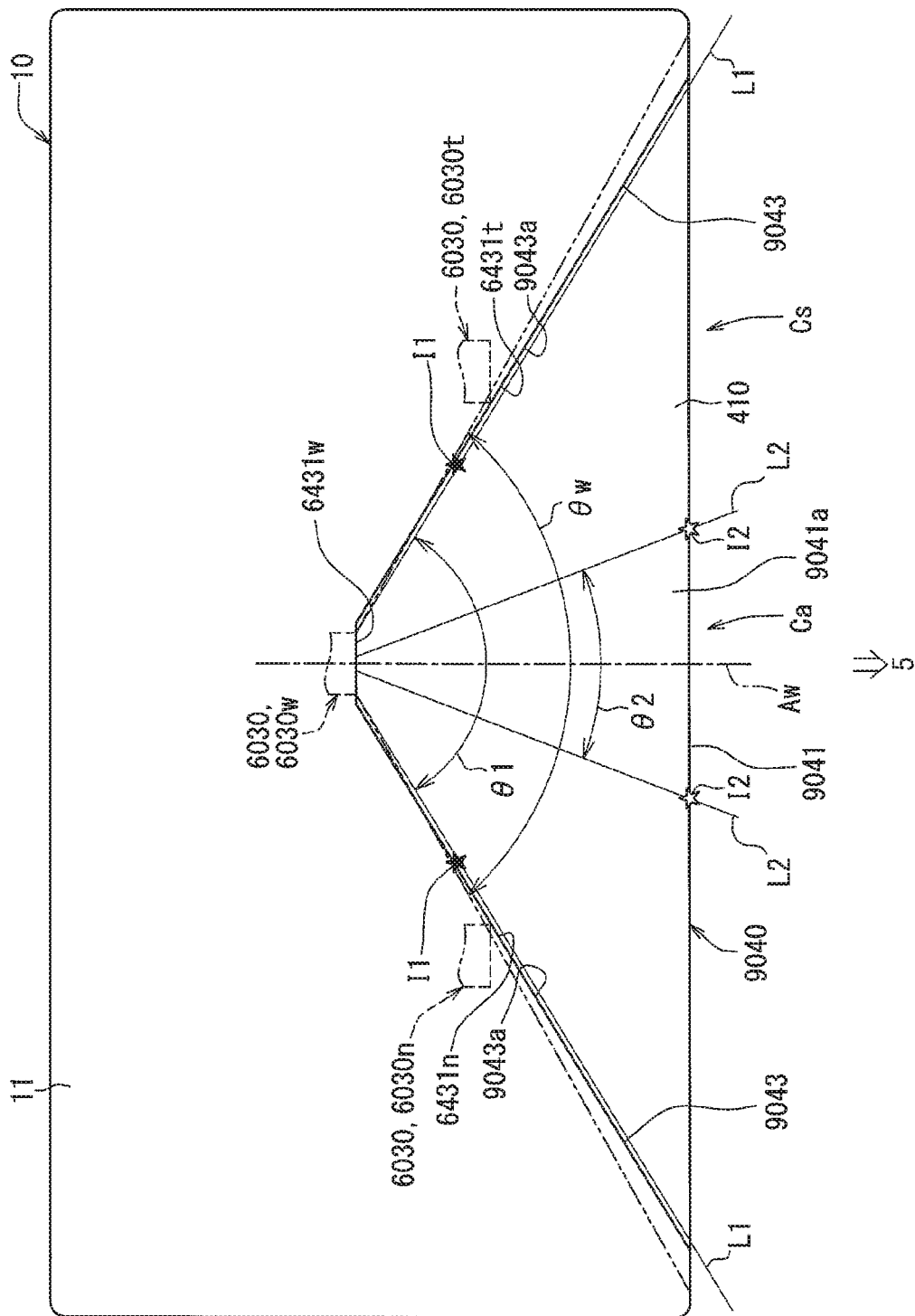
FIG. 42 is a cross-sectional view illustrating a modification of FIG. 27.
Figure 43:
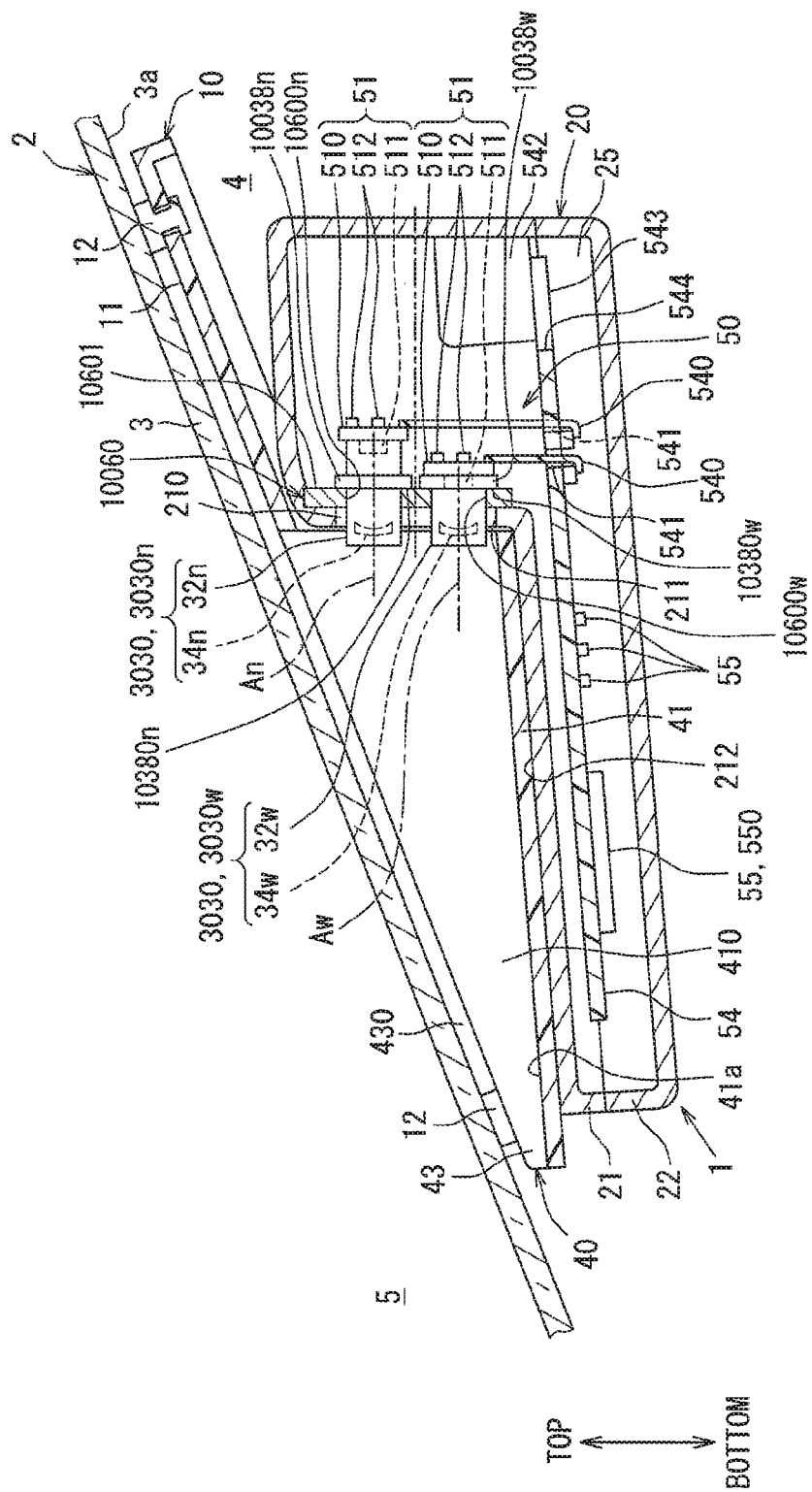
FIG. 43 is a cross-sectional view illustrating a modification of FIG. 8.
Figure 44:
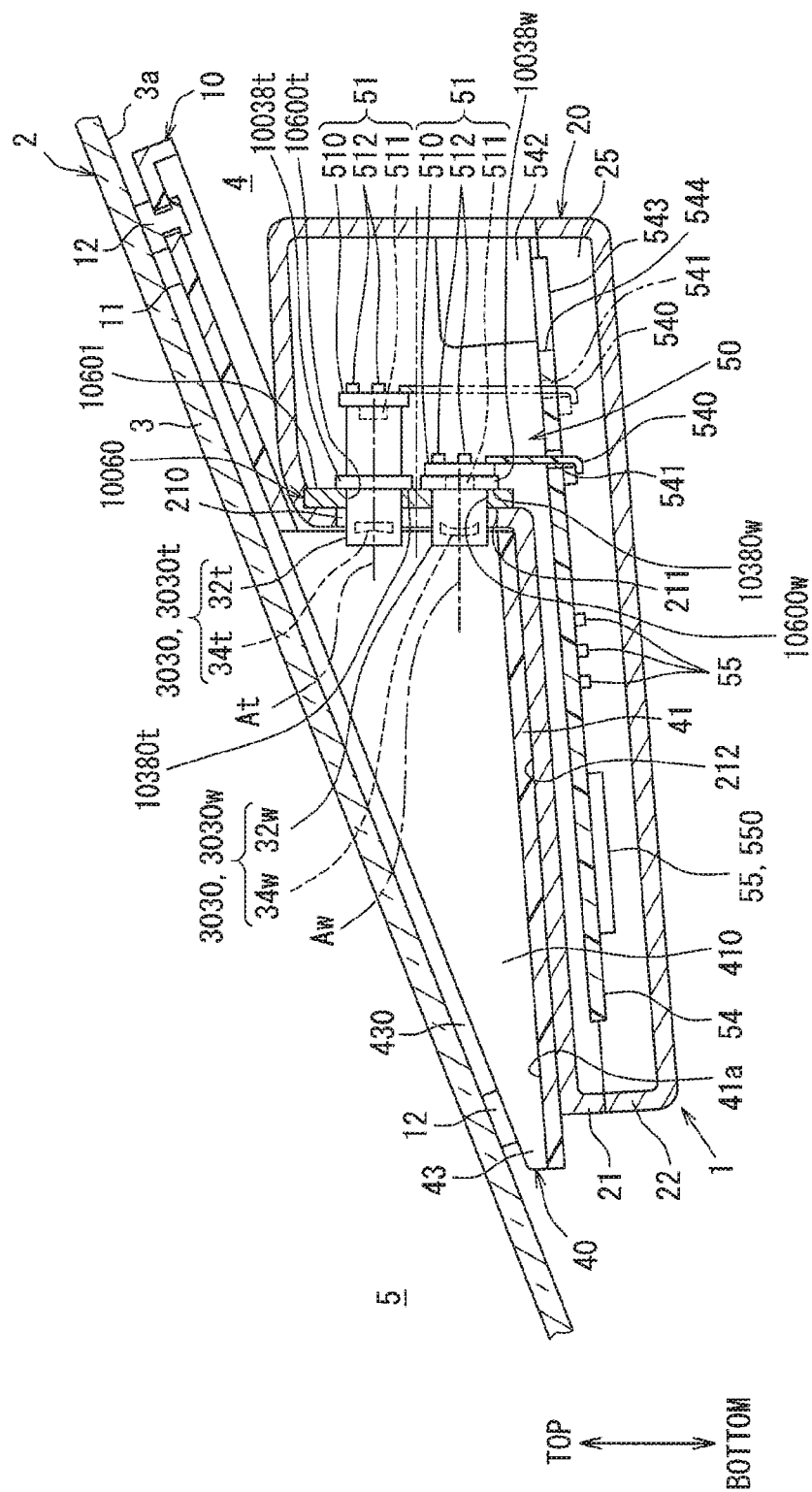
FIG. 44 is a cross-sectional view illustrating a modification of FIG. 9.

In Modification 19 relating to the ninth embodiment, as shown in FIG. 42, the exposure windows 6431n and/or 6431t open in at least one of the bend portions on the external environment 5 side of the first imaginary intersection 11. The exposure windows 6431n and/or 6431t open on at least one side wall portion 9043. FIG. 42 shows a specific example in which Modification 19 is applied to the side wall portions 9043 on both sides.

In Modification 20 related to the third to fifth embodiments, the common positioning member 10060 and the flanges 10038w, 10038n, 10038t according to the tenth embodiment may be provided so that the respective units 30n, 30t, 3030w, 3030n, 3030t, 4030w, and 5030w overlap with each other in at least one of the vertical direction and the lateral direction and are positioned on the same plane by using the reference surface portion 10601. In a specific example shown in FIGS. 43 and 44 in that case, the respective units 3030w, 3030n, and 3030t are positioned on the same plane at the overlapping position in the vertical direction or the lateral direction.

In Modification 21 related to the second and sixth to ninth embodiments, the common positioning member 10060 and the flanges 10038w, 10038n, 10038t according to the tenth embodiment may be provided so that the respective units 2030w, 2030n, 2030t, 6030w, 6030n, 6030t, 7030n, 7030t, 8030n, and 8030t are positioned on the same plane by using the reference surface portion 10601 so far as those units overlap with each other in at least one of the vertical direction and the lateral direction. In a specific example shown in FIG. 45 in that case, the respective units 2030w, 2030n, and 2030t are positioned on the same plane at the overlapping positions in the vertical direction in combination with Modification 1 described above.

In Modification 22 related to the first to ninth embodiments, the common positioning member 10060 and the flanges 10038w, 10038n, 10038t modified from the tenth embodiment may be provided so that the respective units 30w, 30n, 30t, 2030w, 2030n, 2030t, 3030w, 3030n, 3030t, 4030w, 5030w, 6030w, 6030n, 6030t, 7030n, 7030t, 8030n, and 8030t are positioned on a reference surface portion on planes different from each other. In a specific example shown in FIGS. 46 and 47 in that case, the respective units 2030w, 2030n, 2030t, 6030w, 6030n, and 6030t are individually positioned in the axial direction on the planes different from each other by using reference surface portions 10601w, 10601n, and 10601t, which are divided, respectively.

In Modification 23 related to the first to ninth embodiments, the common positioning member 10060 modified from the tenth embodiment may be provided so that the respective units 30w, 30n, 30t, 2030w, 2030n, 2030t, 3030w, 3030n, 3030t, 4030w, 5030w, 6030w, 6030n, 6030t, 7030n, 7030t, 8030n, and 8030t are fixed to the insertion holes 10600w, 10600n, and 10600t, respectively, by using screws and are positioned. In a specific example shown in FIG. 48 in that case, positioning in the axial direction is attained by screwing the respective units 30w, 30n, and 30t into the insertion holes 10600w, 10600n, and 10600t, respectively.

Figure 49:
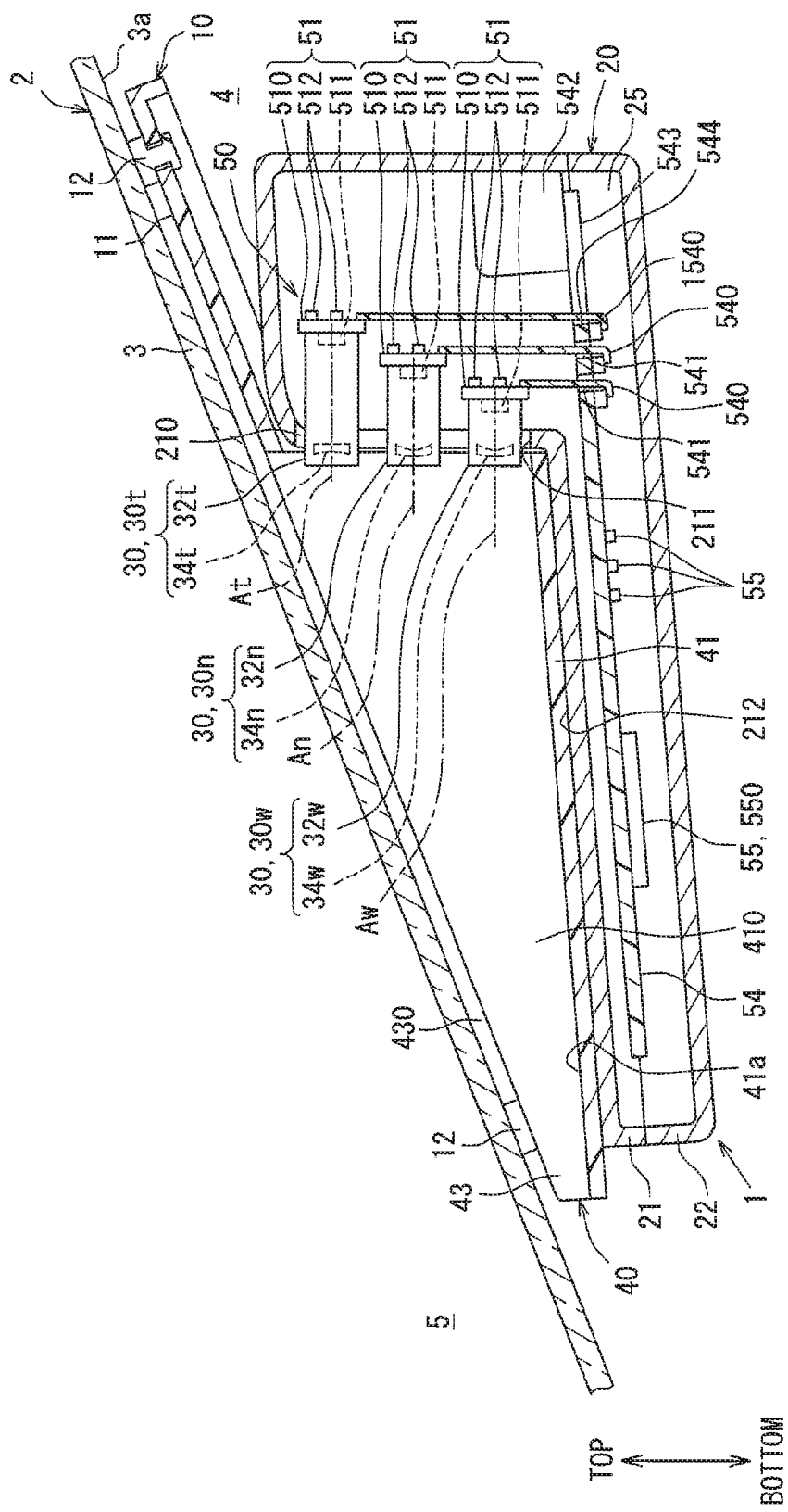
FIG. 49 is a cross-sectional view illustrating a modification of FIG. 2.

In Modification 24 according to the first to tenth embodiments, at least a part of the functions of the control circuit 55 may be produced by an external circuit such as an ECU outside the camera casing 20. In Modification 25 according to the first to tenth embodiments, at least one through window 541 may not be formed on the control board 54. In that case, the FPC 540 inserted through the through window 541 is replaced with an FPC 1540 which wraps around an outer peripheral side of the rear side edge 544 of the control board 54, as shown in FIG. 49. FIG. 49 shows a specific example in which only the FPC 1540, which is connected to the telescopic unit 30t and the corresponding imager unit 51, is wrapped around the outer peripheral side of the rear side edge 544.

In Modification 26 according to the first to tenth embodiments, the bracket main body 11 may be adhesively fixed to the front windshield 3 without providing the mounting pad 12. In Modification 27 according to the first to tenth embodiments, the mounting pad 12 held with the camera casing 20 may be adhesively fixed to the front windshield 3 without providing the bracket main body 11.

In Modification 28 according to the first to tenth embodiments, the hood 40, 6040, and 9040 may be formed separately from the bracket main body 11. In Modification 29 related to the first to fifth and tenth embodiments, the hood 6040 modified from the sixth embodiment may be replaced with the hood 40 to expose the units 30w, 30n, 30t, 2030w, 2030n, 2030t, 3030w, 3030n, 3030t, 4030w, 5030w, 10030w, 10030n, and 10030t not from the exposure windows 6431w, 6431n, and 6431t, respectively, but from the portion between the rear ends of the respective side wall portions 6043. In Modification 30 related to the first to fifth and tenth embodiments, the hood 9040 modified from the ninth embodiment may be replaced with the hood 40 to expose the units 30w, 30n, 30t, 2030w, 2030n, 2020t, 3030w, 3030n, 3030t, 4030w, 5030w, 10030w, 10030n, and 10030t not from the exposure windows 6431w, 6431n, and 6431t, respectively, but from the portion between the rear ends of the respective side wall portions 9043.

In Modification 31 according to the seventh and eighth embodiments, the hood 6040 may be replaced with the hood 9040 of the ninth embodiment. In Modification 32 according to the first to fifth and tenth embodiments, the hood 40 may not be provided. In Modification 33 according to the first to tenth embodiments, multiple convex ribs or multiple concave grooves may be provided to extend along the lateral direction in the hoods 40, 6040, and 9040.

In Modification 34 according to the first to tenth embodiments, extension directions of at least two of the optical axes Aw, An and At of the respective units 30w, 30n, 30t, 2030w, 2030n, 2020t, 3030w, 3030n, 3030t, 4030w, 5030w, 6030w, 6030n, 6030t, 7030n, 7030t, 8030n, 8030t, 10030t, 10030n, and 10030t may be inclined relative to each other. In addition to the above, in Modification 35 according to the first to tenth embodiments, the camera module 1 may be mounted inside a rear windshield of the vehicle 2, and in this case, a context is reversed in the first to tenth embodiments.

What is claimed is:

1. A camera module configured to be mounted on an inside of a windshield of a vehicle and to image an external environment of the vehicle, the camera module comprising:
    a plurality of lens units having optical axes, respectively, wherein the optical axes are shifted from each other, an optical image of the external environment individually enters within angles of view, which are around the optical axes, respectively, the angles of view are different from each other;
    an imaging system to perform imaging individually through the lens units and to generate an outside image of the external environment; and
    a hood defining an imaging space, which is to guide the optical image of the external environment within an imaging target range of the imaging system to the lens units, and to restrict incidence of light on the lens units from an outside of the imaging target range, wherein
    the hood includes:
    a base wall portion to be located to face the windshield via the imaging space; and
    a side wall portion raised from the base wall portion at a lateral side of the imaging space and inclined laterally outward correspondingly to an angle of view of one of the lens units from a periphery of the one of the lens units toward an external environment side, and
    an exposure window opens in the side wall portion on the external environment side of the one of the lens units and exposes an other of the lens units to the imaging space, wherein
    the other of the lens units is shifted relative to the one of the lens units in a longitudinal direction of the vehicle.

2. The camera module according to claim 1, wherein an end of the other of the lens units on the external environment side is located outside the imaging space.

3. The camera module according to claim 2, wherein the end of the other of the lens units on the external environment side enters the exposure window.

4. The camera module according to claim 1, wherein an end of the other of the lens units on the external environment side enters the imaging space from an inside of the exposure window.

5. The camera module according to claim 4, wherein the end of the other of the lens units on the external environment side includes a reflection restriction portion to restrict light reflection.

6. The camera module according to claim 1, wherein the lens units further include a third lens unit, and a second exposure window opens in the side wall portion on the external environment side beyond the one of the lens units and exposes the third lens unit to the imaging space.

7. The camera module according to claim 6, wherein the side wall portion includes a pair of side wall portions on both of lateral sides of the imaging space, the exposure window opens in one of the side wall portions, and the second exposure window opens in an other of the side wall portions.

8. The camera module according to claim 1, wherein the side wall portion is located to spread along an angle of view of the one of the lens units.

9. The camera module according to claim 1, wherein under a definition that an imaginary intersection is a point, at which a lower light ray imaginarily intersects with the windshield, that the lower light ray is incident on the one of the lens units at a taper angle within the imaging target range, and that the taper angle defines a horizontal angle of view range which is smaller than an angle of view of the one of the lens units, the side wall portion is located to spread from the periphery of the one of the lens units toward the imaginary intersection.

10. The camera module according to claim 9, wherein the taper angle defines the horizontal angle of view range, which is within the imaging target range and is required for a specific control of the vehicle.

11. The camera module according to claim 10, wherein under a definition that a first imaginary intersection is the imaginary intersection being a point at which a first lower light ray imaginarily intersects with the windshield, that the first lower light ray is incident on the one of the lens units at a first taper angle and at a first depression angle, and that the first taper angle is the taper angle defining the horizontal angle of view range required for the specific control, and
    under a definition that a second imaginary intersection is a point at which a second lower light ray imaginarily intersects with the windshield, that the second lower light ray is incident on the one of the lens units at a second taper angle and at a second depression angle, and that the second taper angle defines a horizontal angle of view range, which is in the imaging target range and is required for an other control than the specific control of the vehicle,
    the second taper angle is smaller than the first taper angle,
    the second depression angle is larger than the first depression angle,
    the side wall portion is located to spread from the periphery of the one of the lens units toward the first imaginary intersection, and
    the base wall portion is located to spread from the periphery of the one of the lens units toward the second imaginary intersection.

12. The camera module according to claim 1, wherein under a definition that a set of the lens units, in which angles of view overlap with each other, is a noted set, depths of recognition field determined by the lens units, which belong to the noted set, and the imaging system overlap with each other, in which a far point of an other of the noted set is between a near point and a far point of one of the noted set in the external environment, and each of the far point of the one and the far point of the other defines a limit position of image recognition which is implemented by imaging through corresponding one of the lens units.

13. The camera module according to claim 1, wherein the other of the lens units is located without vertical shift from the one of the lens units.

14. The camera module according to claim 1, wherein the other of the lens units and the one of the lens units overlap with each other when viewed from the lateral side.

15. The camera module according to claim 1, wherein the other of the lens units and the one of the lens units are mounted on a circuit board that is a singular component.

16. The camera module according to claim 1, wherein the other of the lens units and the one of the lens units are located at a center of the hood that is a singular component.

17. A camera module configured to be mounted on an inside of a windshield of a vehicle and to image an external environment of the vehicle, the camera module comprising:
a plurality of lens units having optical axes, respectively, wherein the optical axes are shifted from each other, an optical image of the external environment individually enters within angles of view, which are around the optical axes, respectively, the angles of view are different from each other; and
an imaging system to perform imaging individually through the lens units and to generate an outside image of the external environment, wherein
under a definition that a noted set is a set of the lens units, in which angles of view overlap with each other,
depths of recognition field determined by the lens units, which belong to the noted set, and the imaging system overlap with each other, in which a far point of an other of the noted set is between a near point and a far point of one of the noted set in the external environment,
a near point of the other of the noted set is closer to the lens units than the near point of the one of the noted set, and
each of the far point of the one and the far point of the other defines a limit position of image recognition which is implemented by imaging through a corresponding one of the lens units by using the imaging system.

18. The camera module according to claim 17, wherein each of the lens units, which belong to the noted set, individually satisfies $Lf=EFL \cdot Sf/Wf$, in which
a corresponding far point is a far point of a corresponding one of the lens units,
Lf is a distance from the corresponding one of the lens units to the corresponding far point,
EFL is a focal length of the corresponding one of the lens units,
Sf is a minimum object size required for the image recognition at the corresponding far point through the corresponding one of the lens units, and
Wf is a minimum pixel width required for the image recognition of the imaging system.

19. The camera module according to claim 17, wherein each of the lens units, which belong to the noted set, individually satisfies $Lc=EFL^2 \cdot Pc/(FNO \cdot Dc)$, in which
a corresponding near point is a near point of corresponding one of the lens units,
Lc is a distance from the corresponding one of the lens units to the corresponding near point,
EFL is a focal length of the corresponding one of the lens units,
Pc is a pixel pitch of the imaging system,
FNO is an F number of the corresponding one of the lens units, and
Dc is a diameter of a circle of confusion in the imaging system.

20. The camera module according to claim 17, wherein a focal length of the one of the noted set is different from a focal length of an other of the noted set.

21. The camera module according to claim 17, wherein the depths of recognition field are ranges of distance within which an object is able to be imaged and recognized, the depths of recognition field determined by the lens units and the imaging system.

* * * * *